(12) United States Patent
Morikuni et al.

(10) Patent No.: US 8,801,197 B2
(45) Date of Patent: Aug. 12, 2014

(54) PROJECTION OPTICAL SYSTEM AND PROJECTOR INCLUDING THE SAME

(75) Inventors: Eiji Morikuni, Shiojiri (JP); Makoto Otani, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 282 days.

(21) Appl. No.: 13/523,390

(22) Filed: Jun. 14, 2012

(65) Prior Publication Data

US 2012/0320347 A1    Dec. 20, 2012

(30) Foreign Application Priority Data

Jun. 17, 2011  (JP) ................................ 2011-134868
May 2, 2012   (JP) ................................ 2012-105145

(51) Int. Cl.
| | |
|---|---|
| G03B 21/00 | (2006.01) |
| G03B 21/14 | (2006.01) |
| G02B 3/02 | (2006.01) |
| G02B 13/08 | (2006.01) |
| G02B 13/18 | (2006.01) |
| G02B 13/12 | (2006.01) |
| G02B 13/16 | (2006.01) |
| G03B 33/12 | (2006.01) |

(52) U.S. Cl.
CPC .............. *G02B 13/12* (2013.01); *G03B 21/142* (2013.01); *G02B 13/16* (2013.01); *G03B 33/12* (2013.01)
USPC ............. 353/101; 353/94; 359/649; 359/668; 359/676; 359/708; 359/716; 359/720

(58) Field of Classification Search
CPC ...... G03B 21/00; G03B 21/14; G03B 21/142; G03B 33/12; G02B 3/02; G02B 13/002; G02B 13/08; G02B 13/12; G02B 13/16
USPC .............................. 353/69, 94, 100–101, 122; 359/648–651, 668, 670–671, 675–676, 359/708, 710, 713–716, 720
See application file for complete search history.

(56) References Cited

U.S. PATENT DOCUMENTS

| | | | |
|---|---|---|---|
| 6,995,920 B2 * | 2/2006 | Nurishi | 359/668 |
| 7,085,066 B2 | 8/2006 | Neil | |
| 7,095,563 B2 * | 8/2006 | Nurishi | 359/668 |
| 8,508,864 B2 * | 8/2013 | Neil | 359/717 |
| 8,662,679 B2 * | 3/2014 | Otani et al. | 353/97 |
| 2004/0196570 A1 * | 10/2004 | Nurishi | 359/668 |
| 2005/0225876 A1 * | 10/2005 | Nurishi | 359/716 |

FOREIGN PATENT DOCUMENTS

| | | |
|---|---|---|
| JP | A-2005-300928 | 10/2005 |
| JP | A-2008-511018 | 4/2008 |

* cited by examiner

*Primary Examiner* — Tony Ko
*Assistant Examiner* — Jori S Reilly-Diakun
(74) *Attorney, Agent, or Firm* — Oliff PLC

(57) ABSTRACT

A projection optical system which, when projecting an image of an optical modulator onto a projection surface on an enlarged scale, differs the aspect ratio of the image of the optical modulator and the aspect ratio of the image projected onto the projection surface, and includes, in order from the projection surface, a first group which is an enlargement optical system; a second group includes an adjustment optical component with a surface rotationally asymmetrical to an optical axis, when defining at least one direction of the vertical direction and the horizontal direction of the optical modulator as an adjustment direction in which conversion adjustment using compression or extension is performed, the adjustment optical component having at least one optical system which differs in power between the adjustment direction and another direction; and a third group which has a correction optical component with a surface rotationally symmetrical to the optical axis.

20 Claims, 41 Drawing Sheets

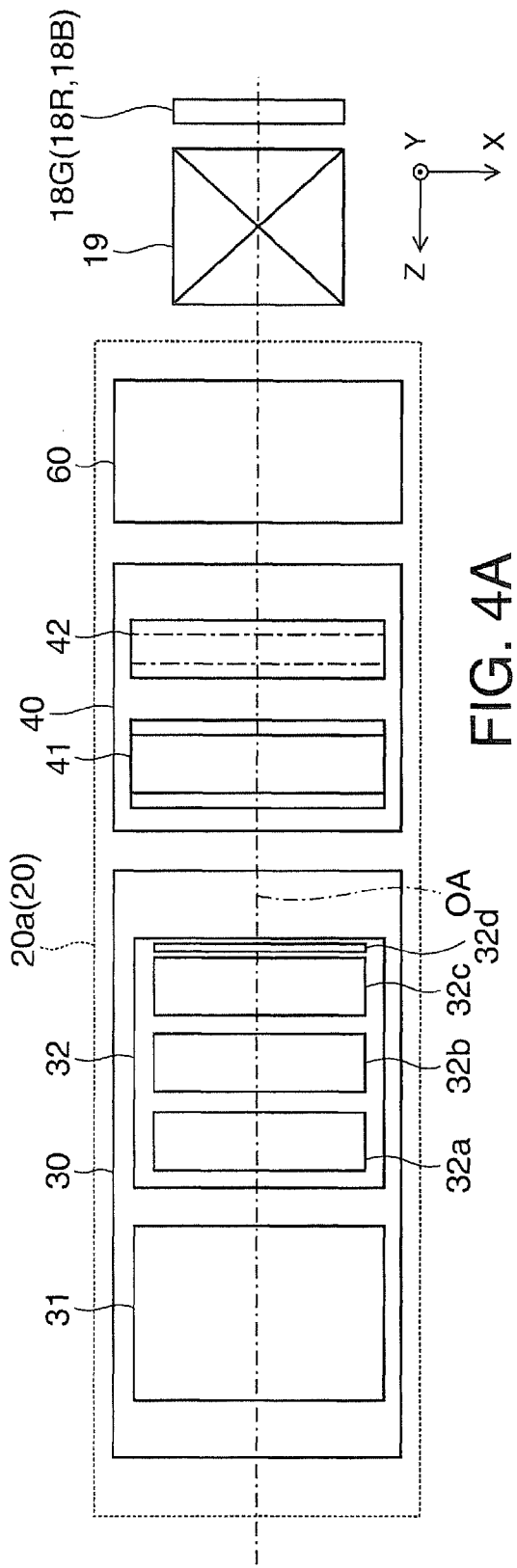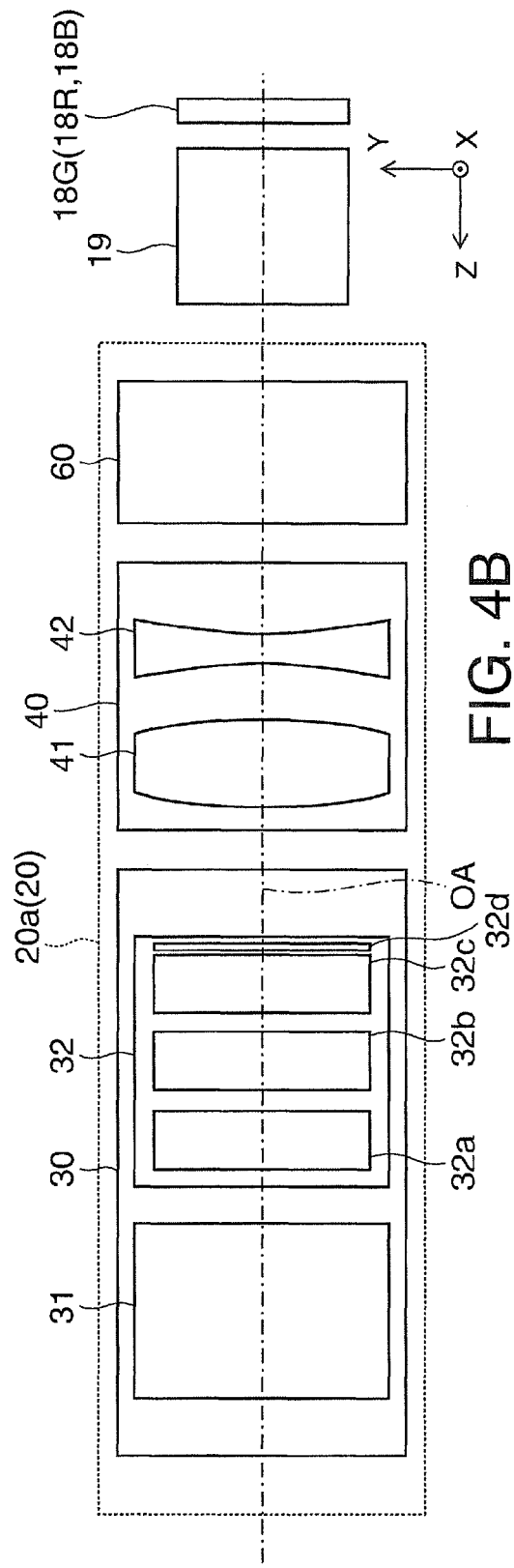

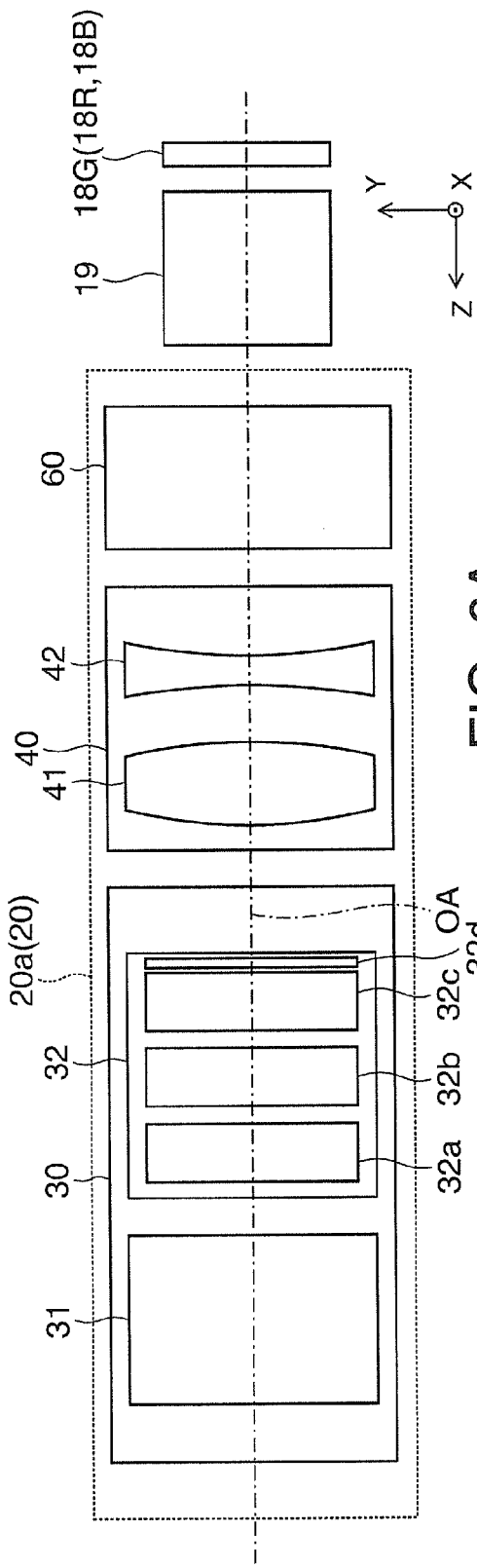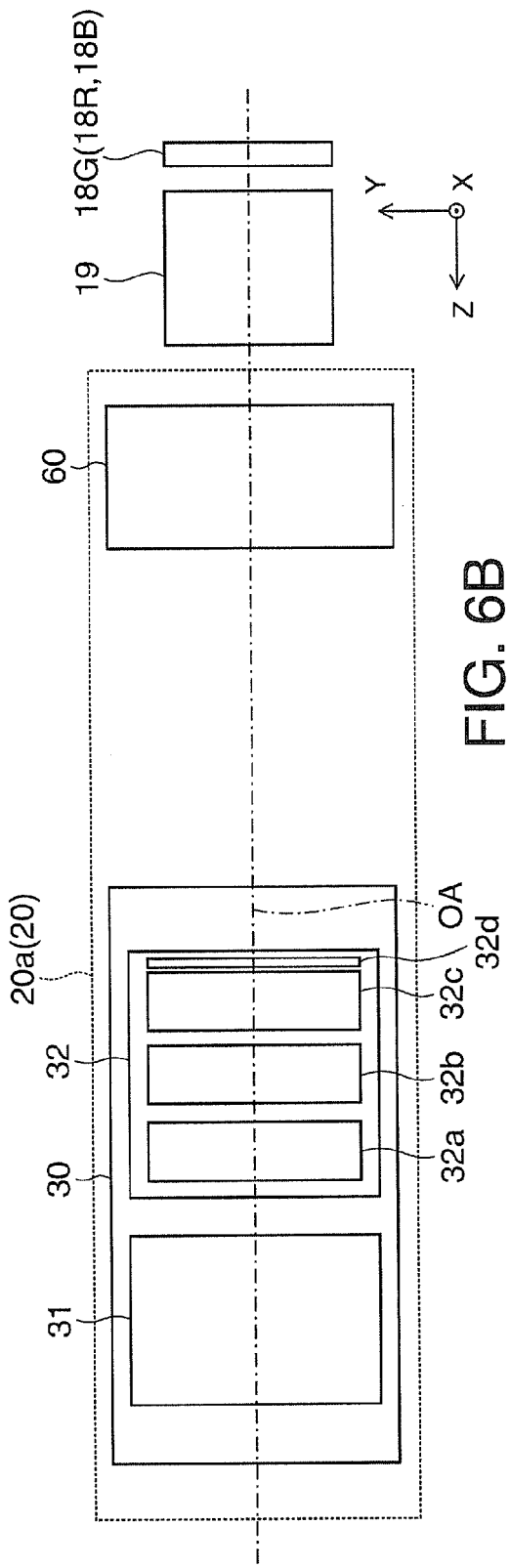

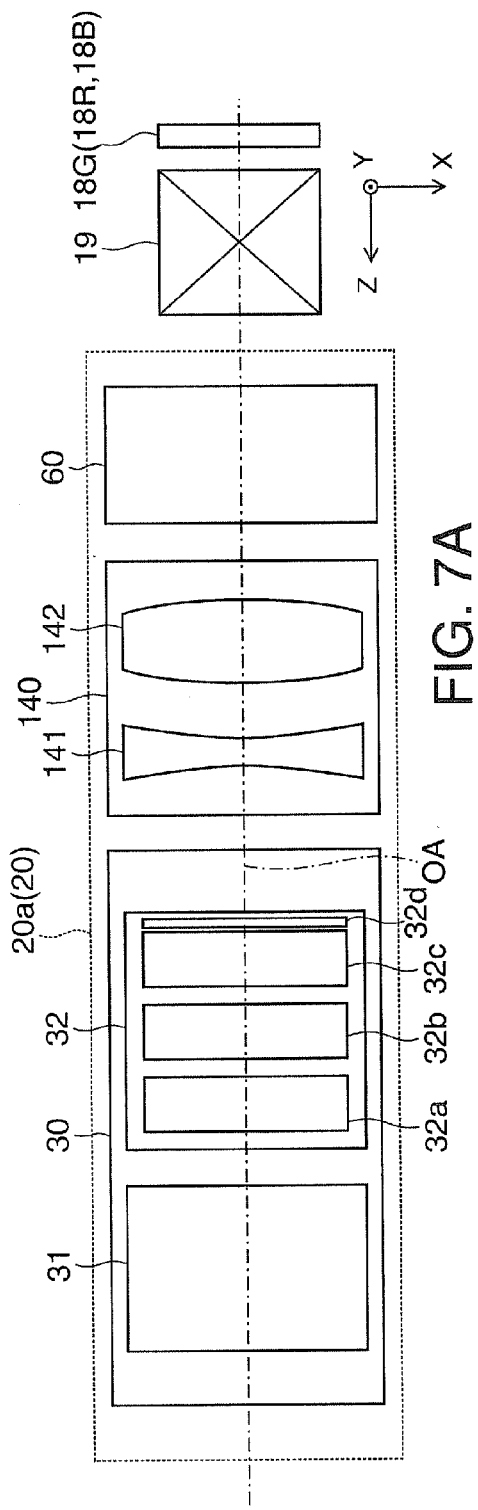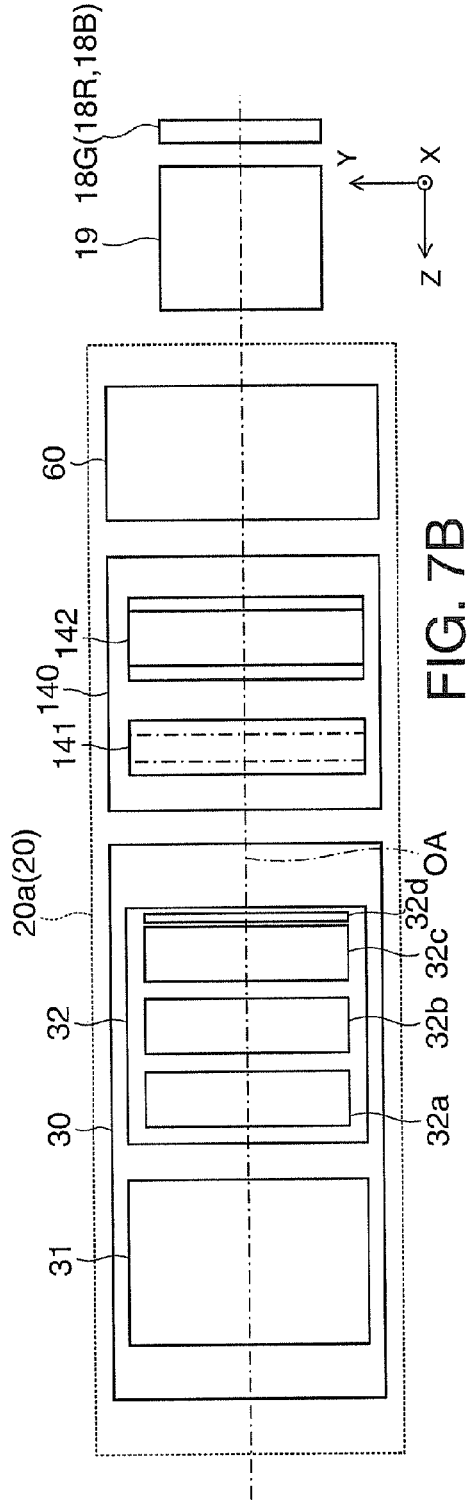

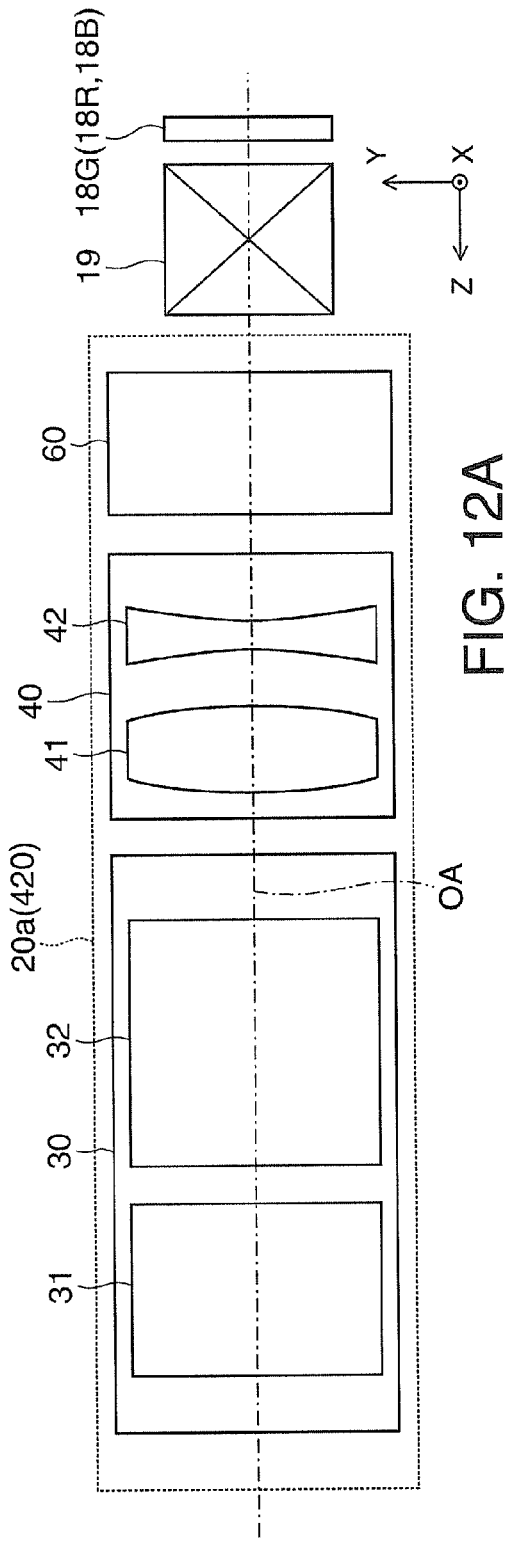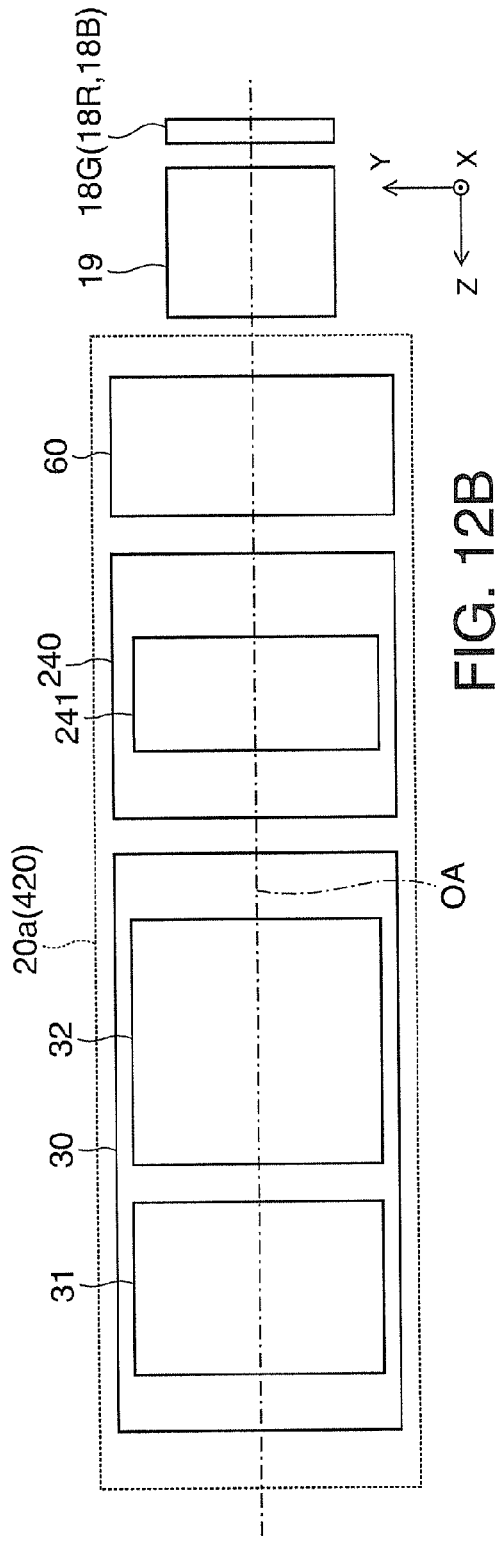

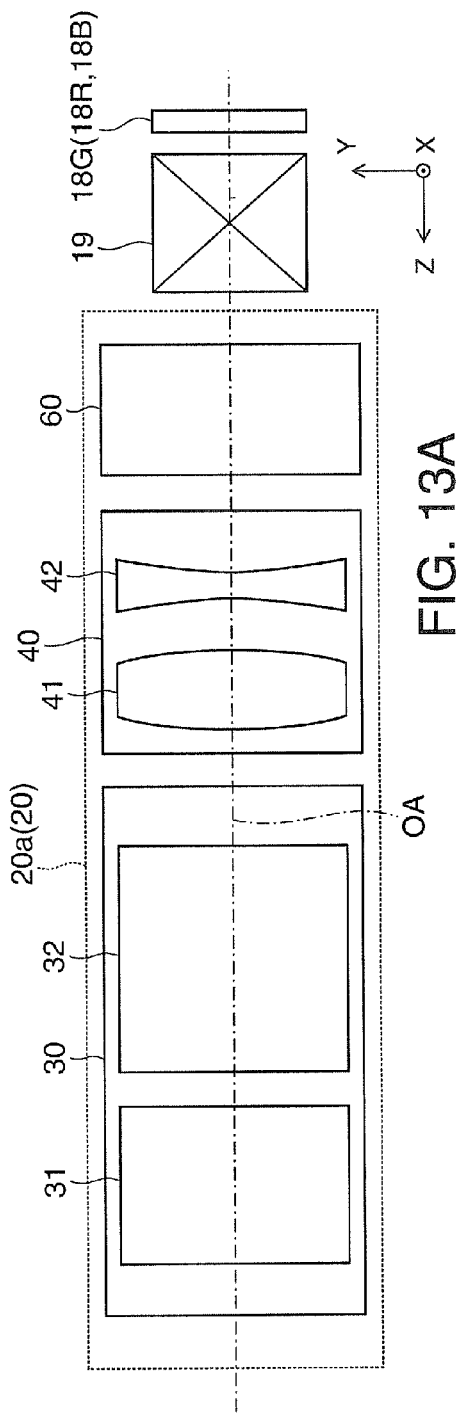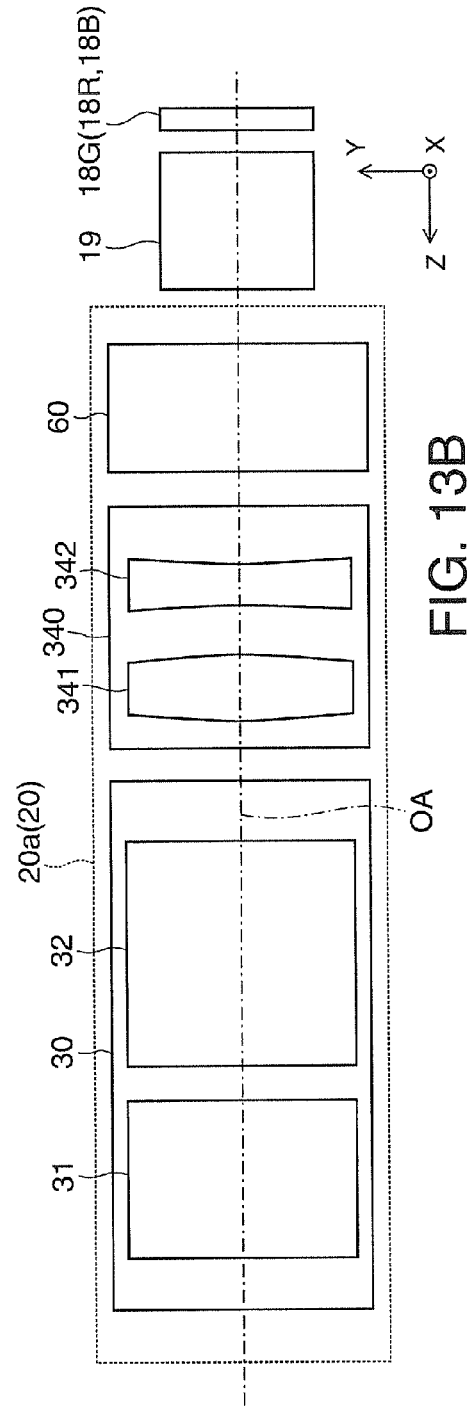
FIG. 13A
FIG. 13B

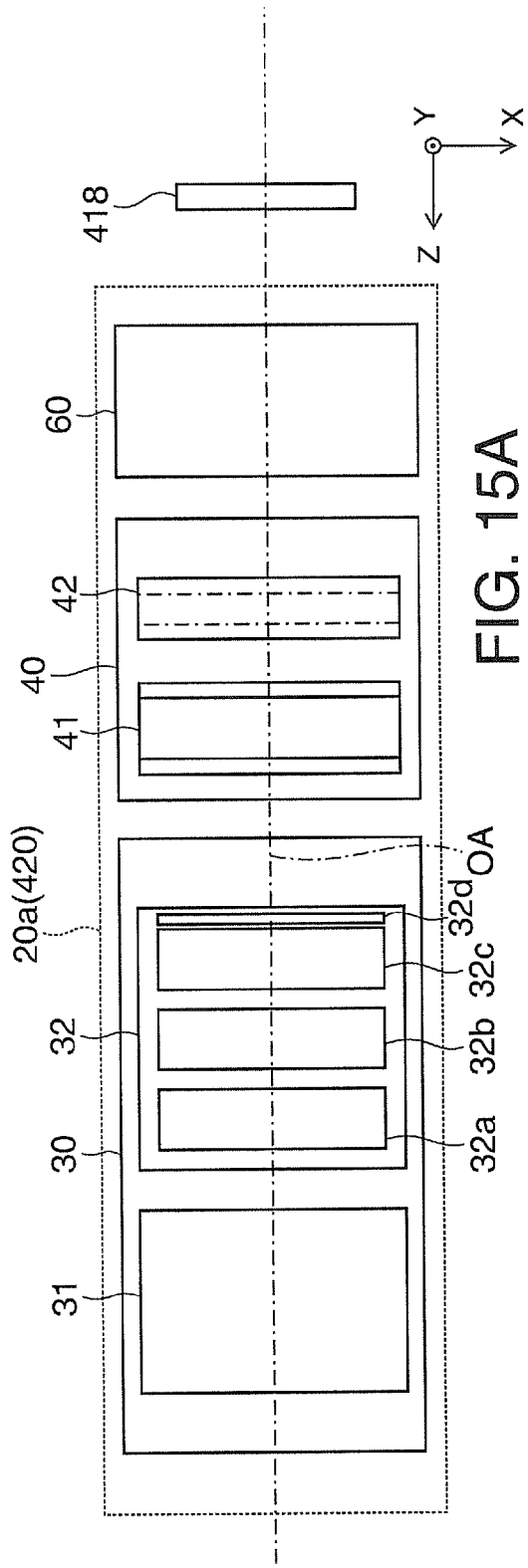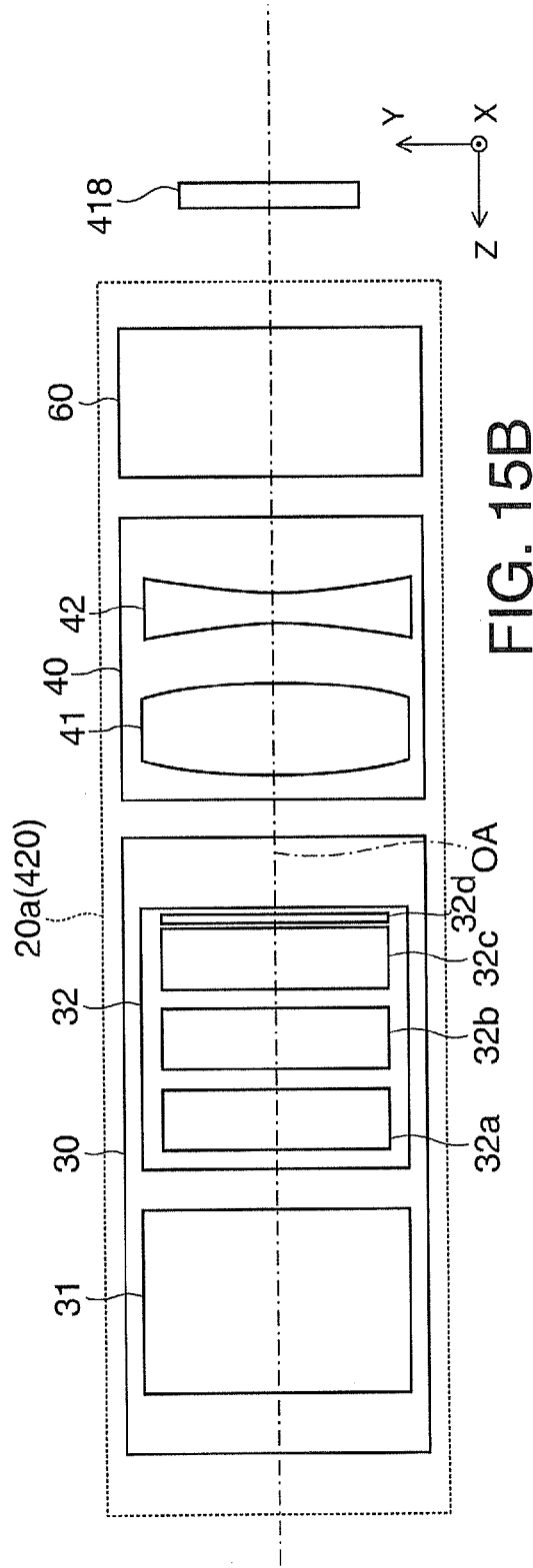

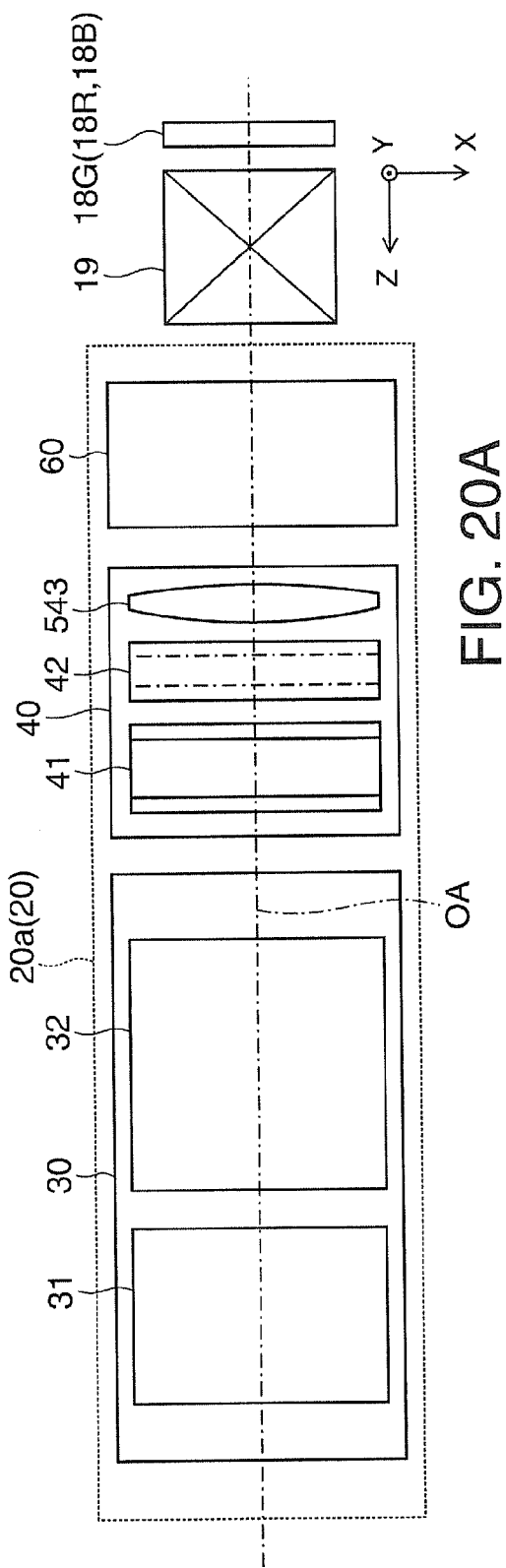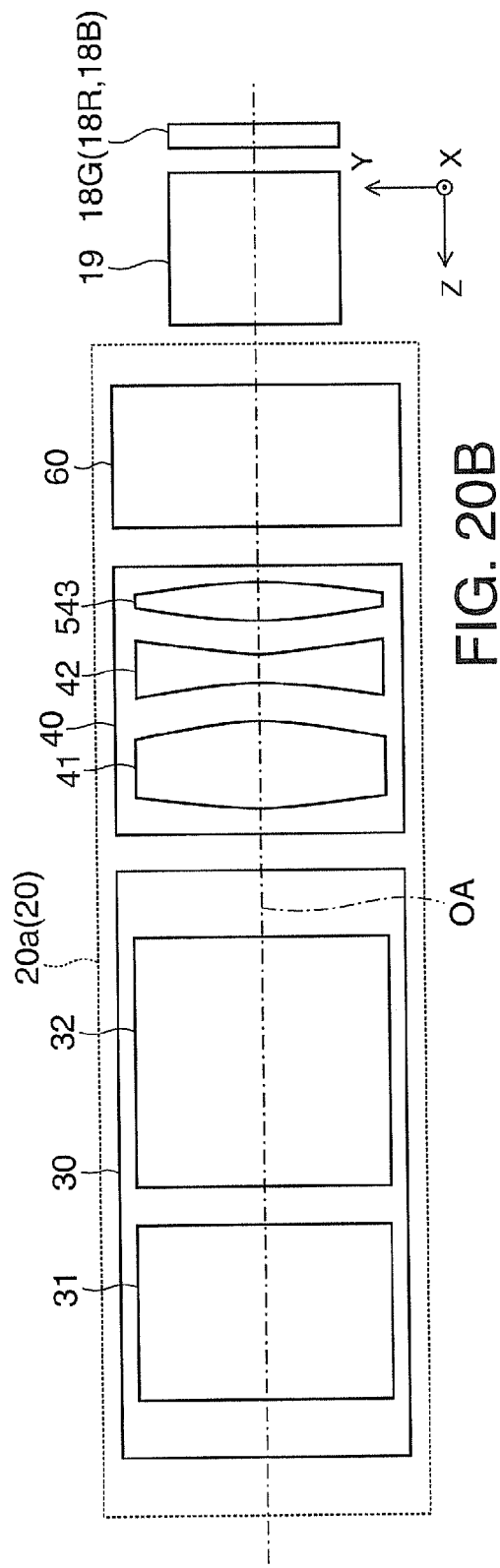

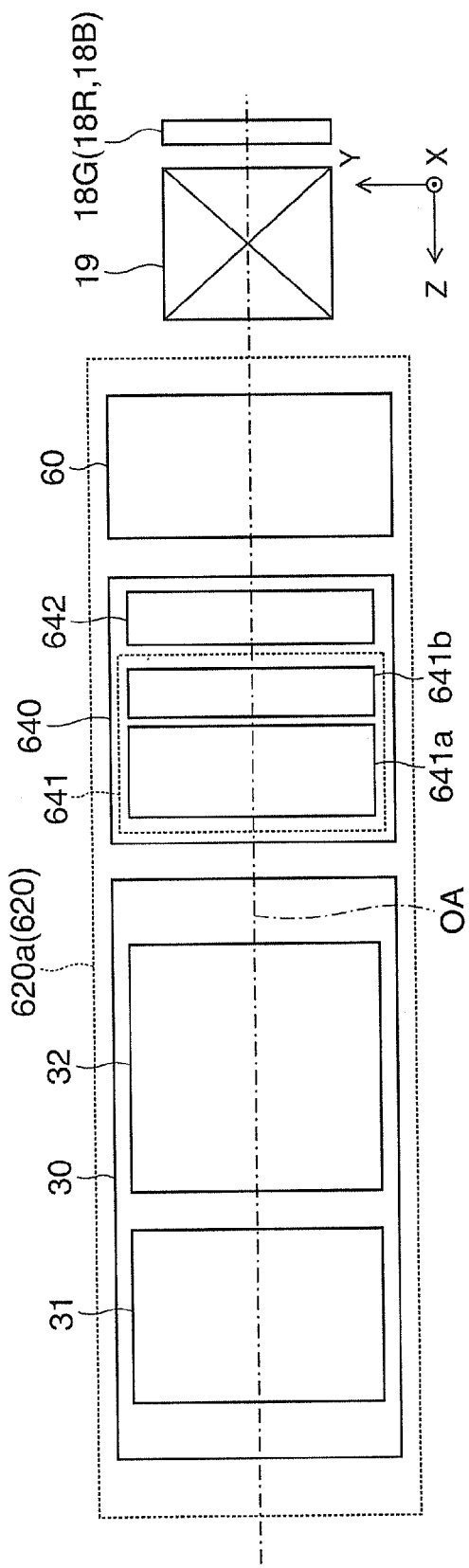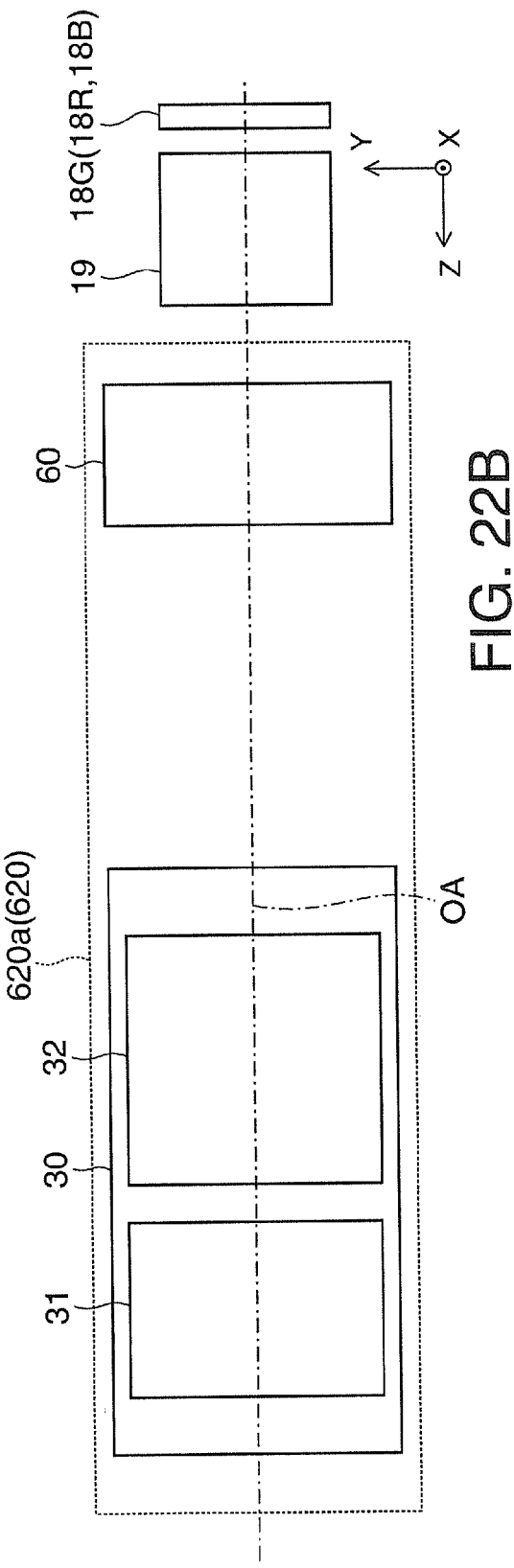

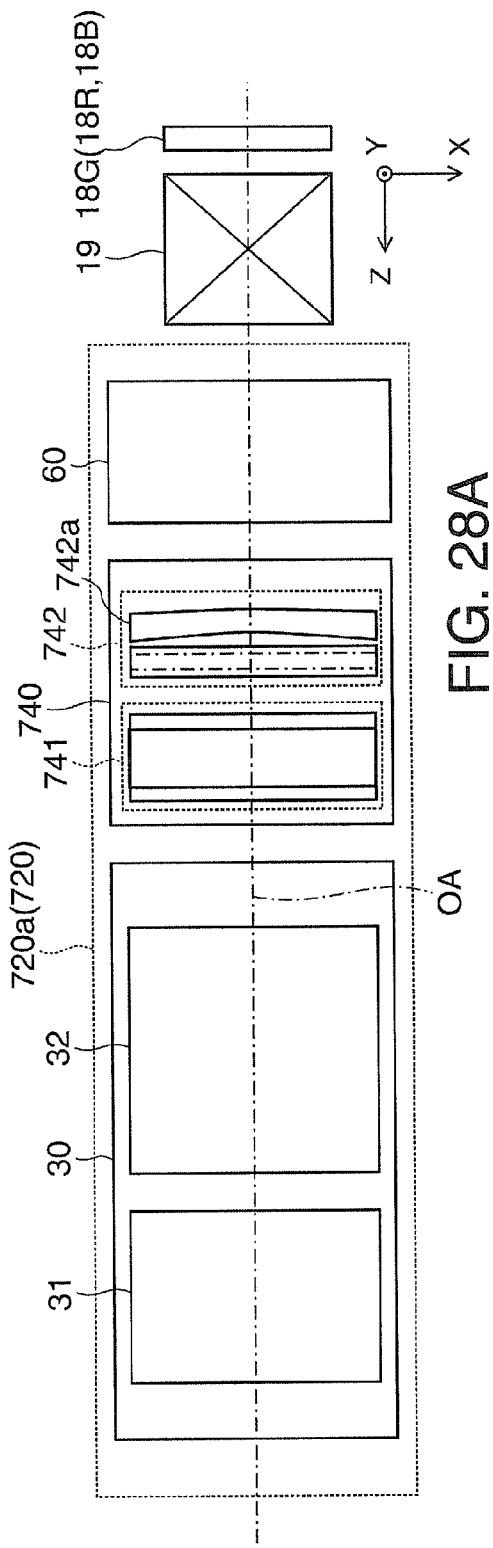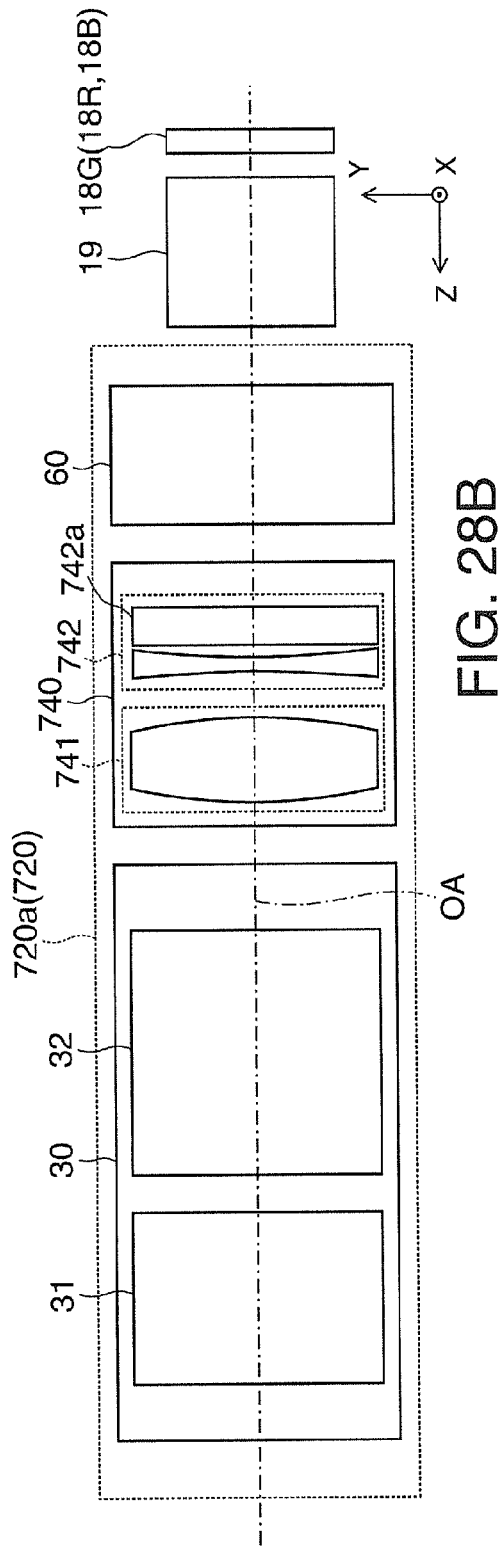

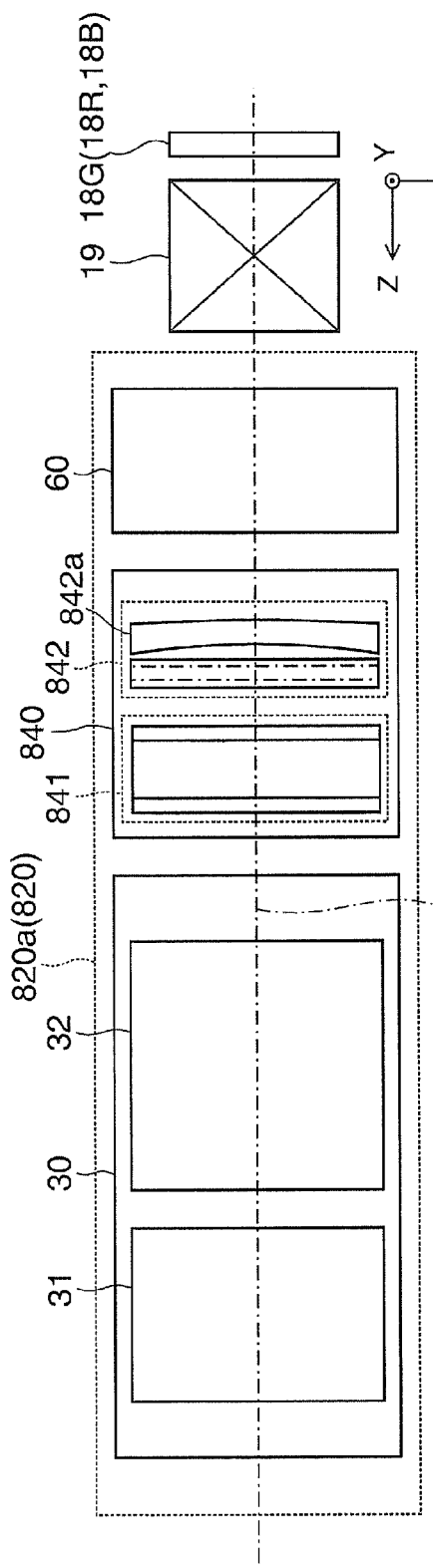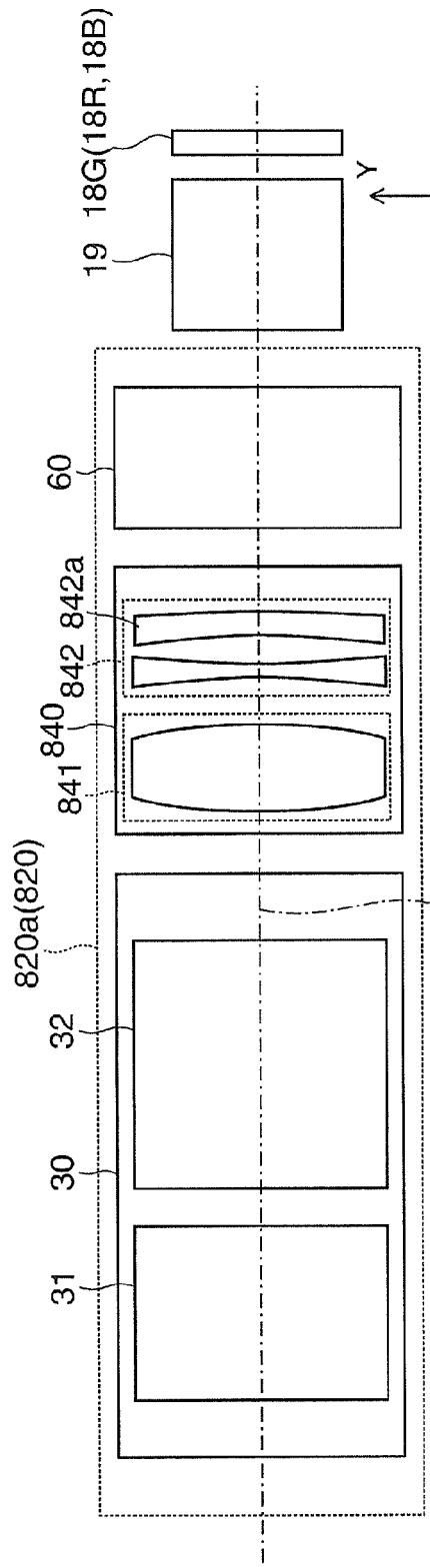

PROJECTION OPTICAL SYSTEM AND PROJECTOR INCLUDING THE SAME

BACKGROUND

1. Technical Field

The present invention relates to a projection optical system and a projector including the same capable of switching the aspect ratio of a projected image, and in particular, to a projection optical system and a projector in which an optical unit for aspect ratio conversion is detachably mounted.

2. Related Art

As a converter for aspect ratio conversion which is used in a projection optical system of a projector, there is a front-disposed converter which is retreatably disposed at a front position of an existing projection optical system, that is, in front of the image side.

This kind of converter is provided as an external optical unit which is independent of a projector body, causing an increase in size of the projector, complicating adjustment of the entire projection optical system including the converter, or significantly deteriorating an image.

As a converter for aspect ratio conversion which is used in an image-taking optical system, such as a camera, instead of a projection optical system of a projector, there is a rear-disposed anamorphic converter or anamorphic image-taking system which is disposed on the image side of an image-formation optical system (see JP-A-2005-300928 and JP-T-2008-511018). The anamorphic converter described in JP-A-2005-300928 has a first lens unit, a second lens unit which includes an anamorphic lens, and a third lens unit which has positive optical power. The second lens unit is movable between a first state where the second lens unit is disposed at an operation position between the first lens unit and the third lens unit, and a second state where the second lens unit is retreated from the operation position. The anamorphic image-taking system described in JP-T-2008-511018 has a plurality of lens components which have power in different directions.

The anamorphic converter described in JP-A-2005-300928, or the like is used in an image-taking optical system, and if this is used directly in a projection optical system, various restrictions occur. For example, in the image-taking optical system described in JP-A-2005-300928, it is basically assumed that lenses are replaceable, and when no anamorphic converter is used, the image-formation optical system is fixed directly to an image-taking unit and used alone. For this reason, in order to maintain the performance of the image-formation optical system, the anamorphic converter should be extended. Meanwhile, in a projection optical system of a projector, since lens replacement is not generally carried out, a function as a general-purpose converter in which various replacement lenses are mountable is not required.

While it is common knowledge that tilting is generally used (a display panel is offset or shifted in a direction perpendicular to a lens optical axis) in a projection optical system, in an image-taking optical system, since this function is not required, countermeasures or the like against the problem of tilting, for example, positional deviation of an image on the screen when the anamorphic converter is inserted in a tilt state have not been considered at all.

SUMMARY

An advantage of some aspects of the invention is that it provides a projection optical system and a projector equipped with the same capable of preventing an increase in size of a projector or image deterioration.

An aspect of the invention provides a projection optical system which, when projecting an image of an optical modulator onto a projection surface on an enlarged scale, differs the aspect ratio of the image of the optical modulator and the aspect ratio of the image projected onto the projection surface. The projection optical system includes, in order from the projection surface, a first group which is an enlargement optical system including, for example, a variable magnification optical system (zoom lens), a second group which includes an adjustment optical component with a surface rotationally asymmetrical to an optical axis, when defining at least one direction of the vertical direction and the horizontal direction of the optical modulator as an adjustment direction in which conversion adjustment using compression or extension is performed, the adjustment optical component having at least one optical system which is different in power between the vertical direction and the horizontal direction, and a third group which has a correction optical component with a surface rotationally symmetrical to the optical axis.

According to the above-described projection optical system, since the second group is different in power in the vertical direction and the horizontal direction of the optical modulator, the projection optical system including the first group is different in focal length between the vertical and horizontal directions and thus different in enlargement magnification between the vertical and horizontal directions as a whole, thereby differing the aspect ratio of the image of the optical modulator and the aspect ratio of the image projected onto the projection surface. That is, with this projection optical system, it becomes possible to convert the aspect ratio which is the ratio of width and height. Since a difference in power between the vertical and horizontal directions is provided using the adjustment optical component in the second group near the optical modulator to change to aspect ratio, it becomes easy to transmit a light beam at each image height along a path comparatively near the image height at a position near the optical modulator and to control the light beam, thereby achieving improvement in image-forming performance. In general, it is difficult to manufacture a rotationally asymmetrical optical component, and from the viewpoint of precision, reduction in size is indispensably required. In the case of the above-described projection optical system, since the spread of the light beam is small at a position near the optical modulator and a lens is small-size, high-precision lens manufacturing can be expected, resulting in improvement in performance and reduction in costs. The correction optical component is provided as the third group nearest to the optical modulator, thereby performing aberration correction in the projection optical system as a whole, and as a result, significant improvement in performance is expected.

In a specific aspect of the invention, in the projection optical system, the second group is retreatably disposed on an optical path, and when the second group is retreated from the optical path and enlarged projection is performed by the first group and the third group, the aspect ratio of the image of the optical modulator and the aspect ratio of the image projected onto the projection surface match each other. In this case, the first group has a function of an enlargement optical system which is the same as a general projection optical system, and the image of the optical modulator can be projected onto the projection surface on an enlarged scale using the first group and the third group. After the second group has been retreated, there is no degradation in transmittance due to the second group, and projection can be performed in a bright state. When the second group is advanced or retreated on the optical path, since it is not necessary to move the first group or the third group by a large amount, less burden is imposed on the mechanical mechanism or the like.

In another aspect of the invention, the second group is replaceable with a flat plate which has no power, and when the flat plate is disposed on the optical path instead of the second group, the aspect ratio of the image of the optical modulator and the aspect ratio of the image projected onto the projection surface match each other. Accordingly, even when the second group and the flat plate are replaced, since it is possible to keep the change in transmittance small, it is not necessary to adjust brightness of an image before and after replacement. If the material of the flat plate is appropriately selected, it is possible to reduce the difference in chromatic aberration at the time of replacement. It is also possible to eliminate deviation in an image-forming surface due to advancement and retreatment of the second group.

In still another aspect of the invention, the second group has one second group unit selected from among a plurality of second group units having different adjustment optical components and disposed on the optical path. In this case, two or more kinds of aspect ratios different from the aspect ratio of the image of the optical modulator can be selected, and an image at a corresponding aspect ratio can be projected onto the projection surface.

In still another aspect of the invention, a normal line passing through the center of the optical modulator and the optical axis of the projection optical system are disposed in parallel. In this case, it is not necessary to match the center of the optical modulator and the optical axis of the projection optical system, and if the center of the optical modulator is disposed to be shifted from the optical axis of the projection optical system, precise shift projection can be performed in a state where the projection surface is shifted in an opposite direction by the amount obtained by multiplying the magnification of the projection optical system by the shift amount, thereby allowing a user to view a projected video without being interrupted by the projector.

In still another aspect of the invention, the projection optical system further includes a shift mechanism which moves the optical axis of the projection optical system while keeping parallel to the normal line passing through the center of the optical modulator. In this case, even when the shift amount of the projection optical system is adjusted, comparatively high-precision projection can be performed with the projection surface shifted by the shift amount. Accordingly, it becomes possible to arbitrarily adjust the installation positions of the projector and the screen, thereby projecting a video at an optimum position in accordance with a user's viewing position. When the enlargement optical system includes a variable magnification function, if the magnification of the projection optical system varies in a state where the shift is used, the shift amount of the projection surface increases/decreases in response to the shift and protrusion from the projection surface occurs. This is corrected by the shift mechanism, making it easy to project an image to fit on the projection surface.

In still another aspect of the invention, a part or all of the adjustment optical components are cylindrical lenses. The cylindrical lenses are easily manufactured with high precision, resulting in reduction in costs of the adjustment optical component and consequently the projection optical system.

In still another aspect of the invention, a part or all of the adjustment optical components are anamorphic lenses (toric or toroidal lenses). In the anamorphic lenses, since curvature can be controlled in both the longitudinal and cross sections, it is possible to reduce all kinds of aberrations which affect a curvature difference, such as astigmatism, thereby expecting enhancement in the performance of the projection optical system.

In still another aspect of the invention, a part or all of the adjustment optical components have a shape in which a section including the optical axis of the projection optical system is represented with an aspheric expression. In regard to an aspheric lens which is represented with an aspheric expression, it is possible to reduce all kinds of aberrations, and in particular, if a high-order aspheric coefficient is used, it becomes possible to correct a high image height portion. With this configuration, since a light beam at each image height passes through a surface comparatively near the panel at a height near the image height, it becomes possible to more effectively correct aberrations, thereby expecting enhancement in the performance of the projection optical system.

In still another aspect of the invention, a part or all of the adjustment optical components are free-form surface lenses. With the free-form surface lenses, it becomes easy to optimize a projection state relating to an oblique direction other than the vertical and horizontal directions of the optical modulator, thereby achieving enhancement in the performance of the projection optical system.

In still another aspect of the invention, the second group includes one or more rotationally asymmetrical lenses as at least a part of the adjustment optical components, and further includes one or more rotationally symmetrical lenses. With this configuration, it is possible to simply suppress all kinds of aberrations, in particular, astigmatism which has not been suppressed using the variable magnification optical system of the first group, on the second group near the optical modulator.

In still another aspect of the invention, the second group includes, in order from the projection surface, a first optical component group of positive power and a second optical component group of negative power as the adjustment optical components in the section along the vertical direction of the optical modulator. In this case, it is possible to compress or reduce a video projected onto the projection surface in the vertical direction. When the horizontal dimension of the projection surface is fixed, it becomes possible to change the aspect ratio without changing the projection distance.

In still another aspect of the invention, the second group includes, in order from the projection surface, a first optical component group of negative power and a second optical component group of positive power as the adjustment optical components in the section along the horizontal direction of the optical modulator. In this case, it is possible to extend or enlarge a video projected onto the projection surface in the horizontal direction. When the vertical dimension of the projection surface is fixed, it becomes possible to change the aspect ratio without changing the projection distance.

In still another aspect of the invention, the space between the first optical component group and the second optical component group is variable, and the aspect ratio of the image projected onto the projection surface changes in accordance with the space. In this case, it is possible to continuously change the aspect ratio.

In still another aspect of the invention, telecentricity is substantially provided on the optical modulator side. In this case, when the second group is advanced or retreated on the optical path, even if the back focus of the projection optical system changes, only if moving the projection optical system along the optical axis, it is possible to appropriately maintain the image-forming state or layout of a video to be projected onto the projection surface, and enlargement/reduction magnification.

In still another aspect of the invention, a prism for light composition is disposed on the optical modulator side of the third group. In this case, it becomes possible to project images of a plurality of colors formed on a plurality of optical modulators in combination.

In still another aspect of the invention, in the third group, the correction optical components has two or more lenses. In this case, a plurality of lenses are combined, thereby performing desired aberration correction.

In still another aspect of the invention, the third group has positive power. In this case, since it is possible to substantially collimate all light beams from the first group and to form an image using the third group, if the second group substantially has an afocal optical system, it becomes possible to perform magnification conversion without causing degradation in performance.

In still another aspect of the invention, the third group includes an aspheric lens in at least a part of the correction optical components. In this case, it is possible to adjust the surface shape of the aspheric lens to reduce aberration. In particular, the amount of aberration which remains in the first group is enlarged in a state where the second group is retreated or when a light beam passes through a one-direction section of no power, there is demand for high-degree correction in the third group. In general, since the higher the image height, the greater the aberration, if a high-order coefficient of the aspheric lens is used, it becomes possible to correct the aberration to a high degree. Since it is necessary to substantially collimate an outgoing light beam on the second group side of the third group, it is possible to use the aspheric lens to realize this with a small number of lenses.

In still another aspect of the invention, the second group includes a movable optical component, which is movable in an optical axis direction, in at least a part of the adjustment optical components. The movement of the movable optical component includes not only a case where a finished product has a structure in which a driving mechanism is provided to make the movable optical component movable but also a case where the movable optical component is in a movable state when assembling a product. In this case, it is possible to adjust the focal length in the vertical direction and the horizontal direction with movement of the movable optical component, and even when an astigmatic difference occurs at a high image height, it is possible to balance out the difference, thereby obtaining satisfactory video. It also becomes possible to adjust the movable optical component to correct variation when assembling a product or focus deviation due to change in temperature, thereby improving product quality.

With a three-group configuration of the first group, the second group, and the third group, it is possible to reduce aberration between the final lens surface in the third group as a fixed lens group and the panel (back focus), and as compared to a case where there is no third group, the second group as an anamorphic lens group can have only a function of reducing aberration due to an anamorphic optical system. That is, in an optical system having a comparatively long back focus, such as a projection optical system which is used in a projector, it is possible to satisfactorily correct aberration.

With the third group, for example, if a light beam at each image height between the first group and the third group is substantially collimated with respect to a principal light beam, the second group becomes an afocal optical system (a focal length is infinite), and fine adjustment of the focal length (magnification) can be performed with movement of some internal lenses without being largely affected by all kinds of aberrations. For example, if this is used in a projector, it is possible to obtain satisfactory video.

In still another aspect of the invention, the movable optical component moves in the optical axis direction in conjunction with a zoom operation of the first group. In this case, while the magnitude of an astigmatic difference differs during zooming, the space of the anamorphic lens groups is adjusted in accordance with the zoom amount, thereby obtaining satisfactory video over the entire zoom range.

In still another aspect of the invention, the projection optical system furthers include an electrical driving mechanism which electrically performs the conjunction of the movable optical component with the zoom operation of the first group. In this case, it is possible to appropriately maintain the movement of the movable optical component which should be adjusted in accordance with the zoom amount.

In still another aspect of the invention, the second group includes, in order from the projection surface, a first partial group of negative power, a second partial group of positive power including the movable optical component, and a third partial group of negative power in the adjustment direction, in which conversion adjustment using compression or extension is performed, between the vertical direction and the horizontal direction of the optical modulator. In the case of this layout, if an optical component (lens) of positive power moves back and forth, it is possible to control only an astigmatic difference, and for example, if this is used in a projector, it is possible to realize satisfactory video over the entire image height range.

In still another aspect of the invention, in the second group, a lens group in which the first partial group and the second partial group are combined has positive power. In this case, since the first partial group and the second partial group have positive power, and the third partial group has negative power, for example, if an afocal optical system is formed with positive and negative in the second group, fine adjustment of the focal length (magnification) can be performed without being largely affected by all kinds of aberrations, and if this is used in a projector, it is possible to obtain satisfactory video.

In still another aspect of the invention, the movable optical component is a cylindrical lens. In this case, it is possible to comparatively simply prepare the movable optical component.

In still another aspect of the invention, the second group has, in at least a part of the adjustment optical components, a plurality of cylindrical lens groups which have a curvature only in the adjustment direction, in which conversion adjustment using compression or extension is performed, between the vertical direction and the horizontal direction of the optical modulator, and an independent lens which has a curvature at least in a non-adjustment direction between the non-adjustment direction, in which conversion adjustment is not performed, between the vertical direction and the horizontal direction and the adjustment direction in which conversion adjustment is performed. In this case, a curvature is provided not only in the adjustment direction between the vertical direction and the horizontal direction but also in the non-adjustment direction, thereby adjusting the focal length in the vertical direction and the horizontal direction. Even when field curvature or an astigmatic difference occurs at a high image height, it is possible to balance out the aberration amount, and for example, when this is used in a projector, it is possible to obtain satisfactory video.

With the three-group configuration of the first group, the second group, and the third group, it is possible to reduce aberration between the final lens surface in the third group as a fixed lens group and the panel (back focus), and as compared to a case where there is no third group, the second group as an anamorphic lens group can have only a function of reducing aberration due to an anamorphic optical system. That is, in an optical system having a comparatively long back focus, such as a projection optical system which is used in a projector, it is possible to satisfactorily correct aberration.

With the third group, for example, if a light beam at each image height between the first group and the third group is substantially collimated with respect to a principal light beam, the second group becomes an afocal optical system (a focal length is infinite), and fine adjustment of the focal length (magnification) can be performed with movement of some internal lenses without being largely affected by all kinds of aberrations. For example, if this is used in a projector, it is possible to obtain satisfactory video.

In still another aspect of the invention, in the second group, the independent lens is a cylindrical lens which has a curvature only in the non-adjustment direction. In this case, it is possible to comparatively simply prepare the independent lens, and in particular, to improve field curvature.

In still another aspect of the invention, in the second group, the independent lens is an anamorphic lens which has a curvature in both the adjustment direction and the non-adjustment direction. In this case, optimization is made while balancing out in the vertical direction and the horizontal direction, and as a result, it becomes possible to improve overall correction.

In still another aspect of the invention, in the second group, the independent lens is an aspheric lens. In this case, for example, when compressive conversion is performed in the vertical direction, that is, when the vertical direction is the adjustment direction, the independent lens is aspherized in the horizontal direction which is the non-adjustment direction in which conversion is not performed, thereby suppressing astigmatism in the horizontal direction. In a vertical compression system, since a cylindrical lens which has a curvature only in the vertical direction is mostly used so as to perform compression in the vertical direction, astigmatism in the vertical direction is easily suppressed during optimization. Meanwhile, astigmatism in the horizontal direction is not easily corrected. Accordingly, aspherization is made in the horizontal direction, thereby considerably suppressing astigmatism.

If aspherization is also made in the vertical direction, optical performance in the vertical direction increases, and optimization is made while balancing out the increased amount in the horizontal direction. As a result, it becomes possible to effectively improve overall performance.

In still another aspect of the invention, in the second group, the independent lens is a resin lens. In this case, the independent lens can be manufactured using resin molding, and a lens, such as a toric lens, having a complicated curved surface can be comparatively simply prepared with high precision.

In still another aspect of the invention, in the second group, the power of the independent lens is substantially zero. In this case, since a rise in temperature due to refraction in the independent lens is reduced, for example, even when the independent lens is made of resin, it is possible to reduce deviation in the focal length or the like due to a rise in temperature.

In still another aspect of the invention, the second group includes, in order from the projection surface, a first partial group of negative power forming a part of the plurality of cylindrical lens groups, a second partial group of positive power forming another part of the plurality of cylindrical lens groups, and a third partial group of negative power including the independent lens in the adjustment direction. In the case of this layout, since it becomes easy to transmit a light beam at each image height through the independent lens as a part of a negative lens along a path comparatively near the image height at a position near the optical modulator and to control the light beam, thereby improving image-forming performance only in a surface having power, it is possible to control only an astigmatic difference, and for example, if this is used in a projector, it is possible to realize satisfactory video over the entire image height range.

In still another aspect of the invention, in the second group, a lens group in which the first partial group and the second partial group are combined has positive power in the adjustment direction. In this case, the first partial group and the second partial group have positive power, and the third partial group has negative power, such that, for example, an afocal optical system is formed with positive and negative in the second group. With this configuration, it is possible to convert the focal length (magnification) without being largely affected by all kinds of aberrations, and if this is used in a projector, it is possible to obtain satisfactory video.

In still another aspect of the invention, the third group is a light beam collimation optical system which collimates a light beam. In this case, since a light beam at each image height between the first group and the third group can be substantially collimated with respect to a principal light beam using the light beam collimation optical system, the second group which is disposed between the first group and the third group can be formed as an afocal optical system.

A projector according to one aspect of the invention includes the above-described projection optical system, and an optical modulator. With this projector, an image at an aspect ratio different from the aspect ratio of the image of the optical modulator can be projected onto the projection surface. At this time, it is possible to prevent an increase in size of a projector or image deterioration using a special projection optical system.

BRIEF DESCRIPTION OF THE DRAWINGS

The invention will be described with reference to the accompanying drawings, wherein like numbers reference like elements.

FIG. 4A shows the configuration of a cross section of a projection optical system, and FIG. 4B shows the configuration of a longitudinal section of a projection optical system.

FIG. 5 is a perspective view illustrating a projection optical system and the like.

FIG. 6A shows a first operation state of a projection optical system, and FIG. 6B shows a second operation state of a projection optical system.

FIG. 7A shows the configuration of a cross section of a modification of a projection optical system shown in FIG. 3 or the like, and FIG. 7B shows the configuration of a longitudinal section of a projection optical system.

FIG. 12A shows the configuration of a longitudinal section in a certain state of a projection optical system of a projector according to a second embodiment, and FIG. 12B shows the configuration of a longitudinal section in another state of a projection optical system.

FIG. 13A shows the configuration of a longitudinal section in a certain state of a projection optical system of a projector according to a third embodiment, and FIG. 13B shows the configuration of a longitudinal section in another state of a projection optical system.

FIG. 15A shows the configuration of a cross section of a projection optical system, and FIG. 15B shows the configuration of a longitudinal section of a projection optical system.

FIG. 20A shows the configuration of a cross section of a projection optical system of a fifth embodiment, and FIG. 20B shows the configuration of a longitudinal section of a projection optical system.

FIG. 22A shows a first operation state of a projection optical system, and FIG. 22B shows a second operation state of a projection optical system.

FIG. 28A shows the configuration of a cross section of a projection optical system of a seventh embodiment, and FIG. 28B shows the configuration of a longitudinal section of a projection optical system.

FIG. 36A shows the configuration of a cross section of a projection optical system of an eighth embodiment, and FIG. 36B shows the configuration of a longitudinal section of a projection optical system.

DESCRIPTION OF EXEMPLARY EMBODIMENTS

Hereinafter, a projector and a projection optical system according to embodiments of the invention will be described will be described in detail with reference to the drawings.

First Embodiment

Figure 1:
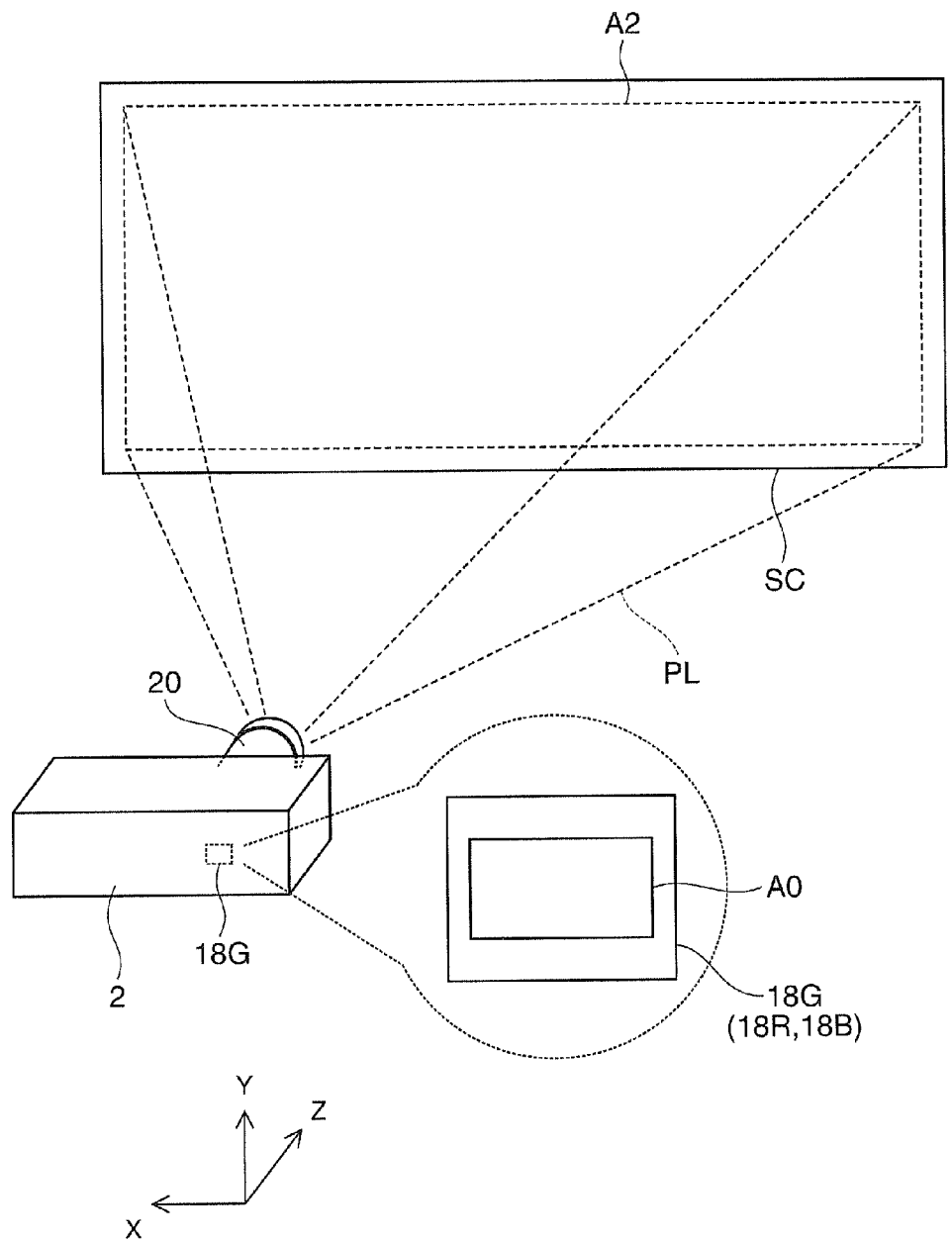
FIG. 1 is a diagram illustrating a usage state of a projector according to a first embodiment.

As shown in FIG. 1, a projector 2 according to a first embodiment of the invention forms image light PL in accordance with an image signal, and projects the image light PL toward a projection surface, such as a screen SC. When projecting an image of liquid crystal panel 18G (18R, 18B) serving as an optical modulator in the projector 2 onto a screen (projection surface) SC on an enlarged scale, a projection optical system 20 of the projector 2 can differ the aspect ratio AR2 of the image projected onto the screen SC from the aspect ratio AR0 of the image of the liquid crystal panel 18G (18R, 18B). That is, the aspect ratio AR0 of a display area A0 of the liquid crystal panel 18G and the aspect ratio AR2 of a display area A2 of the screen SC may be identical or may be different. Specifically, the aspect ratio AR0 of the display area A0 of the liquid crystal panel 18G is, for example, 1.78:1, and the aspect ratio AR2 of the display area A2 of the screen SC is, for example, 1.78:1, 1.85:1, 2.35:1, 2.4:1, or the like.

Figure 2:
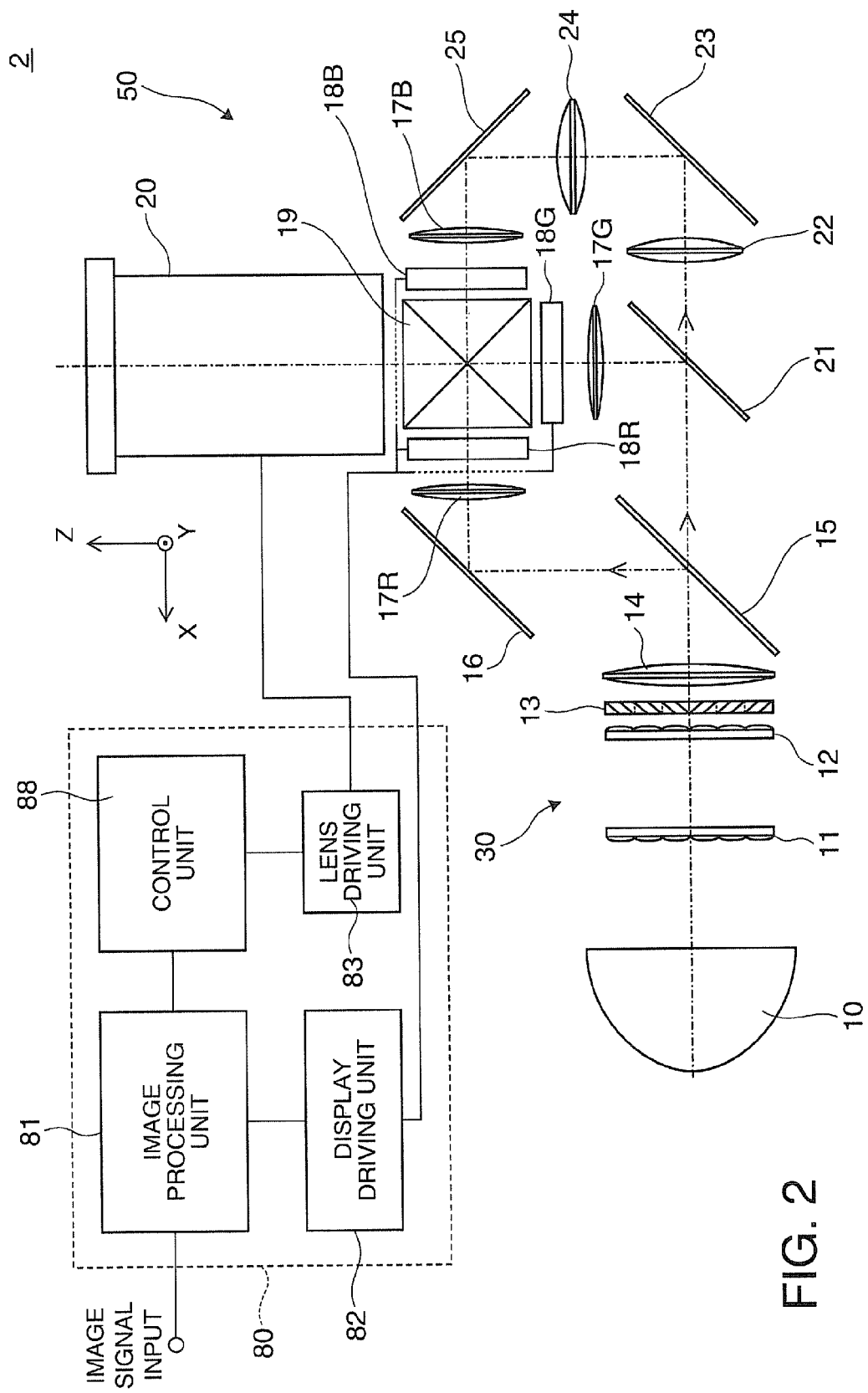
FIG. 2 is a diagram showing the schematic configuration of the projector of FIG. 1.

As shown in FIG. 2, the projector 2 includes an optical system portion 50 which projects image light, and a circuit device 80 which controls the operation of the optical system portion 50.

In the optical system portion 50, a light source 10 is, for example, an extra-high pressure mercury lamp, and emits light includes an R light component, a G light component, and a B light component. The light source 10 may be a discharge light source other than an extra-high pressure mercury lamp, or may be a solid-state light source, such as an LED or a laser. A first integrator lens 11 and a second integrator lens 12 have a plurality of lens elements arranged in an array. The first integrator lens 11 divides a light beam from the light source 10 into a plurality of light beams. Each lens element of the first integrator lens 11 condenses the light beam from the light source 10 in the vicinity of the lens elements of the second integrator lens 12. The lens elements of the second integrator lens 12 form the images of the lens elements of the first integrator lens 11 on the liquid crystal panels 18R, 18G, and 18B in cooperation with a superimposing lens 14. With this configuration, light from the light source 10 illuminates the entire display area (the display area A0 of FIG. 1) of the liquid crystal panels 18R, 18G, and 18B with substantially uniform brightness.

A polarization conversion element 13 converts light from the second integrator lens 12 to predetermined linearly polarized light. The superimposing lens 14 superimposes the image of each lens element of the first integrator lens 11 on the display area of the liquid crystal panels 18R, 18G, and 18B through the second integrator lens 12.

A first dichroic mirror 15 reflects the R light component input from the superimposing lens 14 and transmits the G light component and the B light component. The R light component reflected by the first dichroic mirror 15 is input to the liquid crystal panel 18R serving as an optical modulator through a reflecting mirror 16 and a field lens 17R. The liquid crystal panel 18R modulates the R light component in accordance with an image signal to form an R-color image.

The second dichroic mirror 21 reflects the R light component from the first dichroic mirror 15 and transmits the B light component. The G light component reflected by the second dichroic mirror 21 is input to the liquid crystal panel 18G serving as an optical modulator through a field lens 17G. The liquid crystal panel 18G modulates the G light component in accordance with an image signal to form a G-color image. The B light component transmitted the second dichroic mirror 21 is input to the liquid crystal panel 18B serving as an optical modulator through relay lenses 22 and 24, reflecting mirrors 23 and 25, and a field lens 17B. The liquid crystal panel 18B modulates the B light component in accordance with an image signal to form a B-color image.

A cross dichroic prism 19 is a prism for light composition, combines light components modulated by the liquid crystal panels 18R, 18G, and 188 to form image light, and sends the image light to the projection optical system 20.

The projection optical system 20 projects the image light PL modulated by the liquid crystal panels 18G, 18R, and 18B and combined in the cross dichroic prism 19 onto the screen SC of FIG. 1 on an enlarged scale. At this time, in the projection optical system 20, the aspect ratio AR2 of a video to be projected onto the screen SC may be the same as the aspect ratio AR0 of an image of the liquid crystal panel 18G, 18R, or 18B or may be different from the aspect ratio AR0.

The circuit device 80 includes an image processing unit 81 to which an external image signal, such as a video signal, is input, a display driving unit 82 which drives the liquid crystal panels 18G, 18R, and 18B in the optical system portion 50 on the basis of an output of the image processing unit 81, a lens driving unit 83 which operates a driving mechanism (not shown) in the projection optical system 20 to adjust the state of the projection optical system 20, and a main control unit 88 which performs overall control of the operations of the circuit portions 81, 82, and 83, and the like.

The image processing unit 81 converts the input external image signal to an image signal including the gradation of each color or the like. In a first operation state where the projection optical system 20 converts the aspect ratio of the image and projects the image, the image processing unit 81 performs image aspect ratio conversion made by reversing aspect ratio conversion in the projection optical system 20 such that an image which is displayed on the screen SC is not extended in the horizontal and vertical directions. Specifically, when an image is extended in the horizontal direction by the projection optical system 20 so as to be 1.78:1 to 2.4:1, the image is compressed 0.742=1.78/2.4 times in the horizontal direction in advance, or the image is extended 1.35=2.4/1.78 times in the vertical direction in advance. In a second operation state where the projection optical system 20 projects an image while not converting the aspect ratio of the image, the image processing unit 81 does not perform image aspect ratio conversion described above. The image processing unit 81 may perform various image processes, such as distortion correction or color correction, on the external image signal. Of the vertical direction and the horizontal direction, a direction in which conversion adjustment using compression or extension is performed is defined as an adjustment direction, and a direction in which conversion adjustment is not performed is defined as a non-adjustment direction.

The display driving unit 82 can operate the liquid crystal panels 18G, 18R, and 18B on the basis of an image signal output from the image processing unit 81, and can form an image corresponding to the image signal or an image corresponding to an image signal subjected to the image process on the liquid crystal panels 18G, 18R, and 18B.

The lens driving unit 83 operates under the control of the main control unit 88, and appropriately moves some optical components forming the projection optical system 20 along the optical axis OA, thereby changing the projection magnification of the image onto the screen SC of FIG. 1 in the projection optical system 20. The lens driving unit 83 advances and retreats other optical components forming the projection optical system 20 on the optical axis OA, that is, on the optical path, thereby changing the aspect ratio AR2 of the image projected onto the screen SC of the FIG. 1. The lens driving unit 83 can change the vertical position of the image to be projected onto the screen SC of FIG. 1 with the adjustment of shift for moving the entire projection optical system 20 in an up-down direction perpendicular to the optical axis OA.

Hereinafter, the projection optical system 20 of the embodiment will be described with reference to FIG. 3. The projection optical system 20 includes a body portion 20a in which a plurality of optical components, such as lenses, are combined, and driving mechanisms 61, 62, 63, and 64 which move a part or the whole of the body portion 20a to adjust an image-forming state.

The body portion 20a has, in order from the screen SC, a first group 30, a second group 40, and a third group 60.

The first group 30 exhibits the same function as a general projection optical system in cooperation with the third group 60, and can project the enlarged image of the liquid crystal panel 18G (18R, 18B) onto the screen SC. The first group 30 has a first lens group 31 which is a first lens unit, and a second lens unit 32. For example, at least one lens which forms the first lens group 31 as a first lens unit is slightly moved manually or the like along the optical axis OA, thereby adjusting the focus state of the body portion 20a. As shown in FIG. 4A or the like, the second lens unit 32 has second, third, fourth, and fifth lens groups 32a, 32b, 32c, and 32d, and each of the lens groups 32a, 32b, 32c, and 32d has one or more lenses. These lens groups 32a, 32b, 32c, and 32d or at least one lens which forms each of these lens groups is moved along the optical axis OA using a zoom driving mechanism 61, thereby changing a projection magnification in the body portion 20a.

Figure 5:
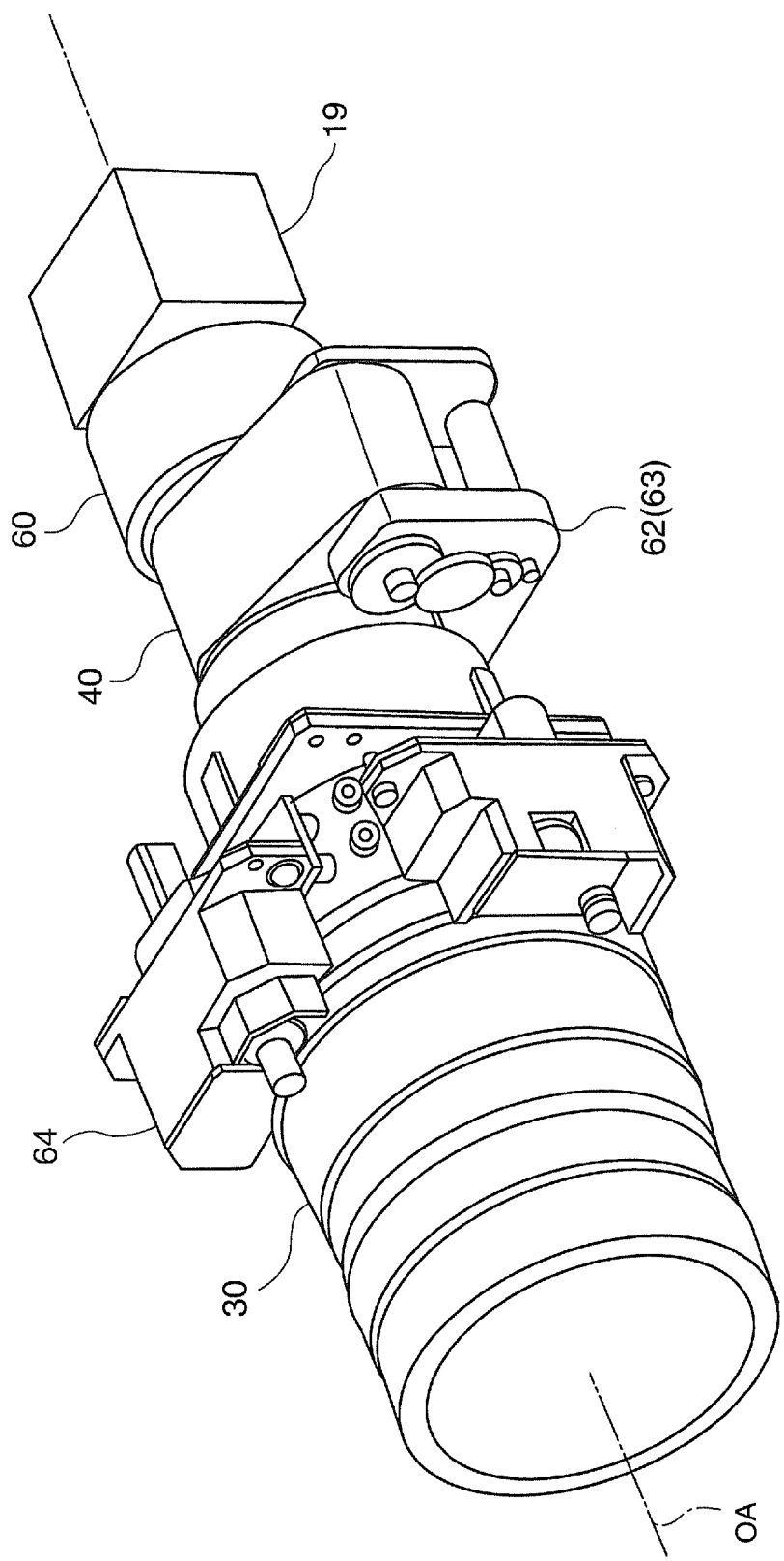

The second group 40 has a focal length which differs between the horizontal direction (X direction) and the vertical direction (Y direction), and as a result, the projection optical system 20 including the first group 30 is also different in focal length in the vertical direction and the horizontal direction as a whole. That is, the enlargement magnification in the body portion 20a is different between the vertical direction and the horizontal direction, such that an image at the aspect ratio AR2 different from the aspect ratio AR0 of the image displayed on the liquid crystal panel 18G (18R, 18B) can be projected onto the screen SC. The second group 40 includes one or more adjustment optical components with a surface rotationally asymmetrical to the optical axis OA. Specifically, the second group 40 has, in order from the screen SC, a first optical component group 41 of positive power and a second optical component group 42 of negative power in the section along the vertical direction (Y direction) shown in FIG. 4B. The first optical component group 41 and the second optical component group 42 have no power in the section along the horizontal direction (X direction) shown in FIG. 4A. The second group 40 is advanced and retreated as a singly body using the first anamorphic driving mechanism 62 also shown in FIG. 5, thereby switching the aspect ratio of the image to be projected onto the screen SC at a desired timing. Specifically, as shown in FIG. 6B, the second group 40 is retreated from the optical path, such that an image can be projected onto the screen SC at the aspect ratio (for example, 1.78:1) of an image which is formed on the liquid crystal panel 18G (18R, 18B). Alternatively, as shown in FIG. 6A, the second group 40 is disposed on the optical path, such that an image can be projected onto the screen SC at an aspect ratio (for example, 2.4:1) at which an image which is formed on the liquid crystal panel 18G (18R, 18B) is compressed (reduced) in the vertical direction. That is, the vertical direction is the adjustment direction in which conversion adjustment is performed using compression, and the horizontal direction is the non-adjustment direction. The first optical component group 41 and the second optical component group 42 forming the second group 40 as adjustment optical components are moved in the optical axis OA direction using the second anamorphic driving mechanism 63 to adjust the space therebetween, thereby continuously increasing/decreasing the aspect ratio of the image to be projected onto the screen SC. A configuration which an image to be projected onto the screen SC is compressed (reduced) in the vertical direction using the second group 40 is effective when the screen SC in which the horizontal dimension is fixed is used. That is, it becomes possible to change only the aspect ratio without changing the projection distance or the like in the projection optical system 20 with respect to the screen SC.

The third group 60 has only rotationally symmetrical optical components, and includes a correction optical component for correcting aberration at a position near the liquid crystal panel 18G (18R, 18B). That is, since the third group 60 is disposed nearer the liquid crystal panel 18G (18R, 18B) than the first group 30 or the second group 40, the third group significantly contributes to correcting aberration which may be generated in the first group 30 or the like. The third group 60 has a plurality of lenses as correction optical components for correcting aberration, and these lenses include a lens of positive power or an aspheric lens.

Figure 3:
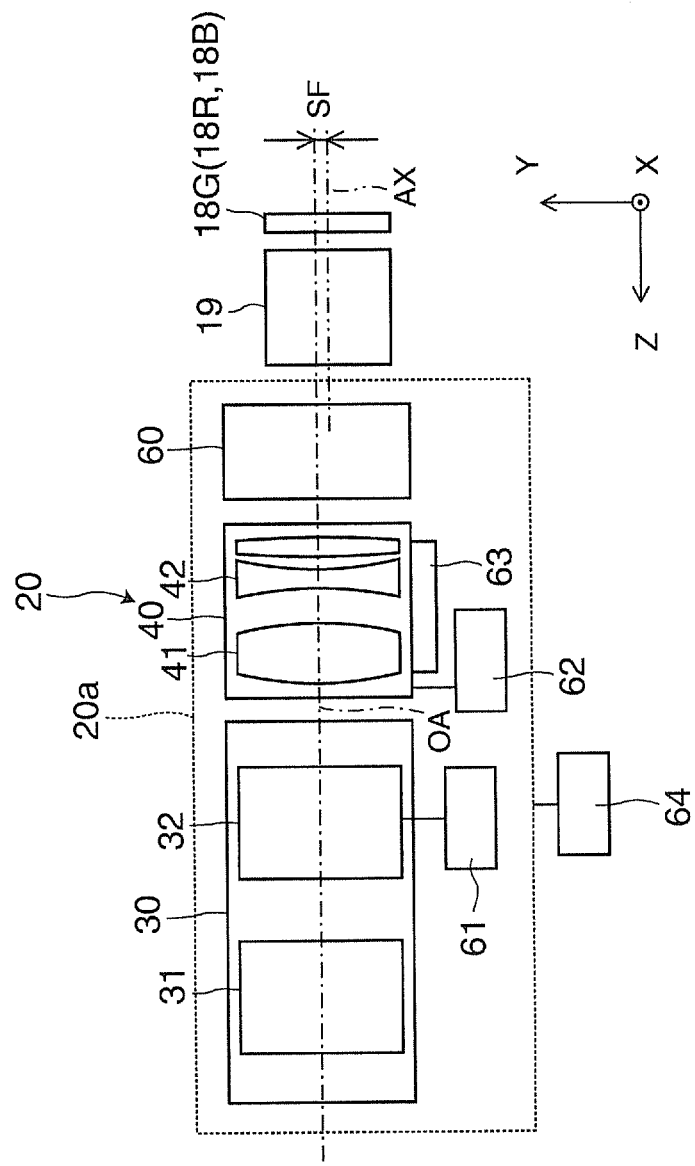
FIG. 3 is a diagram illustrating the structure of a projection optical system in the projector of FIG. 1.

As shown in FIG. 3, the entire body portion 20a is moved in a direction perpendicular to the optical axis OA using the entire system driving mechanism 64, thereby increasing/decreasing the amount of deviation of an image to be projected onto the screen SC from the optical axis OA. That is, the optical axis OA of the body portion 20a is moved by an appropriate shift amount SF with respect to a center axis AX of the liquid crystal panel 18G while keeping the optical axis OA of the body portion 20a parallel to the center axis AX of the liquid crystal panel 18G, such that an image can be projected at a position depart from the optical axis OA, for example, in the upper direction (+Y direction), and with the adjustment of the shift amount SF, the projection position of the image can be moved up and down in the vertical direction. The shift amount SF which is the amount of deviation of the optical axis OA of the body portion 20a based on the center axis AX of the liquid crystal panel 18G is not necessarily variable, and may be fixed to, for example, a value which is not zero. The entire body portion 20a may be appropriately moved in a direction along the optical axis OA using the entire system driving mechanism 64.

The zoom driving mechanism 61, the first anamorphic driving mechanism 62, the second anamorphic driving mechanism 63, and the entire system driving mechanism 64 have motors, mechanical transmission mechanisms, sensors, and the like, and operate in response to driving signals from the lens driving unit 83 of FIG. 2. These driving mechanisms 61, 62, 63, and 64 operate along in response to driving signals from the lens driving unit 83 and operate integrally. For example, the entire system driving mechanism 64 is operated in accordance with the operation of the zoom driving mechanism 61, thereby suppressing a phenomenon in which an image is shifted during zooming, or the like.

The function of the projection optical system 20 shown in FIG. 3 and the like will be described in more detail. In the case of the projection optical system 20, the second group 40 comparatively near the liquid crystal panel 18G (18R, 18B) is used to change the focal length in the horizontal and vertical directions, and a light beam at each image height can transmit along the image height to a certain degree. Accordingly, it becomes easy to control a light beam in a portion near the liquid crystal panel 18G (18R, 18B), thereby achieving improvement in performance. In general, a rotationally asymmetrical optical component is not easily manufactured, and from the viewpoint of precision, reduction in size of the second group 40 is indispensably required. From this point, the nearer the second group 40 the liquid crystal panel 18G (18R, 18B), the smaller the spread of the light beam, and the first optical component group 41 and the second optical component group 42 which are adjustment optical components forming the second group 40 can be made compact. In regard to these optical component groups 41 and 42, high-precision lens manufacturing can be expected, resulting in improvement in performance of the projection optical system 20 and reduction in costs. Since the projection optical system 20 has the third group 60 nearest to the liquid crystal panel 18G (18R, 18B), it is possible to efficiently and reasonably correct aberration using a comparatively simple optical system. With the presence of the third group 60, it is possible to achieve more significant improvement in performance.

When the second group 40 of the projection optical system 20 is retreated outside the optical path and the second operation state is set, nothing is disposed at the position of the second group 40 in the projection optical system 20. That is, when the second group 40 is retreated, the projection optical system 20 has only rotationally symmetrical optical components of the first group 30 and the third group 60, such that the aspect ratio of the display area A0 of the liquid crystal panel 18G (18R, 18B) and the aspect ratio of the display area A2 of the screen SC match each other. With the cooperation of the first group 30 and the third group 60, the functions of an enlargement optical system and a variable magnification optical system which are the same as a general projection optical system are provided, and the image of the liquid crystal panel 18G can be formed on the screen SC. When the second group is retreated, transmittance is improved, thereby brightening an image. In the projection optical system 20 of this embodiment, the first group 30 and the third group 60 are fixedly provided on the optical path, and the second group 40 is advanced or retreated on the optical path. This point is different from a case where an existing anamorphic converter (see JP-A-2005-300928) is used in a projection system. That is, in the existing anamorphic converter, when an anamorphic converter is removed, the projection optical system is slightly approached to an imaging element by the amount corresponding to the anamorphic converter. In the projection optical system 20 of this embodiment, even when the second group 40 is removed and retreated outside the optical path, it is not almost necessary to change the position of the first group 30 or the third group 60. That is, it is not necessary to move the first group 30 or the third group 60 by a large amount at the time of switching the horizontal and vertical magnification for advancing and retreating the second group 40 on the optical path, thereby reducing a burden imposed on the mechanical mechanisms. When an existing anamorphic converter is used in a projection system, while the second group which is a part of an anamorphic converter unit is advanced and retreated on the optical path to change the horizontal and vertical magnification, even when the second group for horizontal and vertical magnification conversion is advanced and retreated on the optical path, there is no large movement of the body optical system. The existing anamorphic converter is fixed to the mount of the body optical system instead of the body optical system which can be used alone, and functions like a relay lens. For this reason, in the case of the existing anamorphic converter, the optical burden increases, and the total length is extended in the optical axis direction, causing an increase in the number of constituent lenses. Meanwhile, according to the projection optical system 20 of this embodiment, it is not necessary that the second group 40 functions like a relay lens, and the total length is reduced, thereby reducing the number of constituent lenses. In the projection optical system 20 of this embodiment, unlike an existing anamorphic converter, since the entire second group 40, instead of a part of the second group 40, is retreated separately from the first group 30 and the third group 60, if the first group 30 and the third group 60 are formed as a single body, when the second group 40 is advanced and retreated or attached and detached, it is possible to reduce an influence of eccentricity or the like on the first group 30 and the third group 60, and to realize an layout where functional separation is made comparatively. When assembling the projection optical system 20, assembling precision of the second group 40 as a unit between the separate first group 30 and third group 60 should be considered, thereby achieving improvement in assembling performance.

In the projection optical system 20, since the optical axis OA of the body portion 20a can be moved by an appropriate shift amount SF while keeping the optical axis OA of the body portion 20a parallel to the center axis AX of the liquid crystal panel 18G, projection using shift can be performed, it becomes easy to prevent interference of the viewer and the image light PL, and installation performance is improved. When the body portion 20a of the projection optical system 20 is shifted with respect to the liquid crystal panel 18G as described above, if zooming in which the second lens unit 32 is operated using the zoom driving mechanism 61 to change the projection magnification is performed, the absolute amount of the shift amount of the image light PL increases. Accordingly, an increase in the shift amount due to zooming is corrected with the operation of the entire system driving mechanism 64, thereby improving operability and installation performance of the projector 2. At this time, the zoom driving mechanism 61 and the entire system driving mechanism 64 are in conjunction under the control of the main control unit 88 to automate the operations, thereby further improving operability.

In the projection optical system 20 of the foregoing embodiment, one surface or both surfaces of each of the optical component groups 41 and 42 which are adjustment optical components forming the second group 40 are a cylindrical lens surface. Since a cylindrical lens is easily manufactured, high precision can be expected and reduction in costs can be achieved. The eccentric sensitivity in the planar section is low, assembling performance is improved, and as a result, enhancement in performance can be expected. That is, if the second group 40 has a cylindrical lens, it becomes possible to reduce costs while securing the precision of the projection optical system 20.

One surface or both surfaces of each of the optical component groups 41 and 42 forming the second group 40 are not limited to a cylindrical lens surface and may be an anamorphic lens (for example, toric or toroidal lens). One surface or both surfaces of each of the optical component groups 41 and 42 forming the second group 40 may have a shape in which a horizontal X section or a longitudinal Y section is represented with an aspheric expression, specifically, the following polynomial expression h.

$$h = \frac{cy^2}{1+\sqrt{1-(1+k)c^2y^2}} + A_2 y^2 + A_4 y^4 + A_6 y^6 + A_8 y^8 + A_{10} y^{10} + \ldots$$

Here, y is the height (image height) of an image from the optical axis OA, c is the curvature of a spherical surface as a reference, k is a conic constant, and A2, A4, A6, A8, A10, ... are predetermined correction terms. One surface or both surfaces of each of the optical component groups 41 and 42 forming the second group 40 may be a free-form surface. With the use of an anamorphic lens, since the curvature in both sections in the X direction and the Y direction can be controlled, it is possible to reduce astigmatism, thereby achieving enhancement in performance. In the case of an aspheric surface, it is possible to reduce various kinds of aberrations, thereby achieving enhancement in performance. In the case of a free-from surface, in an image circle surface on the screen SC or the liquid crystal panel 18G (18R, 18B), it becomes easy to optimize an image-forming state in a middle oblique direction other than the horizontal and vertical directions of the liquid crystal panel 18G (18R, 18B), thereby achieving enhancement in performance.

The second group 40 is not limited to the two optical component groups 41 and 42, and may have three or more optical component groups. At this time, it is desirable that chromatic aberration is not generated due to the second group 40. For this reason, it is desirable that the following relationship is established.

$$\Sigma(\phi i \times vi) \cong 0$$

φi: the refractive index of each lens forming the second group 40
vi: the Abbe number of each lens forming the second group 40

In the projection optical system 20 of the foregoing embodiment, telecentricity is substantially provided on the object side. That is, a light beam from the liquid crystal panel 18G (18R, 18B) is near-parallel to the optical axis OA, and the liquid crystal panel 18G (18R, 18B) and the projection optical system 20 can be comparatively simply assembled with high precision, thereby obtaining satisfactory assembling performance. When the second group 40 is advanced and retreated on the optical path to perform horizontal and vertical magnification conversion, the focal length of the projection optical system 20 changes, and accordingly, it is necessary to adjust the back focus. At this time, when the projection optical system 20 is not substantially telecentric on the object side and has an angle with respect to a principal light beam, if there is the cross dichroic prism 19 which is a prism for light composition, image light from the liquid crystal panel 18G (18R, 18B) moves up and down in accordance with the adjustment of the back focus. The adjustment of the back focus causes a change in magnification. In order to prevent this problem, there is demand for study on a mechanism or optical design. Meanwhile, if the projection optical system 20 is substantially telecentric on the object side, it should suffice that the projection optical system 20 is moved in the optical axis OA direction at the time of horizontal and vertical magnification conversion, and the above-described problem does not occur, thereby simplifying the projection optical system 20 in terms of mechanisms or optical design. There is no change in magnification due to the adjustment of the back focus. When the projection optical system 20 is moved in a direction perpendicular to the optical axis OA and projection is performed using shift, if outgoing light from the liquid crystal panel 18G (18R, 18B) is input to the projection optical system 20 in a substantially telecentric state, it becomes easy to secure the amount of ambient light, thereby contributing to improvement in image quality.

FIGS. 7A and 7B are diagrams illustrating a modification of the projection optical system 20 shown in FIGS. 4A and 4B. A second group 140 is different in focal length between the vertical direction (Y direction) and the horizontal direction (X direction), and as a result, the projection optical system 20 including the first group 30 is different in focal length between the vertical direction and the horizontal direction as a whole. In this case, the second group 140 has, in order from the screen SC, a first optical component group 141 of negative power and a second optical component group 142 of positive power in the section along the horizontal direction (X direction). The first optical component group 141 and the second optical component group 142 have no power in the vertical direction (Y direction) shown in FIG. 7B. As shown in FIGS. 7A and 7B, the second group 40 is disposed on the optical path, such that an image can be projected onto the screen SC at an aspect ratio (for example, 2.4:1) at which an image which is formed on the liquid crystal panel 18G (18R, 18B) is extended in the horizontal direction. Though not shown, when the second group 140 is retreated from the optical path, an image can be projected onto the screen SC at the aspect ratio (for example, 1.78:1) of the image which is formed on the liquid crystal panel 18G (18R, 18B). That is, the horizontal direction is the adjustment direction in which conversion adjustment through extension is performed, and the vertical direction is the non-adjustment direction. The first optical component group 141 and the second optical component group 142 forming the second group 140 are moved in the optical axis OA direction using the second anamorphic driving mechanism 63 of FIG. 3 to adjust the space therebetween, thereby continuously increasing/decreasing the aspect ratio of an image to be projected onto the screen SC. A configuration in which the image to be projected onto the screen SC is extended in the horizontal direction using the second group 40 is effective when the screen SC in which the fixed vertical dimension is fixed is used. That is, it becomes possible to change only the aspect ratio without changing the projection distance or the like in the projection optical system 20 with respect to the screen SC.

As described above, according to the projection optical system 20 of this embodiment, the second group 40 is different in power between the vertical and horizontal directions of the liquid crystal panel 18G (18R, 18B), and the projection optical system 20 including the first group 30 is different in focal length between the vertical and horizontal directions as a whole. Accordingly, it is possible to differ the aspect ratio of the image of the liquid crystal panel 18G (18R, 18B) and the aspect ratio of the image projected onto the screen SC. Since a difference in power between the vertical and horizontal directions is provided using the first optical component groups 41 and 42 or 141 and 142 in the second group 40 near the liquid crystal panel 18G (18R, 18B) to change the aspect ratio, it becomes easy to transmit a light beam at each image height along a path comparatively near the image height at a position near the liquid crystal panel 18G (18R, 18B) and to control the light beam, thereby achieving improvement in performance. In the above-described projection optical system 20, since the spread of a light beam is small at a position near the liquid crystal panel 18G (18R, 18B) and a lens is of small size, high-precision lens manufacturing can be expected, resulting in improvement in performance and reduction in costs. It is also possible to correct aberration using the third group 60, thereby significant improvement in performance.

Example 1

Figure 8:
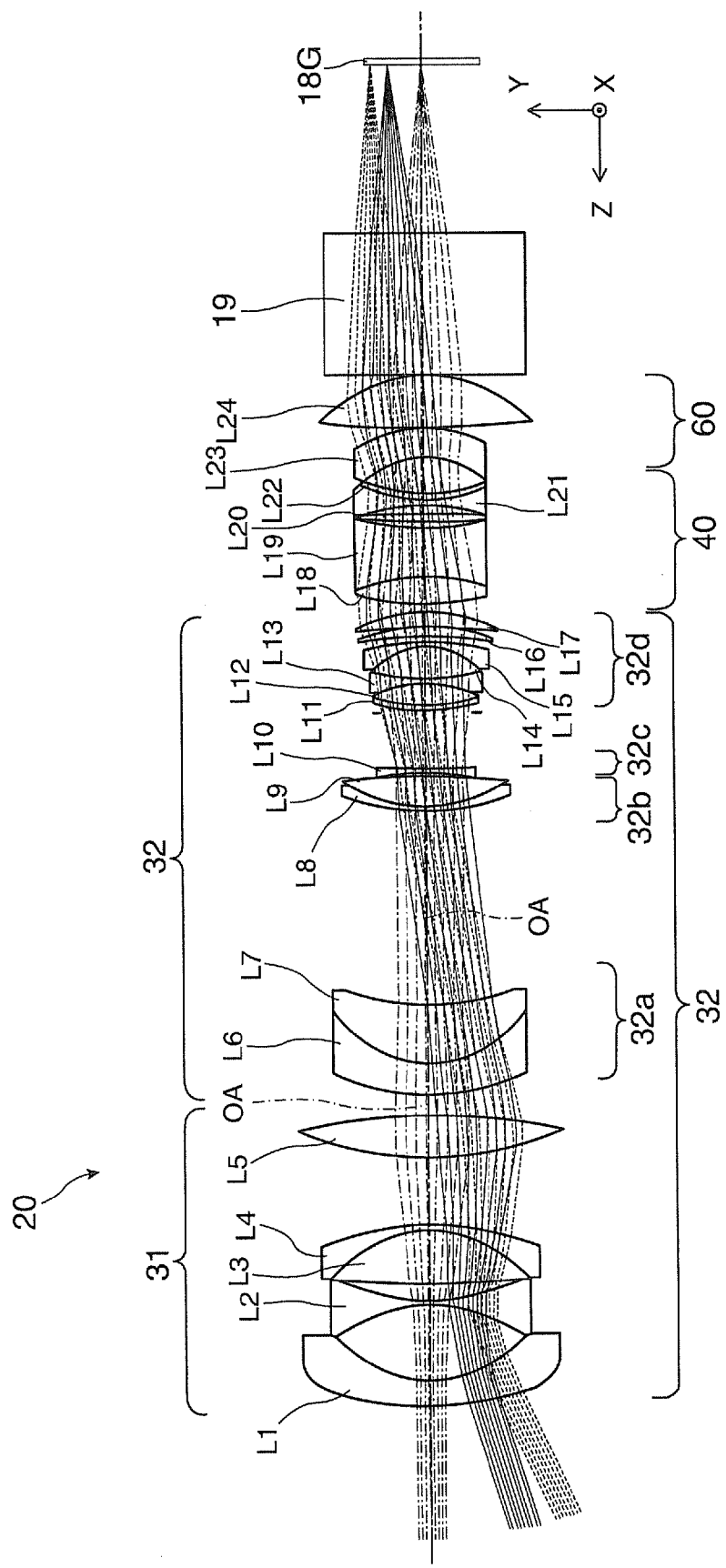
FIG. 8 is a diagram illustrating an optical system of Example 1 of the first embodiment.
Figure 9A:
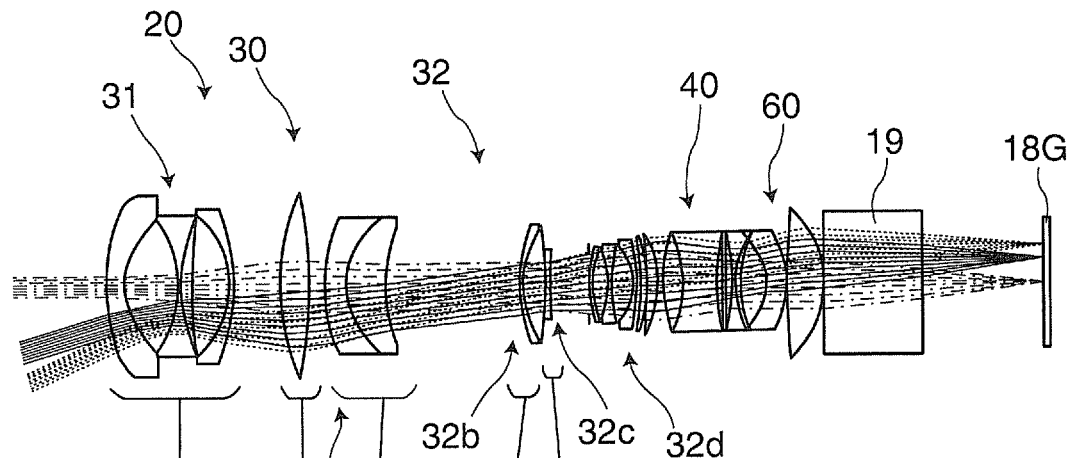
FIGS. 9A to 9C are diagrams showing a zoom operation of the optical system of Example 1 shown in FIG. 8.
Figure 9B:
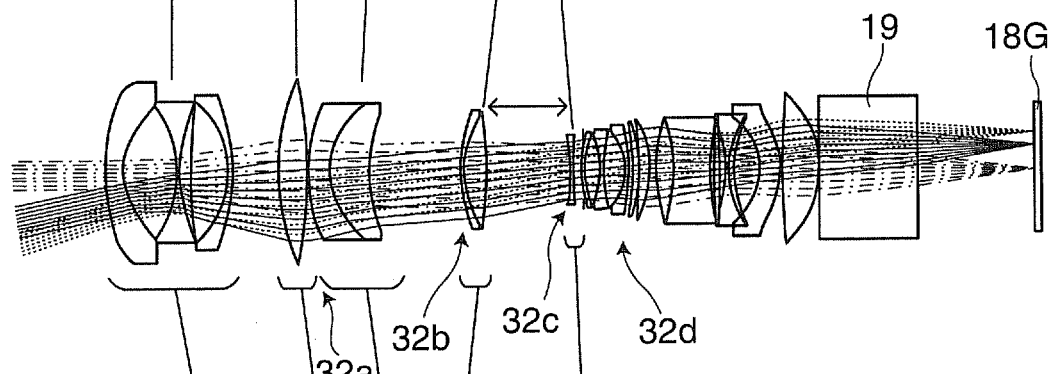
Figure 9C:
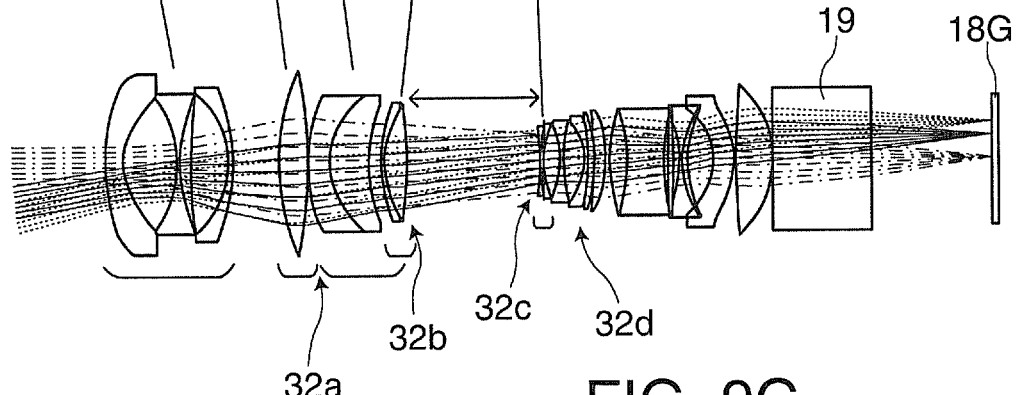

FIG. 8 is a diagram illustrating Example 1 of the projection optical system 20 of the first embodiment. In this case, the projection optical system 20 is in the first operation state where the second group 40 is disposed on the optical path to compress the aspect ratio in the vertical Y direction. In this case, the projection optical system 20 has lenses L1 to L24. Of these, the lenses L1 to L17 form a first group 30, the lenses L18 to L22 form a second group 40, and the lenses L23 and L24 form a third group 60. The lenses L1 to L17 in the first group 30 are spherical lenses which are rotationally symmetrical around the optical axis OA. In the second group 40, a lens in which the cemented lenses L18 and L19 and the lens L20 are combined is a cylindrical lens which has positive power in the vertical Y direction, and has no power in the horizontal X direction. The cemented lenses L21 and L22 are cylindrical lenses which have negative power in the vertical Y direction, and have no power in the horizontal X direction. The lenses L23 and L24 in the third group 60 are lenses which are rotationally symmetrical around the optical axis OA. Of these, the lens L23 is a meniscus lens which is aspheric and has negative power, and the lens L24 is a biconvex lens which is spherical and has positive power. A first lens group 31 having the lenses L1 to L5, the second lens group 32a having the lenses L6 and L7, a third lens group 32b having the lenses L8 and L9, a fourth lens group 32c having the lens L10, and a fifth lens group 32d having the lenses L11 to L17 are displaced along the optical axis OA at the time of changing the projection magnification, that is, at the time of zooming. The lens L1 is an aspheric lens. FIGS. 9A to 9C illustrating a zooming operation. FIG. 9A shows the state of FIG. 8 and "wide end" with a large enlargement ratio. FIG. 9B shows the state of "middle", and FIG. 9C shows "tele end" with a small enlargement ratio. As shown in the drawings, the constituent components of the lens groups 31, 32a, 32b, 32c, and 32d move individually in the optical axis OA direction, and thus, the zooming operation is done.

Lens data and the like of Example 1 are shown in Table 1. In the upper column of Table 1, "surface number" denotes a number which is attached to the surface of each lens in order from an object surface OS. "surface type" denotes classifications, such as aspheric, spherical, and cylindrical. "R1" and "R2" denote Y and X curvature radii, and "D" denotes a lens thickness or air space to the next surface. "Nd" denotes a refractive index of the d line of a lens material, and "νd" denotes an Abbe number of the d line of a lens material. The lenses of Example 1 are zoom lenses, and in the lower column of Table 1, the values of a distance or air space for each surface number of "wide end", "middle", and "tele end" are shown.

TABLE 1

| Surface Number | Name | Surface Type | R1 | R2 | D | Nd | vd |
|---|---|---|---|---|---|---|---|
| Object | | spherical | INFINITY | INFINITY | 2840.0924 | | |
| 1 | L1 | aspheric | 60.6878 | 60.6878 | 6.2267 | 1.492 | 57.2 |
| 2 | | aspheric | 21.7795 | 21.7795 | 19.3829 | | |
| 3 | L2 | spherical | −40.6068 | −40.6068 | 1.2 | 1.785896 | 44.2026 |
| 4 | | spherical | 55.5965 | 55.5965 | 4.0552 | | |
| 5 | L3 | spherical | 202.6616 | 202.6616 | 13.6333 | 1.717362 | 29.5181 |
| 6 | L4 | spherical | −32.4937 | −32.4937 | 1.4677 | 1.743198 | 49.3394 |
| 7 | | spherical | −75.3029 | −75.3029 | 16.8805 | | |
| 8 | L5 | spherical | 84.653 | 84.653 | 10.7368 | 1.72342 | 37.9556 |
| 9 | | spherical | −157.7136 | −157.7136 | 5.2869 | | |
| 10 | L6 | spherical | 58.8224 | 58.8224 | 8.1137 | 1.84666 | 23.7779 |
| 11 | L7 | spherical | 29.3801 | 29.3801 | 14.4539 | 1.647689 | 33.7928 |
| 12 | | spherical | 58.8344 | 58.8344 | 48.9792 | | |
| 13 | L8 | spherical | 60.5068 | 60.5068 | 1.1497 | 1.84666 | 23.7779 |
| 14 | L9 | spherical | 37.0187 | 37.0187 | 7.9419 | 1.496999 | 81.5459 |
| 15 | | spherical | −182.1591 | −182.1591 | 0.7225 | | |
| 16 | L10 | spherical | −60.5897 | −60.5897 | 1.2 | 1.834807 | 42.7137 |
| 17 | | spherical | 222.4971 | 222.4971 | 13.8976 | | |
| 18 | Aperture Stop | spherical | INFINITY | INFINITY | 0.5957 | | |
| 19 | L11 | spherical | 48.7718 | 48.7718 | 1.2 | 1.834807 | 42.7137 |
| 20 | L12 | spherical | 35.4894 | 35.4894 | 5.527 | 1.496999 | 81.5459 |
| 21 | | spherical | −34.8691 | −34.8691 | 0.1 | | |
| 22 | L13 | spherical | −40.0566 | −40.0566 | 1.2 | 1.834807 | 42.7137 |
| 23 | L14 | spherical | 51.7369 | 51.7369 | 7.7757 | 1.496999 | 81.5459 |
| 24 | | spherical | −20.1819 | −20.1819 | 0.1 | | |
| 25 | L15 | spherical | −20.1794 | −20.1794 | 1.2 | 1.785896 | 44.2026 |
| 26 | | spherical | −63.7376 | −63.7376 | 1.5113 | | |
| 27 | L16 | spherical | −89.096 | −89.096 | 2.3006 | 1.568832 | 56.3639 |
| 28 | | spherical | −52.9962 | −52.9962 | 0.1 | | |
| 29 | L17 | spherical | −108.5017 | −108.5017 | 3.7491 | 1.84666 | 23.7779 |
| 30 | | spherical | −39.1166 | −39.1166 | 2 | | |
| 31 | L18 | cylindrical | 59.8584 | INFINITY | 7.0232 | 1.834807 | 42.7137 |
| 32 | L19 | cylindrical | −47.2095 | INFINITY | 12.3597 | 1.698947 | 30.1279 |
| 33 | | cylindrical | 62.1739 | INFINITY | 1.6425 | | |
| 34 | L20 | cylindrical | 268.7677 | INFINITY | 2.0825 | 1.740769 | 27.7894 |
| 35 | | cylindrical | −231.4787 | INFINITY | 2.0251 | | |
| 36 | L21 | cylindrical | −49.2548 | INFINITY | 1.2 | 1.496999 | 81.5459 |
| 37 | L22 | cylindrical | 35.7788 | INFINITY | 1.8595 | 1.84666 | 23.7779 |
| 38 | | cylindrical | 44.0535 | INFINITY | 9.1536 | | |
| 39 | L23 | aspheric | −20.1505 | −20.1505 | 7.4381 | 1.492 | 57.2 |
| 40 | | aspheric | −27.8825 | −27.8825 | 0.1 | | |
| 41 | L24 | spherical | 285.7501 | 285.7501 | 13.1748 | 1.496999 | 81.5459 |
| 42 | | spherical | −37.0021 | −37.0021 | 0.1018 | | |
| 43 | 19 | spherical | INFINITY | INFINITY | 36 | 1.51633 | 64.142 |
| 44 | | spherical | INFINITY | INFINITY | 42 | | |
| Image Surface | | | | | 0.9345 | | |

Aspheric Coefficient

| | 1st surface | 2nd surface | 39th surface | 40th surface |
|---|---|---|---|---|
| Y curvature radius | 60.68777342 | 21.77946556 | −20.15048648 | −27.8825131 |
| conic constant | 2.437320446 | −0.985083801 | −1.47309997 | −3.63925733 |
| 4th-order coefficient | −1.5919E−05 | −1.8689E−05 | −1.4043E−05 | −1.3588E−05 |
| 6th-order coefficient | 3.1913E−08 | 4.0456E−08 | 1.9945E−08 | 3.6180E−08 |
| 8th-order coefficient | −4.1839E−11 | −4.0235E−11 | −4.1869E−12 | −3.2607E−11 |
| 10th-order coefficient | 3.0835E−14 | −9.5374E−15 | 2.5715E−14 | 3.9850E−14 |
| 12th-order coefficient | −9.5598E−18 | 4.8128E−17 | −7.2179E−17 | −3.0398E−17 |

Zoom

| | Object | 9th surface | 12th surface | 15th surface | 17th surface | 18th surface | 26th surface |
|---|---|---|---|---|---|---|---|
| Z1 Wide | 2840.092357 | 5.286930472 | 48.97923871 | 0.722452229 | 13.89756997 | 0.595681021 | 1.511257917 |
| Z2 Middle | 3994.64528 | 0 | 33.36126139 | 30.60718519 | 3.449306294 | −0.683404475 | 1.967707687 |
| Z3 Tele | 5152.581463 | 0 | 4.492916377 | 48.62576581 | 0.305841042 | −1.282593682 | 0.1 |

The lenses L1 and L23 of Example 1 are formed in an aspheric shape as described above. A displacement h from a surface vertex in the optical axis OA direction of the aspheric shape is represented with the above-described aspheric expression or polynomial expression.

$$h = \frac{cy^2}{1 + \sqrt{1 - (1+k)c^2 y^2}} + A_2 y^2 + A_4 y^4 + A_6 y^6 + A_8 y^8 + A_{10} y^{10} + \ldots$$

In Example 1, the values of the coefficients k A2, A4, A6, A8, A10, . . . of the above-described aspheric expression in the surface of each surface number corresponding to the lenses L1 and L23 are as shown in the middle column of Table 1.

The lower column of Table 1 shows the positions of the lens groups 32a, 32b, 32c, and 32d of the second lens unit 32 during the zooming operation, specifically, the positions of the lenses L6 and L7 of one group, the positions of the lenses L8 and L9 of the next group, the position of the next lens L10, and the positions of an aperture stop and the lenses L11 to L15 of one group.

Figure 10:
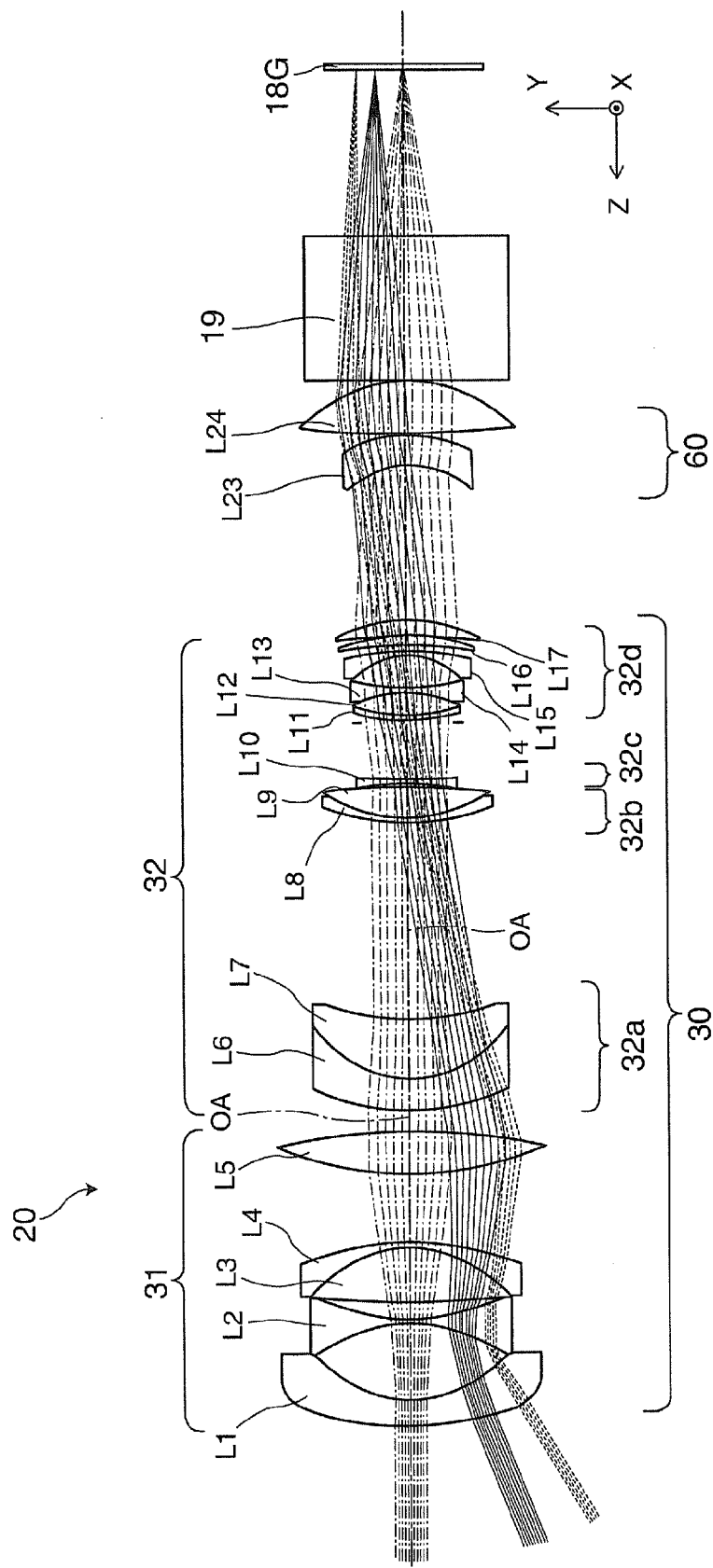
FIG. 10 is a diagram illustrating a state where a second group is removed from the optical system of Example 1 shown in FIG. 8.
Figure 11A:
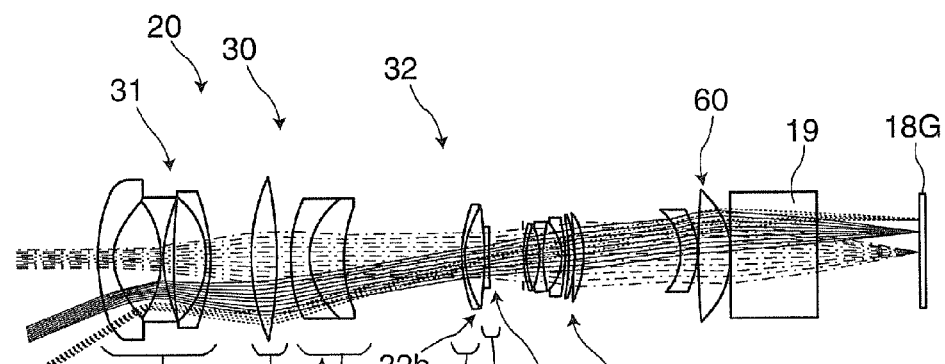
FIGS. 11A to 11C are diagrams showing a zoom operation of the optical system shown in FIG. 10.
Figure 11B:
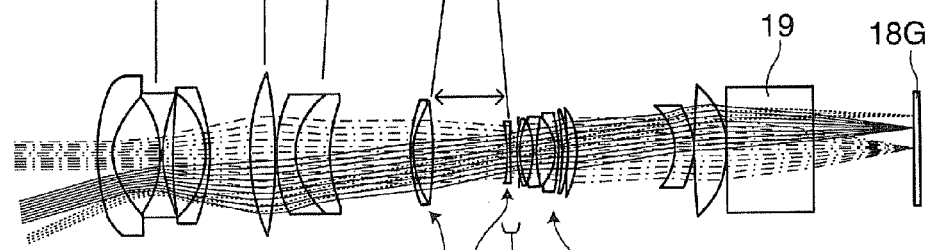
Figure 11C:
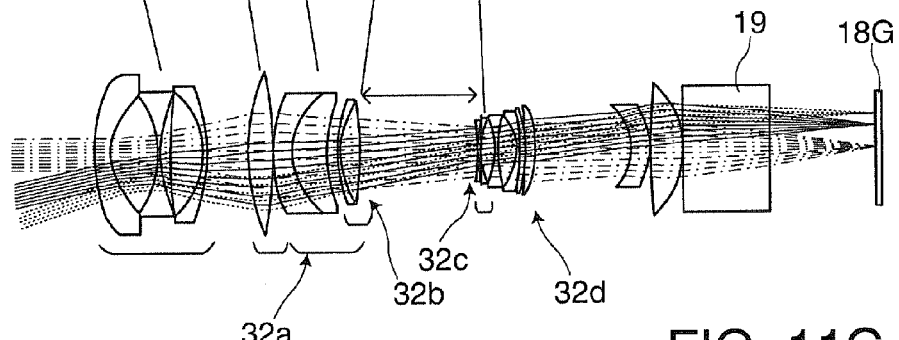

FIG. 10 shows a case where the second group 40 is retreated outside the optical path from the body portion 20a of the projection optical system 20, and the projection optical system 20 is in the second operation state where the aspect ratio is not converted. FIGS. 11A to 11C are diagrams showing a zooming operation when the second group 40 is retreated outside the optical path, that is, the states of "wide end", "middle", and "tele end".

Second Embodiment

Hereinafter, a projection optical system or the like according to a second embodiment will be described. This embodiment is a modification of the projection optical system or the like of the first embodiment, and portions or matters which will not be particularly described are the same as those in the first embodiment.

FIGS. 12A and 12B are diagrams illustrating a longitudinal section of a projection optical system 20 according to the second embodiment. In this embodiment, the second group 40 of the projection optical system 20 is advanced and retreated on the optical path, and when the second group 40 for aspect ratio conversion is retreated from the optical path, an alternative optical element 240 which is a flat plate of no power is inserted on the optical path. The alternative optical element 240 has, for example, one plate-shaped member 241, but may have two or more plate-shaped members. The plate-shaped member 241 has no refractive power but has high transparency, and plays a role in adjusting the optical path length using refractive index. Similarly to the second group 40, the alternative optical element 240 is driven by the first anamorphic driving mechanism 62, and advanced and retreated on the optical path. That is, the second group 40 and the alternative optical element 240 are selectively disposed on the optical path using the first anamorphic driving mechanism 62.

If the second group 40 is retreated from the optical path, the optical path length changes, the image-forming relationship between the object surface of the projection optical system 20 and the image surface is collapsed, and an image is formed, for example, short of the screen SC. For this reason, in this embodiment, when retreating the second group 40 from the optical path, the alternative optical element 240 having no refractive index is inserted into this space to adjust the optical path length, thereby eliminating deviation in the image-forming relationship between the screen SC and the liquid crystal panel 18G (18R, 18B). The plate-shaped member 241 having no refractive index should be equivalent to the second group 40 in terms of the optical path length, and when the refractive index of the plate-shaped member 241 is np, and the thickness of the plate-shaped member 241 in the optical axis OA direction is dp, it is desirable that the following relationship is established.

$$np \times dp = \Sigma(ni \times di)$$

ni: the refractive index of each lens forming the second group 40 di: the thickness in the optical axis OA direction of each lens forming the second group 40 i: the number of a lens in the second group 40

When the alternative optical element 240 is disposed on the optical path instead of the second group 40, if a material for the alternative optical element 240 is appropriately selected, it is possible to keep the change in transmittance small before and after the second group 40 and the alternative optical element 240 are replaced, and it is not necessary to adjust the brightness of an image before and after replacement. If the material for the alternative optical element 240 is appropriately selected, it is possible to reduce the difference in chromatic aberration at the time of replacement. It is also possible to eliminate deviation of the image-forming surface due to the advancement and retreatment of the second group 40.

Although in the above description, the second group 40 which is advanced and retreated on the optical path is the same as that of FIG. 4B, the second group 40 may be the same as the second group 140 of FIG. 7A.

Third Embodiment

Hereinafter, a projection optical system or the like according to a third embodiment will be described. This embodiment is a modification of the projection optical system or the like of the first embodiment, and portions or matters which will not be particularly described are the same as those in the first embodiment.

FIGS. 13A and 13B are diagrams illustrating a longitudinal section of a projection optical system 20 according to the third embodiment. In this embodiment, two kinds of second groups 40 and 340 can be selectively advanced and retreated on the optical path. That is, the power of optical component groups 41 and 42 forming a first kind of second group (second group unit) 40 differs from the power of optical component groups 341 and 342 forming a second kind of second group (second group unit) 340, and the second groups 40 and 340 are replaced, such that the aspect ratio of an image to be projected onto the screen SC can be changed in two steps based on an image which is formed on the liquid crystal panel 18G (18R, 18B). Specifically, when the aspect ratio of an image which is formed on the liquid crystal panel 18G (18R, 18B) is, for example, 1.78:1, the first kind of second group 40 is inserted on the optical path to convert the aspect ratio of an image to be formed on the screen SC to, for example, 2.4:1, and the second kind of second group 340 is inserted on the optical path to convert the aspect ratio of an image formed on the screen SC to, for example, 1.85:1.

Although in the third embodiment, the second groups 40 and 340 have the configuration shown in FIG. 4B, one or both of the second groups 40 and 340 may be replaced with a lens group of a type to be extended horizontally like the second group 140 shown in FIG. 7A. Although in the third embodiment, two kinds of second groups 40 and 340 are disposed replaceably on the optical path, three or more kinds of second groups may be disposed switchingly on the optical path.

Fourth Embodiment

Hereinafter, a projection optical system or the like according to a fourth embodiment will be described. This embodiment is a modification of the projection optical system or the like of the first embodiment, and portions or matters which will not be particularly described are the same as those in the first embodiment.

Figure 14:
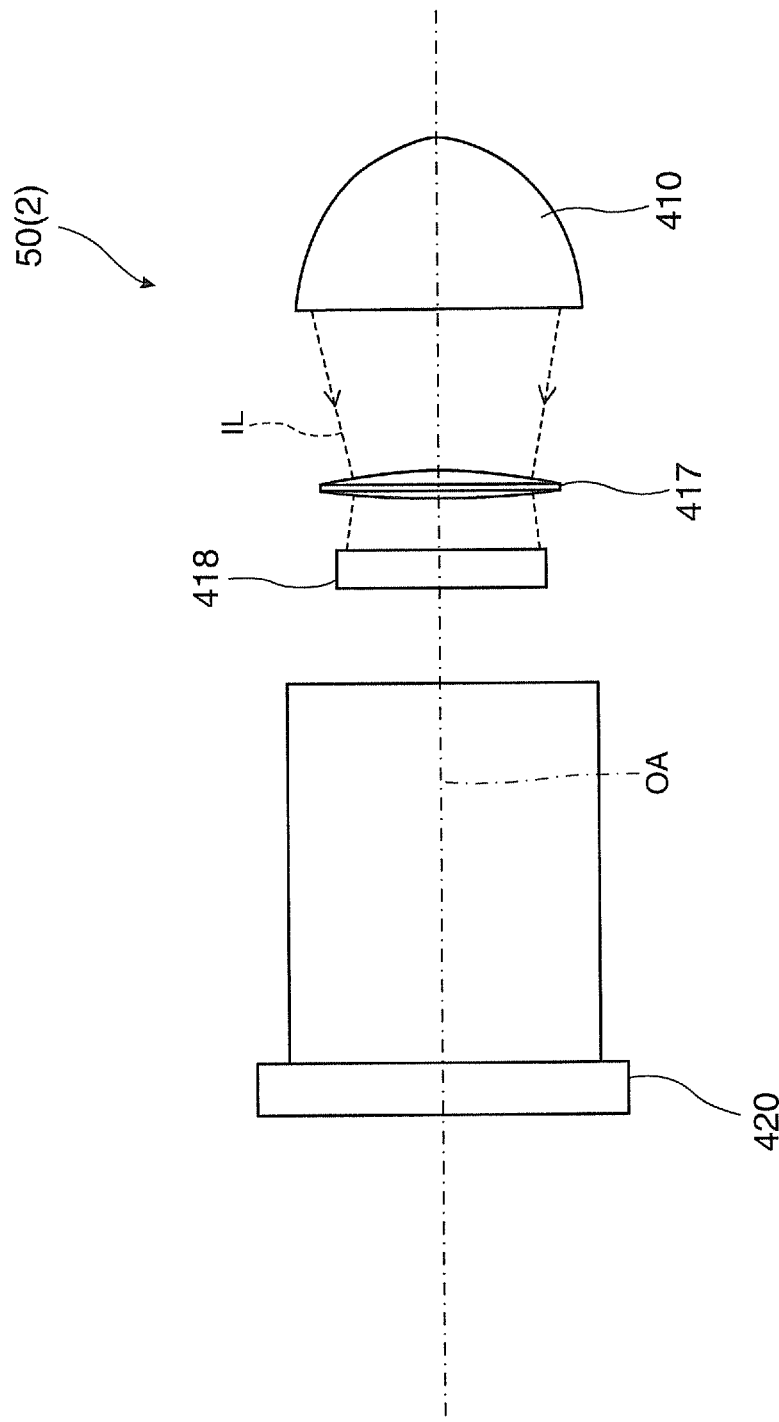
FIG. 14 is a diagram showing the schematic configuration of a projector according to a fourth embodiment.

As shown in FIG. 14, the optical system portion 50 of the projector 2 includes a light source 410 for illumination, a lens 417 for light beam adjustment, a liquid crystal panel 418 which is an optical modulator, and a projection optical system 420 for enlarged projection. The light source 410 is formed of an extra-high pressure mercury lamp or the like, and emits light including an R light component, a G light component, and a B light component. The lens 417 adjusts the input angle of illumination light IL from the light source 410 to the liquid crystal panel 418. The liquid crystal panel 418 spatially modulates the illumination light IL from the light source 410, and a color filter is disposed in each pixel, and each pixel performs color display alone.

As shown in FIGS. 15A and 15B, as in the first embodiment, the projection optical system 420 includes, a first group 30, a second group 40, and a third group 60 as a body portion 20a. The first group 30 has a first lens group 31 which is a first lens unit, and a second lens unit 32. The second group 40 includes a first optical component group 41 which has positive power only in the vertical Y direction and a second optical component group 42 which has negative power only in the vertical Y direction. The second group 40 is different in focal length between the vertical direction and the horizontal direction, and as a result, the projection optical system 420 including the first group 30 is different in focal length between the vertical direction and the horizontal direction as a whole.

In the case of the projection optical system 420 of this embodiment, since the cross dichroic prism 19 for light composition shown in FIG. 2 is not required, it is possible to comparatively shorten the back focus of the projection optical system 420. Since there is no cross dichroic prism 19 for light composition, even when the projection optical system 420 is not telecentric on the object side, that is, the liquid crystal panel 418 side, it is possible to suppress deterioration of an image to be projected comparatively small.

Example 2

Figure 16:
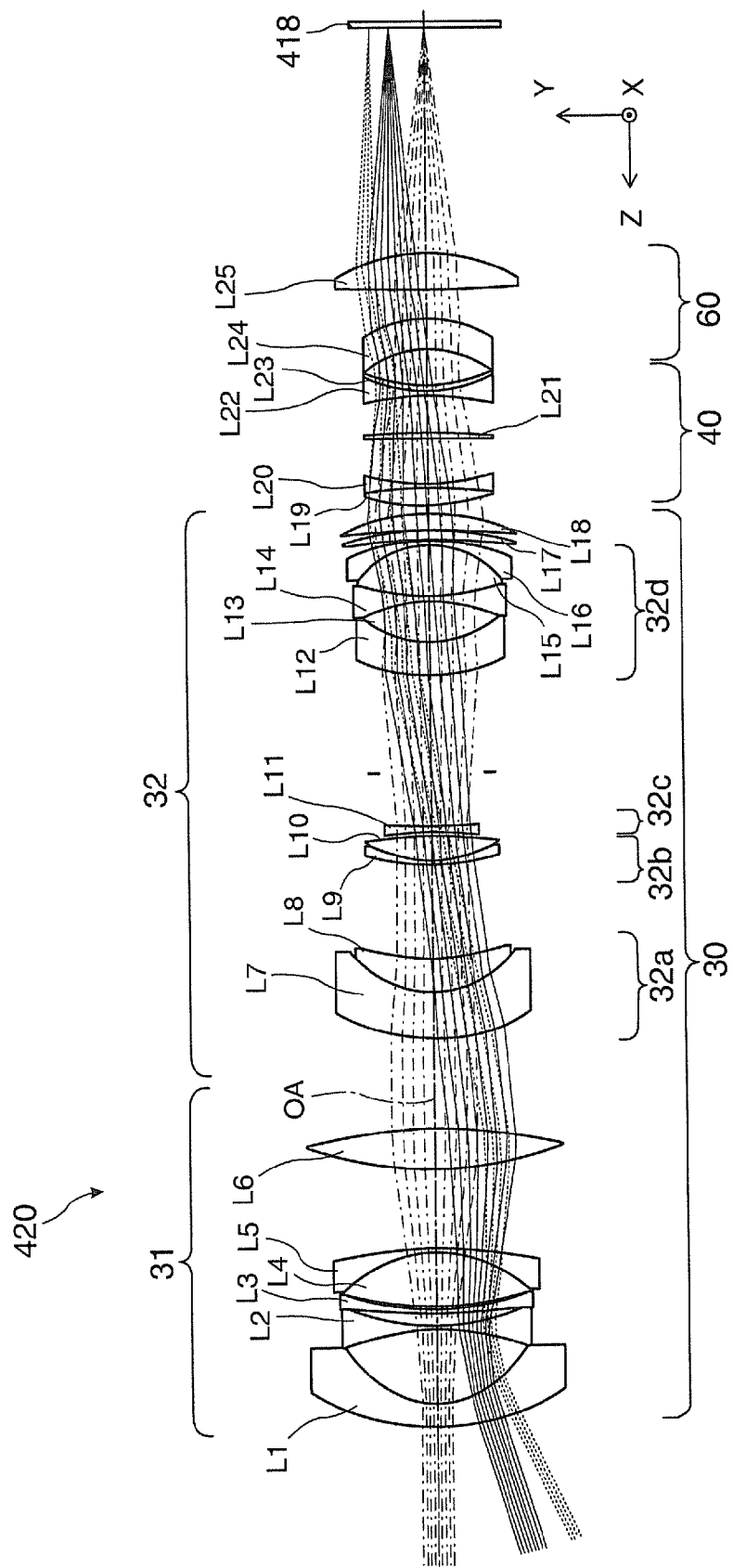
FIG. 16 is a diagram illustrating an optical system of Example 2 of the fourth embodiment.
Figure 17A:
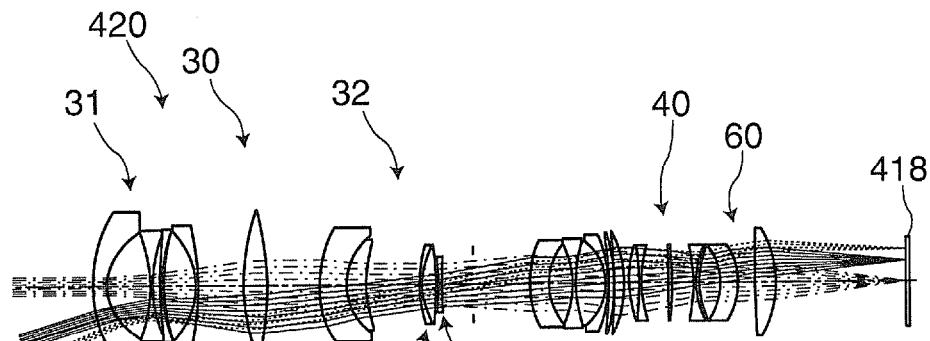
FIGS. 17A to 17C are diagrams showing a zoom operation of the optical system of Example 2 shown in FIG. 16.
Figure 17B:
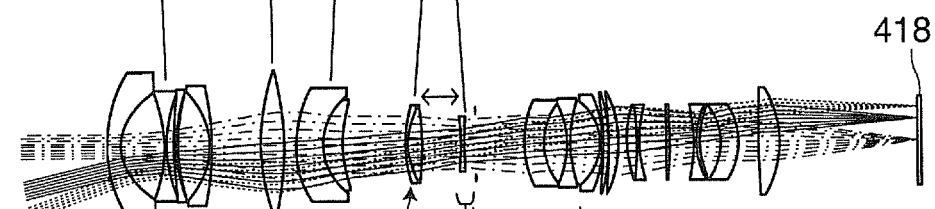
Figure 17C:
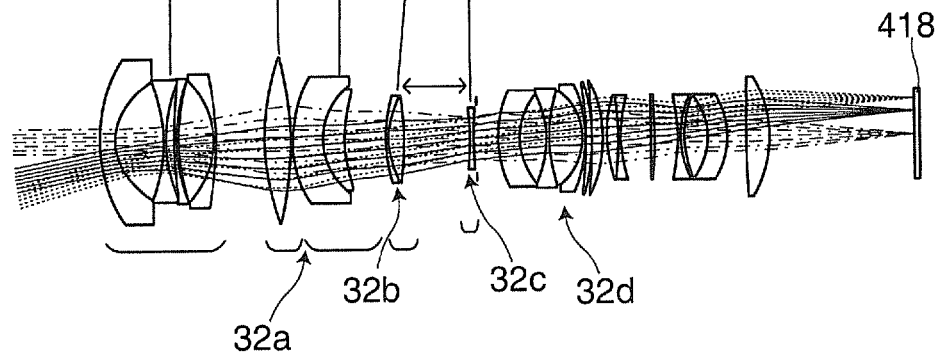

FIG. 16 is a diagram illustrating Example 2 of the projection optical system 420 of the fourth embodiment. In this case, the projection optical system 420 is in the first operation state where the second group 40 is disposed on the optical path to compress the aspect ratio in the vertical Y direction. In this case, the projection optical system 420 has lenses L1 to L25. Of these, the lenses L1 to L18 form a first group 30, the lenses L19 to L23 form a second group 40, and the lenses L24 and L25 form a third group 60. The lenses L1 to L18 in the first group 30 are lenses which are rotationally symmetrical around the optical axis OA. In the second group 40, a lens in which the cemented lenses L19 and L20 and the lens L21 are combined is a cylindrical lens which has positive power in the vertical Y direction and has no power in the horizontal X direction. The cemented lenses L22 and L23 are cylindrical lenses which have negative power in the vertical Y direction and have no power in the horizontal X direction. The lenses L24 and L25 in the third group 60 are lenses which are rotationally symmetrical around the optical axis OA. Of these, the lens L24 is a meniscus lens which is aspheric and has negative power, and the lens L25 is a biconvex lens which is spherical and has positive power. A first lens group 31 having the lenses L1 to L6, a second lens group 32a having the lenses L7 and L8, a third lens group 32b having the lenses L9 and L10, a fourth lens group 32c having the lens L11, and a fifth lens group 32d having the lenses L12 to L18 are displaced along the optical axis OA at the time of changing the projection magnification, that is, at the time of zooming. FIGS. 17A to 17C show a zooming operation. FIG. 17A shows the state of FIG. 16 and "wide end" with a large enlargement ratio. FIG. 17B shows the state of "middle", and FIG. 17C shows "tele end" with a small enlargement ratio. As shown in the drawings, the constituent components of the lens groups 31, 32a, 32b, 32c, and 32d move individually in the optical axis OA direction, and thus, the zooming operation is done.

Lens data and the like of Example 2 are shown in Table 2. In Table 2, "surface number", "surface type", "R1", "R2", "D", "Nd", and "vd" mean the same as those in Example 1.

TABLE 2

| Surface Number | Name | Surface Type | R1 | R2 | D | Nd | vd |
|---|---|---|---|---|---|---|---|
| Object | | spherical | INFINITY | INFINITY | 2840.0924 | | |
| 1 | L1 | aspheric | 48.1426 | 48.1426 | 5.587 | 1.492 | 57.2 |
| 2 | | aspheric | 18.7298 | 18.7298 | 18.0918 | | |
| 3 | L2 | spherical | −61.4397 | −61.4397 | 1.0164 | 1.799641 | 45.0211 |
| 4 | | spherical | 57.2284 | 57.2284 | 3.0088 | | |
| 5 | L3 | spherical | 188.5961 | 188.5961 | 1 | 1.834807 | 42.7137 |
| 6 | | spherical | 65.247 | 65.247 | 0.7237 | | |
| 7 | L4 | spherical | 79.457 | 79.457 | 12.9907 | 1.696954 | 30.3401 |
| 8 | L5 | spherical | −32.5509 | −32.5509 | 1 | 1.718499 | 52.6456 |
| 9 | | spherical | −114.1495 | −114.1495 | 19.2755 | | |
| 10 | L6 | spherical | 91.7563 | 91.7563 | 9.7545 | 1.726244 | 37.6791 |
| 11 | | spherical | −129.0895 | −129.0895 | 21.9453 | | |
| 12 | L7 | spherical | 47.599 | 47.599 | 11.4023 | 1.84666 | 23.7779 |
| 13 | L8 | spherical | 25.5553 | 25.5553 | 8.078 | 1.63211 | 36.1238 |
| 14 | | spherical | 56.7294 | 56.7294 | 22.6687 | | |
| 15 | L9 | spherical | 58.1855 | 58.1855 | 1 | 1.845962 | 24.4068 |
| 16 | L10 | spherical | 31.9556 | 31.9556 | 5.9328 | 1.496999 | 81.5459 |
| 17 | | spherical | −126.0118 | −126.0118 | 0.9514 | | |
| 18 | L11 | spherical | −77.0021 | −77.0021 | 1.248 | 1.771382 | 47.2405 |
| 19 | | spherical | 102.3377 | 102.3377 | 13.0569 | | |
| 20 | Aperture stop | spherical | INFINITY | INFINITY | 23.9086 | | |

TABLE 2-continued

| | | | | | | | |
|---|---|---|---|---|---|---|---|
| 21 | L12 | spherical | 44.1983 | 44.1983 | 7.9303 | 1.831117 | 34.3458 |
| 22 | L13 | spherical | 27.5124 | 27.5124 | 9.832 | 1.497936 | 80.6531 |
| 23 | | spherical | −35.2977 | −35.2977 | 0.1 | | |
| 24 | L14 | spherical | −36.7788 | −36.7788 | 1 | 1.834011 | 42.1867 |
| 25 | L15 | spherical | 51.7688 | 51.7688 | 12.4354 | 1.497806 | 80.776 |
| 26 | | spherical | −22.3155 | −22.3155 | 0.2998 | | |
| 27 | L16 | spherical | −22.0978 | −22.0978 | 1 | 1.700259 | 55.0382 |
| 28 | | spherical | −50.4675 | −50.4675 | 0.3008 | | |
| 29 | L17 | aspheric | −150.8121 | −150.8121 | 2.166 | 1.492 | 57.2 |
| 30 | | aspheric | −88.6508 | −88.6508 | 0.1384 | | |
| 31 | L18 | spherical | −163.8661 | −163.8661 | 3.9469 | 1.84666 | 23.7779 |
| 32 | | spherical | −49.7968 | −49.7968 | 2 | | |
| 33 | L19 | cylindrical | 49.8918 | INFINITY | 4.2666 | 1.824945 | 43.3172 |
| 34 | L20 | cylindrical | −112.1749 | INFINITY | 1 | 1.711955 | 29.562 |
| 35 | | cylindrical | 57.6284 | INFINITY | 11.017 | | |
| 36 | L21 | cylindrical | 1087.9124 | INFINITY | 1.4536 | 1.818062 | 24.6455 |
| 37 | | cylindrical | −221.3557 | INFINITY | 9.2018 | | |
| 38 | L22 | cylindrical | −66.0532 | INFINITY | 1 | 1.49947 | 79.6499 |
| 39 | L23 | cylindrical | 34.5786 | INFINITY | 1.4129 | 1.84666 | 23.7779 |
| 40 | | cylindrical | 41.637 | INFINITY | 9 | | |
| 41 | L24 | aspheric | −23.0306 | −23.0306 | 7.3532 | 1.492 | 57.2 |
| 42 | | aspheric | −26.6339 | −26.6339 | 7.0332 | | |
| 43 | L25 | spherical | 528.5619 | 528.5619 | 8.9058 | 1.502001 | 77.0309 |
| 44 | | spherical | −46.4685 | −46.4685 | 53.7642 | | |
| Image Surface | | | | | 0.8018 | | |

Aspheric Coefficient

| | 1st surface | 2nd surface | 29th surface | 30th surface | 41st surface | 42nd surface |
|---|---|---|---|---|---|---|
| Y curvature radius | 48.1425793 | 18.72977828 | −150.8120648 | −88.6507618 | −23.0306445 | −26.63390791 |
| conic constant | 0.413973515 | −0.875469411 | 10.80935849 | −12.3630701 | −1.41122022 | −3.053084979 |
| 4th-order coefficient | −1.5585E−05 | −1.6503E−05 | −2.8456E−06 | −6.4096E−06 | −1.4229E−05 | −1.7404E−05 |
| 6th-order coefficient | 3.2296E−08 | 3.4477E−08 | 6.0952E−09 | 5.6962E−09 | 1.4720E−08 | 2.7274E−08 |
| 8th-order coefficient | −3.9285E−11 | 9.7648E−12 | −4.2751E−12 | −6.0517E−12 | −2.9438E−11 | −3.7481E−11 |
| 10th-order coefficient | 2.6475E−14 | −1.0350E−13 | 2.4585E−15 | 4.0954E−15 | 1.2667E−13 | 7.3125E−14 |
| 12th-order coefficient | −7.1677E−18 | 1.3115E−16 | 0.0000E+00 | 0.0000E+00 | −1.3531E−16 | −5.3804E−17 |

Zoom

| | object | 11th surface | 14th surface | 17th surface | 19th surface | 20th surface | 28th surface |
|---|---|---|---|---|---|---|---|
| Z1 Wide | 2840.092357 | 21.94533551 | 22.66871845 | 0.9514 | 13.05694982 | 23.90858028 | 0.300782631 |
| Z2 Middle | 3705.083243 | 4.033021583 | 24.83138591 | 16.0128 | 4.159160268 | 19.10336947 | 0.445192663 |
| Z3 Tele | 4573.445715 | 0.797921914 | 15.97935075 | 25.9446 | 0.972444401 | 8.781874307 | 0.1 |

In the middle column of Table 2, in regard to the lenses L1, L17, and L24 which form the projection optical system of Example 2, an aspheric shape is shown. In the lower column of Table 2, the values of a distance or air space for each surface number of "wide end", "middle", and "tele end" of the lenses L7 to L16 forming the projection optical system of Example 2 is shown.

Figure 18:
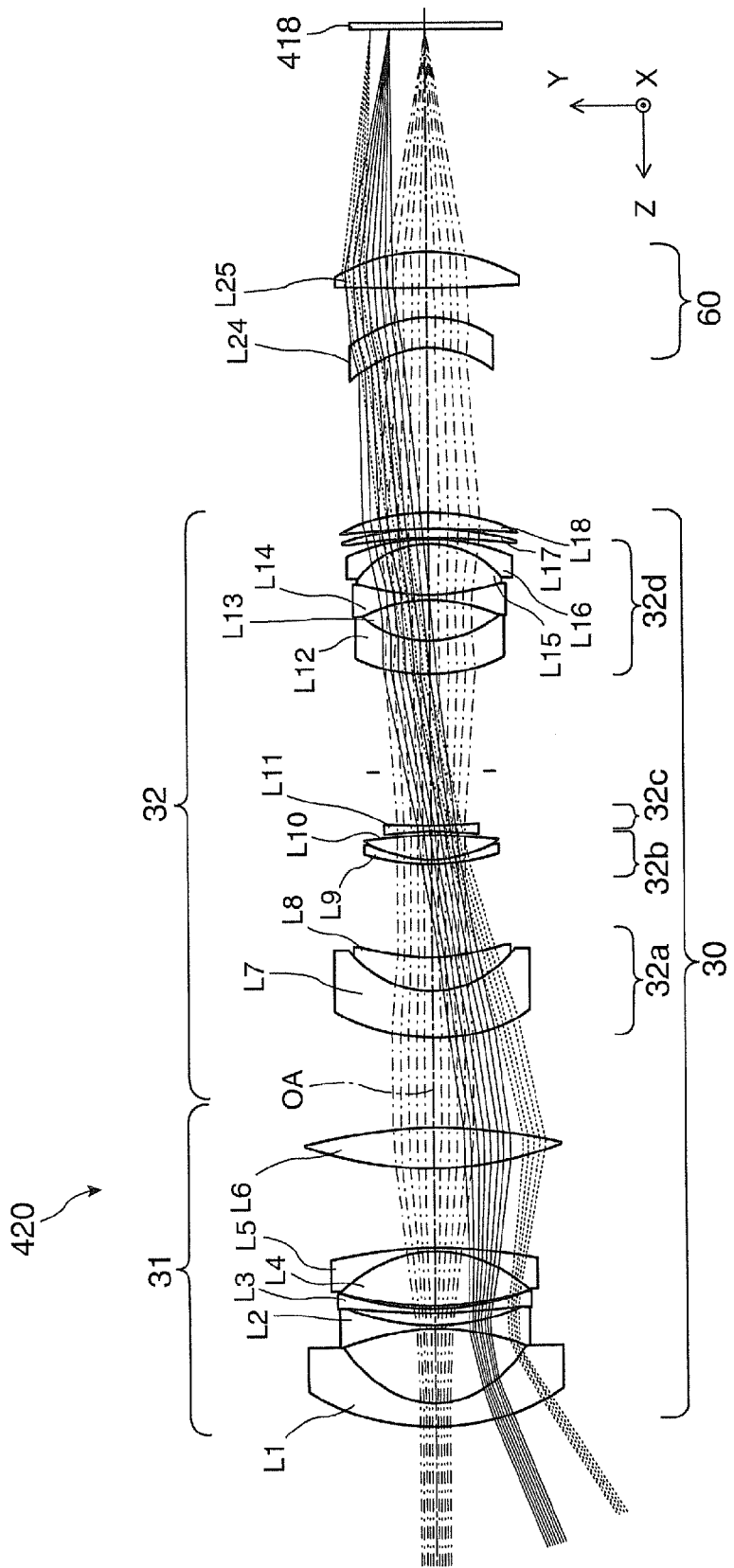
FIG. 18 is a diagram illustrating a state where a second group is removed from the optical system of Example 2 shown in FIG. 16.
Figure 19A:
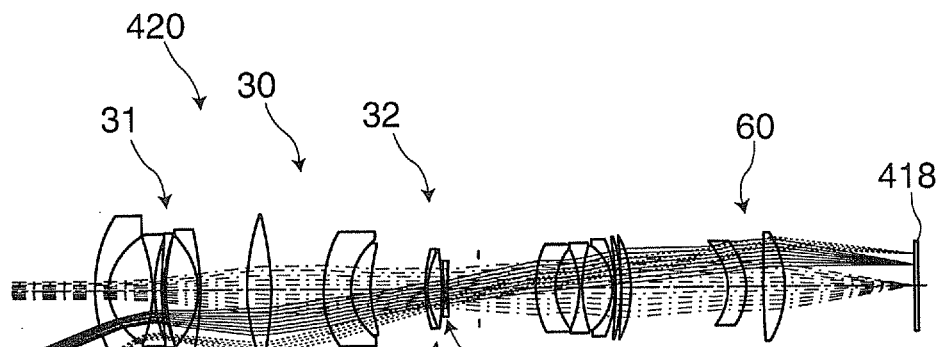
FIGS. 19A to 19C are diagrams showing a zoom operation of the optical system shown in FIG. 18.
Figure 19B:
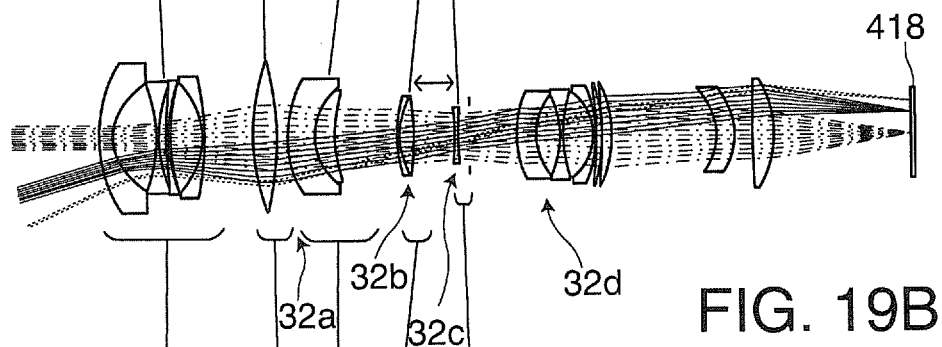
Figure 19C:
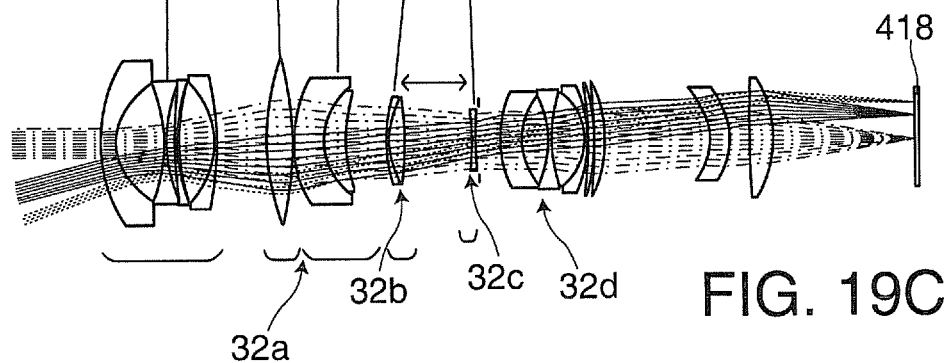

FIG. 18 shows a case where the second group 40 is retreated outside the optical path from the body portion 20a of the projection optical system 420, and the projection optical system 420 is in the second operation state where the aspect ratio is not converted. FIGS. 19A to 19C are diagrams showing a zooming operation when the second group 40 is retreated outside the optical path, that is, the states of "wide end", "middle", and "tele end".

Fifth Embodiment

Hereinafter, a projection optical system or the like according to a fifth embodiment will be described. This embodiment is a modification of the projection optical system or the like of the first embodiment, and portions or matters which will not be particularly described are the same as those in the first embodiment.

As shown in FIGS. 20A and 20B, in the projection optical system of this embodiment, a second group 40 has a first optical component group 41, a second optical component group 42, and a third optical component group 543. In this case, while the first and second optical component groups 41 and 42 are rotationally asymmetrical around the optical axis OA and have power only in the section along the vertical direction (Y direction), the third optical component group 543 is rotationally symmetrical around the optical axis OA and has the same power in the section along the horizontal direction (X direction) and the section along the vertical direction (Y direction). That is, the second group 40 includes one or more rotationally asymmetrical lenses in the first and second optical component groups 41 and 42 as at least a part of adjustment optical components, and further includes one or more rotationally symmetrical lenses in the third optical component group 543. Accordingly, it is possible to simply suppress astigmatism or the like, which has not been suppressed using the second lens unit 32 as the variable magnification optical system of the first group 30, on the second group 543 near the liquid crystal panels 18G, 18R, and 18B. A lens or an optical component group which is rotationally symmetrical and has the same power in the longitudinal and cross sections may be embedded in the second group 140 of FIG. 7A, the second groups 40 and 340 of FIGS. 13A and 13B, and the like.

Sixth Embodiment

Hereinafter, a projection optical system or the like according to a sixth embodiment will be described. This embodiment is a modification of the projection optical system or the like of the first embodiment, and portions or matters which will not be particularly described are the same as those in the first embodiment.

Figure 21:
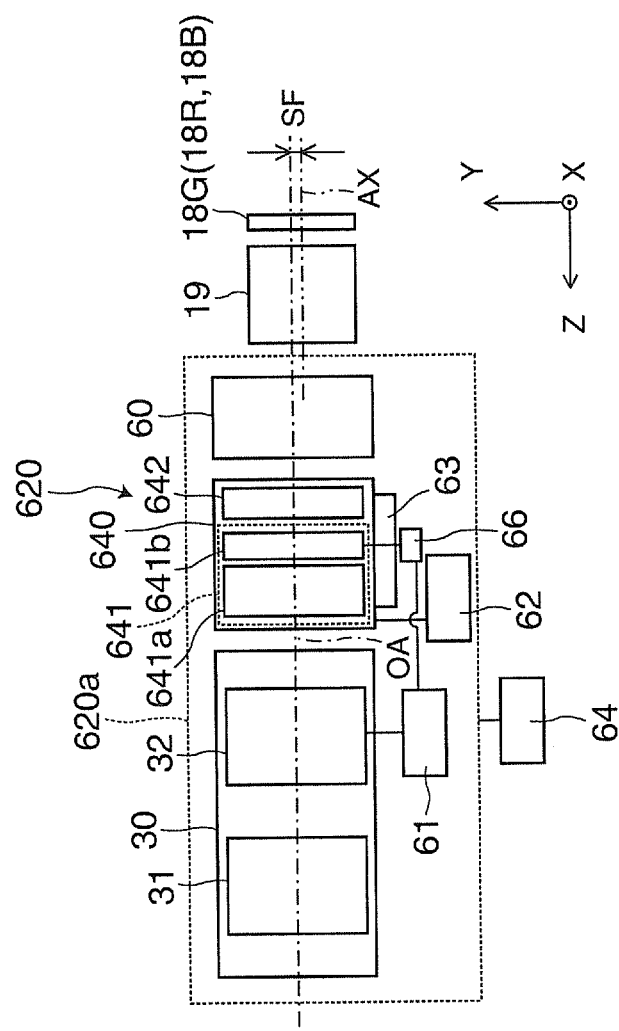
FIG. 21 is a diagram illustrating the structure of a projection optical system of a projector according to a sixth embodiment.

As shown in FIG. 21, a projection optical system 620 of this embodiment has a driving mechanism 66 which allows a part of optical components forming a second group 640 to move in the optical axis direction, that is, in the Z direction. The driving mechanism 66 is operable in conjunction with the driving mechanism 61.

In general, in a projection optical system, it is not easy to efficiently suppress all kinds of aberrations, such as astigmatism. In particular, in the case of a projection optical system having an anamorphic optical system, various kinds of aberrations, such as astigmatism, are apt to occur due to a difference in power between the vertical direction (Y direction) and the horizontal direction (X direction). In this embodiment, the driving mechanism 66 is provided in the projection optical system 620, and thus, a movable optical component which moves in the optical axis direction, that is, in the Z direction is included in the second group 640 which is an anamorphic optical system. Therefore, it is possible to efficiently reduce the occurrence of astigmatism or the like in the second group 640.

As shown in FIG. 22A, in a body portion 620*a* of the second group 640, the second group 640 has a first optical component group 641 and a second optical component group 642 which are adjustment optical components. The first optical component group 641 has a first partial group 641*a* of negative power and a second partial group 641*b* of positive power. In other words, the second group 640 has three component groups of a first partial group 641*a*, a second partial group 641*b*, and a second optical component group 642 as a third partial group. The first optical component group 641 having the first partial group 641*a* and the second partial group 641*b* has positive power as a whole, and the second optical component group 642 has negative power as a whole.

In this embodiment, in the second group 640 having the above configuration, an optical component which is included in the second partial group 641*b* of positive power is a movable optical component which is moved in the optical axis direction by the driving mechanism 66 (see FIG. 21). With the movement of the movable optical component, it becomes possible to suppress an astigmatic difference, that is, to correct astigmatism.

As shown in FIGS. 22A and 22B, the second group 640 is configured to be advanced and retreated in the projection optical system 620.

Example 3

Figure 23:
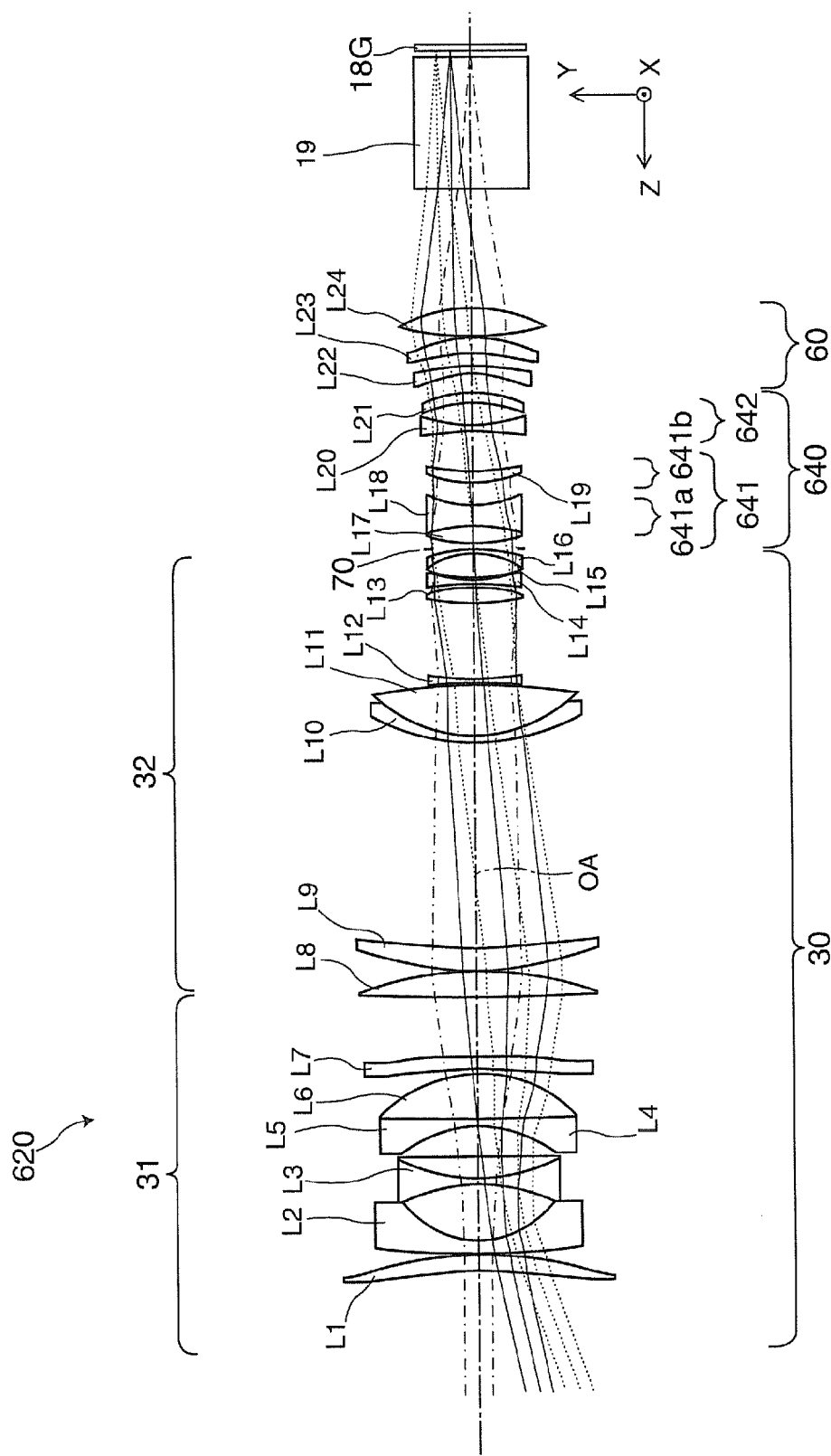
FIG. 23 is a diagram illustrating an optical system of Example 3 of the sixth embodiment.

FIG. 23 is a diagram illustrating Example 3 of the projection optical system 620 of sixth embodiment. In this case, the projection optical system 620 is in the first operation state where the second group 640 is disposed on the optical path to compress the aspect ratio in the vertical Y direction. The projection optical system 620 has lenses L1 to L24 in order from the projection surface. Of these, the lenses L1 to L16 form a first group 30, the lenses L17 to L21 form a second group 640, and the lenses L22 to L24 form a third group 60. In the second group 640, the lenses L17 and L18 forms a first partial group 641*a* which is a part of a first optical component group 641, the lens L19 forms a second partial group 641*b* which is the rest of the first optical component group 641, and the lenses L20 and L21 form a second optical component group 642 as a third partial group. The first partial group 641*a* has negative power as a whole, the second partial group 641*b* including a movable optical component has positive power, and the second optical component group 642 which is the third partial group has negative power as a whole. A first optical component group 641 which is a lens group formed by combining the first partial group 641*a* and the second partial group 641*b* has positive power as a whole.

The lenses L1 to L16 in the first group 30 are lenses which are rotationally symmetrical around the optical axis OA. In the second group 640, a lens in which the cemented lenses L17 and L18 and the lens L19 are combined is a cylindrical lens which has positive power in the vertical Y direction, and has no power in the horizontal X direction. The lens L20 is a cylindrical lens which has negative power in the vertical Y direction, and has no power in the horizontal X direction. The lens L21 is an anamorphic lens which is different in power between the vertical Y direction and the horizontal X direction, and in particular, an aspheric lens. The lenses L22, L23, and L24 in the third group 60 are lenses which are rotationally symmetrical around the optical axis OA. Of these, the lens L22 is a meniscus lens which is spherical and has negative power, the lens L23 is a meniscus lens which is aspheric and has negative power, and the lens L24 is a biconvex lens which is spherical and has positive power.

Figure 24:
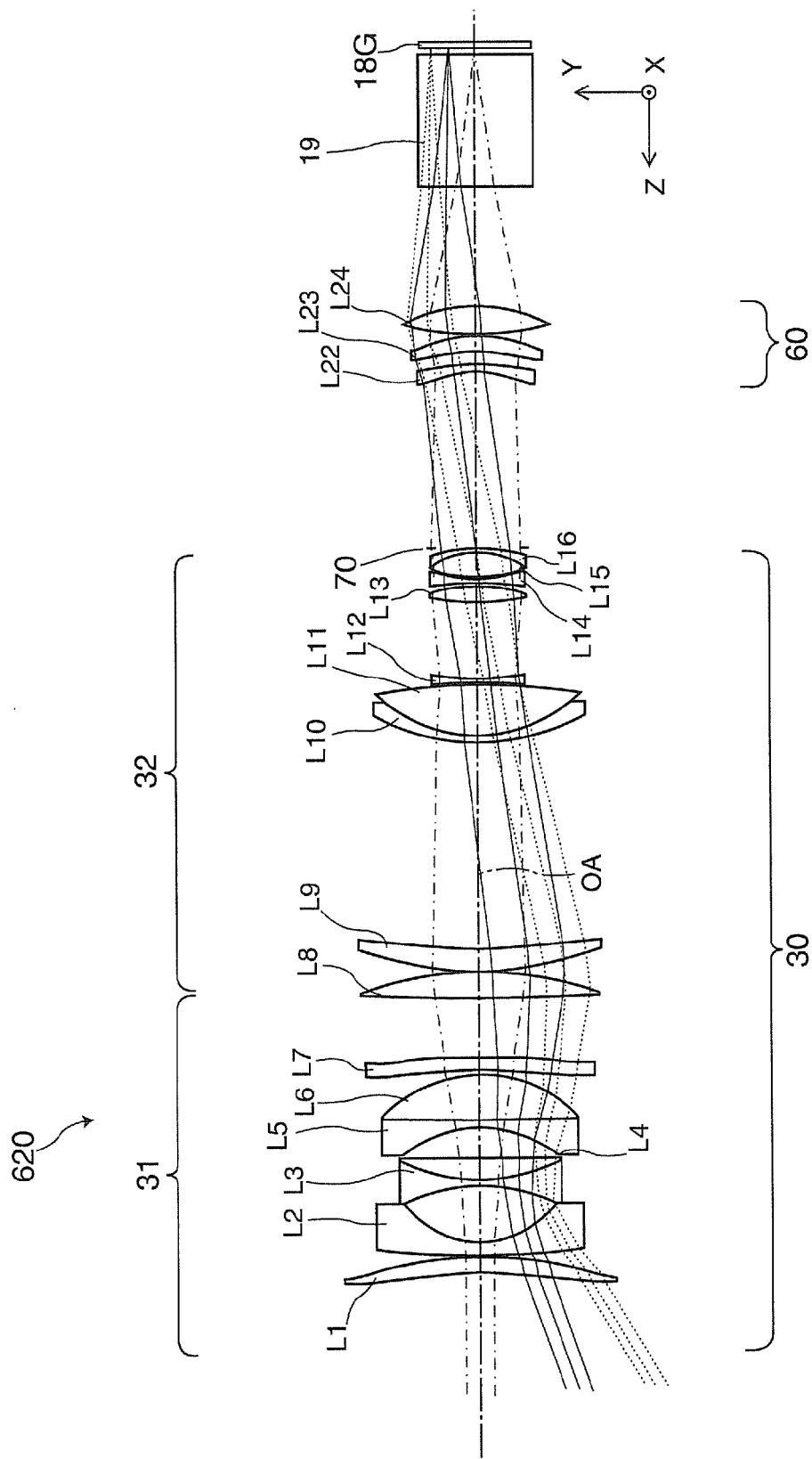
FIG. 24 is a diagram showing a second operation state of the optical system of Example 3 shown in FIG. 23.

While FIG. 23 shows the first operation state where the second group 640 which is an anamorphic optical system is disposed on the optical path, FIG. 24 shows the second operation state where the second group 640 is retreated outside the optical path. As shown in FIG. 24, a light beam emitted from the third group 60 is substantially collimated. That is, the third group 60 is a light beam collimation optical system which collimates a light beam from the first group 30 toward the third group 60. In this case, the second group 640 which is advanced and retreated between the first group 30 and the third group 60 becomes an afocal optical system.

Lens data and the like of Example 3 are shown in Table 3. In the upper column of Table 3, "surface number", "surface type", "R1", "R2", "D", "Nd", and "vd" mean the same as those in Example 1.

TABLE 3

| Surface Number | Name | Surface Type | R1: Y curvature radius | R2: X curvature radius | D | Nd | vd |
|---|---|---|---|---|---|---|---|
| Object | | aspheric | | | 2999.82 | | |
| 1 | L1 | aspheric | −147.55718 | −147.55718 | 5.23 | 1.497 | 81.5446 |
| 2 | | spherical | −115.38036 | −115.38036 | 0.1 | | |
| 3 | L2 | spherical | 236.27845 | 236.27845 | 4.06228 | 1.54739 | 70.8843 |
| 4 | | spherical | 29.071118 | 29.071118 | 17.4584 | | |
| 5 | L3 | spherical | −51.828105 | −51.828105 | 1.80466 | 1.61111 | 62.4836 |
| 6 | L4 | spherical | 53.562274 | 53.562274 | 6.55665 | 1.77019 | 27.0384 |
| 7 | | spherical | −14829.059 | −14829.059 | 9.5123 | | |
| 8 | L5 | spherical | −38.328023 | −38.328023 | 2.29374 | 1.81152 | 26.5407 |
| 9 | L6 | spherical | 1939.5387 | 1939.5387 | 13.6472 | 1.52862 | 61.8554 |
| 10 | | spherical | −42.179666 | −42.179666 | 1.67615 | | |
| 11 | L7 | aspheric | −293.02338 | −293.02338 | 4 | 1.55426 | 50.7209 |
| 12 | | aspheric | −270.54005 | −270.54005 | 18.0813 | | |
| 13 | L8 | spherical | 735.38483 | 735.38483 | 8.09504 | 1.70502 | 29.807 |
| 14 | | spherical | −101.3773 | −101.3773 | 0.1 | | |
| 15 | L9 | spherical | 103.27033 | 103.27033 | 6.94749 | 1.67824 | 31.7051 |
| 16 | | spherical | 238.40096 | 238.40096 | 63.1342 | | |
| 17 | L10 | spherical | 64.765677 | 64.765677 | 2.2 | 1.83924 | 32.8371 |
| 18 | L11 | spherical | 45.29827 | 45.29827 | 15.6857 | 1.497 | 81.5447 |
| 19 | | spherical | −171.75491 | −171.75491 | 0.48152 | | |
| 20 | L12 | spherical | −88.390255 | −88.390255 | 1.4 | 1.76838 | 47.4985 |
| 21 | | spherical | 86.511556 | 86.511556 | 23.4769 | | |
| 22 | L13 | spherical | 95.437618 | 95.437618 | 4.73043 | 1.56169 | 48.6104 |
| 23 | | spherical | −47.673678 | −47.673678 | 1.0664 | | |
| 24 | L14 | spherical | −92.23708 | −92.23708 | 1.4 | 1.79582 | 45.2992 |
| 25 | | spherical | 42.415978 | 42.415978 | 0.361632 | | |
| 26 | L15 | spherical | 41.396372 | 41.396372 | 7.58313 | 1.50422 | 75.2069 |
| 27 | L16 | spherical | −25.845291 | −25.845291 | 1.4 | 1.76951 | 47.4003 |
| 28 | | spherical | −49.674651 | −49.674651 | 2.1 | | |
| 29 | L17 | cylindrical | 57.467614 | INFINITY | 4.99599 | 1.78051 | 46.4814 |
| 30 | L18 | cylindrical | −55.996515 | INFINITY | 6.57962 | 1.67364 | 32.0718 |
| 31 | | cylindrical | 36.22151 | INFINITY | 7.03509 | | |
| 32 | L19 | cylindrical | 38.308854 | INFINITY | 3.5 | 1.84666 | 23.7775 |
| 33 | | cylindrical | 79.587988 | INFINITY | 12.2838 | | |
| 34 | L20 | cylindrical | −106.87895 | INFINITY | 2 | 1.497 | 81.5448 |
| 35 | | cylindrical | 48.199181 | INFINITY | 7 | | |
| 36 | L21 | anamorphic aspheric | −36.929299 | −52.817512 | 3 | 1.5119 | 69.6249 |
| 37 | | anamorphic aspheric | −36.228742 | −53.268653 | 6.0404 | | |
| 38 | L22 | spherical | −33.408609 | −33.408609 | 2.16316 | 1.73421 | 42.0986 |
| 39 | | spherical | −76.033352 | −76.033352 | 3.80963 | | |
| 40 | L23 | aspheric | −57.567745 | −57.567745 | 5 | 1.59347 | 44.324 |
| 41 | | aspheric | −36.135861 | −36.135861 | 0.1 | | |
| 42 | L24 | spherical | 81.999511 | 81.999511 | 8.90721 | 1.50751 | 76.8158 |
| 43 | | spherical | −47.347559 | −47.347559 | 37.07 | | |
| 44 | L25 | spherical | INFINITY | INFINITY | 40.93 | 1.51633 | 64.1411 |
| 45 | | spherical | INFINITY | INFINITY | 2 | | |
| Image Surface | | spherical | INFINITY | INFINITY | 0 | | |

| Aspheric Coefficient | | | | | | |
|---|---|---|---|---|---|---|
| | 1st surface | 2nd surface | 11th surface | 12th surface | 40th surface | 41st surface |
| Y curvature radius | −147.557 | −115.38 | −293.023 | −270.54 | −57.5677 | −36.1359 |
| conic constant | −8.73661 | −22.2994 | −32.5647 | 9.81877 | −5.70789 | −3.32745 |
| 4th-order coefficient | −0.000001 | −0.000006 | −0.000002 | −1.00E−06 | −0.000004 | −7.00E−06 |
| 6th-order coefficient | 4.41E−09 | 1.08E−08 | −6.12E−10 | −5.97E−10 | 7.15E−10 | 6.23E−09 |
| 8th-order coefficient | −3.87E−12 | −1.04E−11 | 7.74E−12 | 6.04E−12 | 4.85E−11 | 1.89E−11 |
| 10th-order coefficient | 1.33E−15 | 5.36E−15 | −1.01E−14 | −7.49E−15 | −1.14E−14 | 3.15E−14 |
| 12th-order coefficient | −1.21E−19 | −1.41E−18 | 6.28E−18 | 4.46E−18 | 0 | 0 |
| 14th-order coefficient | 0 | 1.58E−22 | −1.58E−21 | −1.07E−21 | 0 | 0 |
| 16th-order coefficient | 0 | 0 | 0 | 0 | 0 | 0 |
| 18th-order coefficient | 0 | 0 | 0 | 0 | 0 | 0 |
| 20th-order coefficient | 0 | 0 | 0 | 0 | 0 | 0 |

In the lower column of Table 3, in regard to the lenses L1, L7, and L23 which form the projection optical system of Example 3, an aspheric shape is shown.

Aspheric data of the lens L21 is as shown in Table 4.

TABLE 4

| | 36th surface |
|---|---|
| X curvature radius | −52.817512463811 |
| Y curvature radius | −36.9292994256459 |
| Y conic constant (KY) | 0 |
| 4th-order coefficient (AR) of rotational symmetry | −1.61104532096345E−007 |
| 6th-order coefficient (BR) of rotational symmetry | 1.53730928692859E−008 |
| 8th-order coefficient (CR) of rotational symmetry | −8.26366111121835E−011 |
| 10th-order coefficient (DR) of rotational symmetry | 2.19796080429772E−013 |
| X conic constant (KX) | 0 |
| 4th-order coefficient (AP) of rotational asymmetry | −3.65594107344592 |
| 6th-order coefficient (BP) of rotational asymmetry | −0.051164936579482 |
| 8th-order coefficient (CP) of rotational asymmetry | −0.103072185513006 |
| 10th-order coefficient (DP) of rotational asymmetry | −0.0478835009342865 |
| | 37 surface |
| X curvature radius | −53.2686492100881 |
| Y curvature radius | −36.2287420368061 |
| Y conic constant (KY) | 0 |
| 4th-order coefficient (AR) of rotational symmetry | −1.35859170346427E−007 |
| 6th-order coefficient (BR) of rotational symmetry | 1.05007456447855E−008 |
| 8th-order coefficient (CR) of rotational symmetry | −4.82557412126088E−011 |
| 10th-order coefficient (DR) of rotational symmetry | 1.20750335243526E−013 |
| X conic constant (KX) | 0 |
| 4th-order coefficient (AP) of rotational asymmetry | −3.67180271195736 |
| 6th-order coefficient (BP) of rotational asymmetry | −0.0439989017543781 |
| 8th-order coefficient (CP) of rotational asymmetry | −0.112131426373607 |
| 10th-order coefficient (DP) of rotational asymmetry | −0.0424772741753561 |

Figure 25:
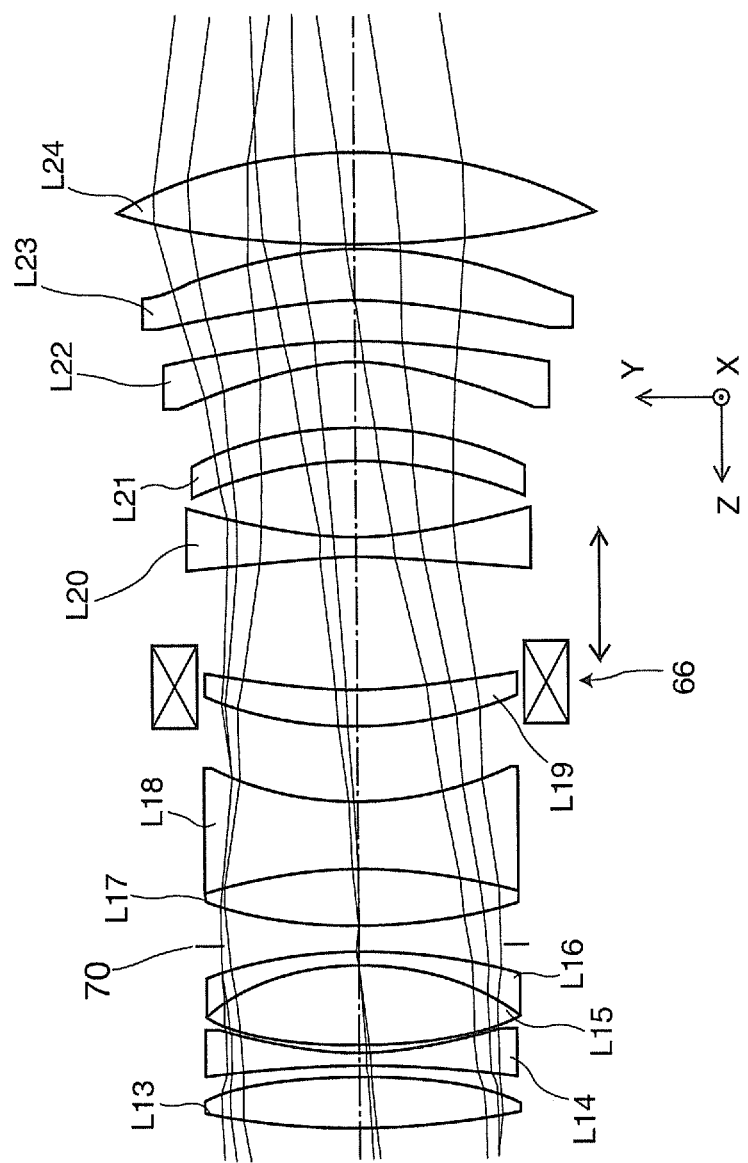
FIG. 25 is a partial enlarged view of the optical system of Example 3.
Figure 26A:
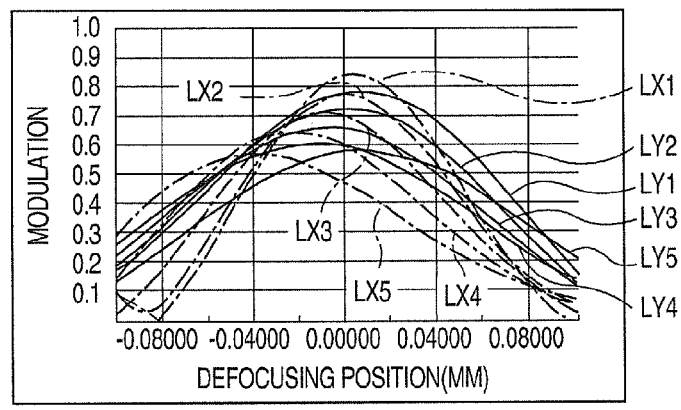
FIGS. 26A to 26C are graphs showing an MTF at an image height in a Y-axis direction, an image height in an X-axis direction, and an image height in a direction at 45° before adjustment of a movable optical component in the optical system of Example 3.
Figure 26B:
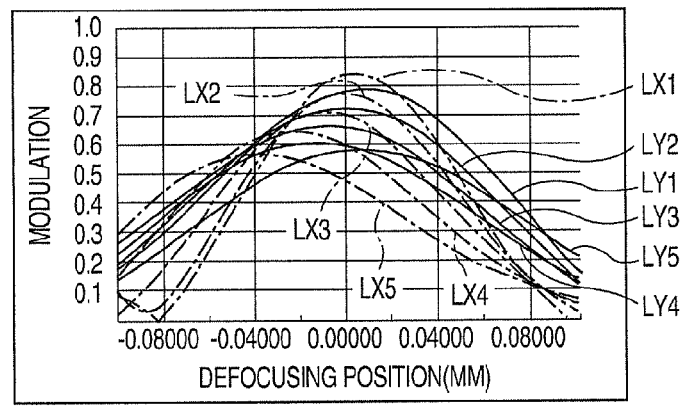
Figure 26C:
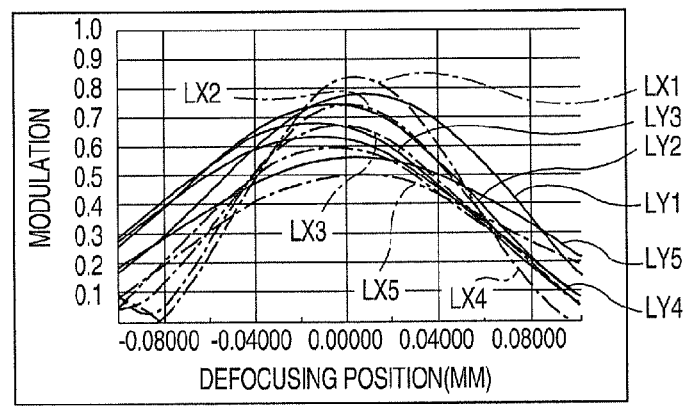

As shown in FIG. 25, in the first operation state where the second group 640 is disposed on the optical path, the lens L19 which is the second partial group 641b is a movable optical component which can be moved in the Z direction by the driving mechanism 66 serving as an electrical driving mechanism. The driving mechanism 66 performs an electrical driving operation in conjunction with the zoom operation of the first group 30. With the electrical driving, it is possible to appropriately maintain the movement of the lens L19 which should be adjusted in accordance with the zoom amount.

Hereinafter, a specific example of positional adjustment of the lens L19 as a movable optical component using the driving mechanism 66 will be described. As described above, the lens L19 is configured to be moved in the Z direction by the driving mechanism 66. As an example, it is assumed that the lens L19 is movable by +0.07 mm before and after adjustment. That is, in Table 3, in regard to the 31st surface which is the surface of the lens L19, the space between the lens L18 and the 31st surface is widened from 7.03509 (basic position) by +0.07 and set to 7.10509 (adjusted position), and the space between the lens L19 and the 33rd surface which is the surface of the lens L20 is shortened from 12.2838 (basic position) by −0.07 and set to 12.2138 (adjusted position). FIGS.

Figure 27A:
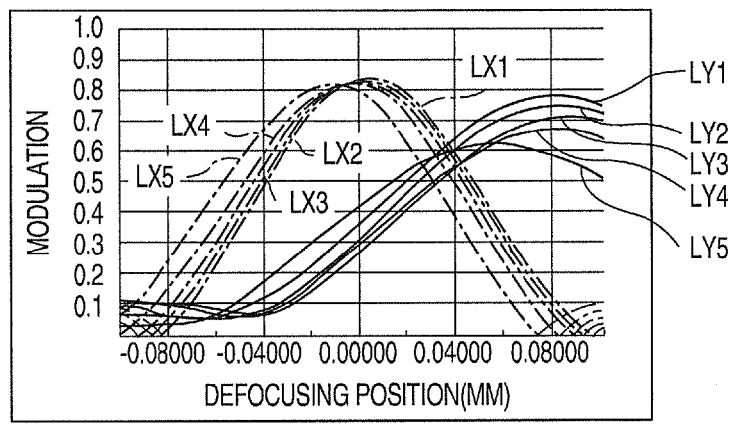
FIGS. 27A to 27C are graphs showing an MTF at an image height in a Y-axis direction, an image height in an X-axis direction, and an image height in a direction of 45° after adjustment of a movable optical component in the optical system of Example 3.
Figure 27B:
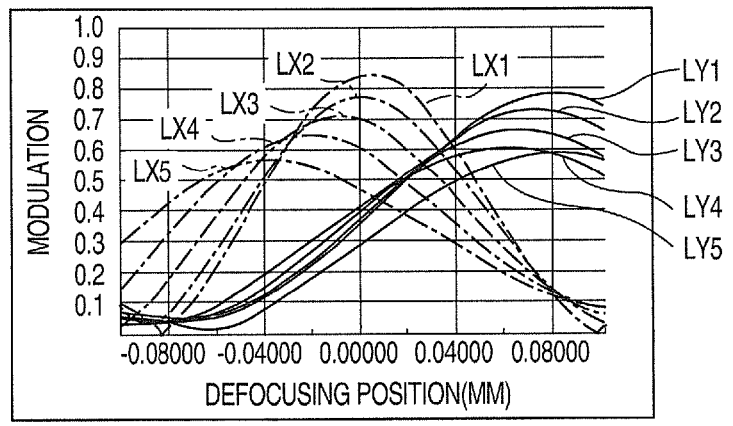
Figure 27C:
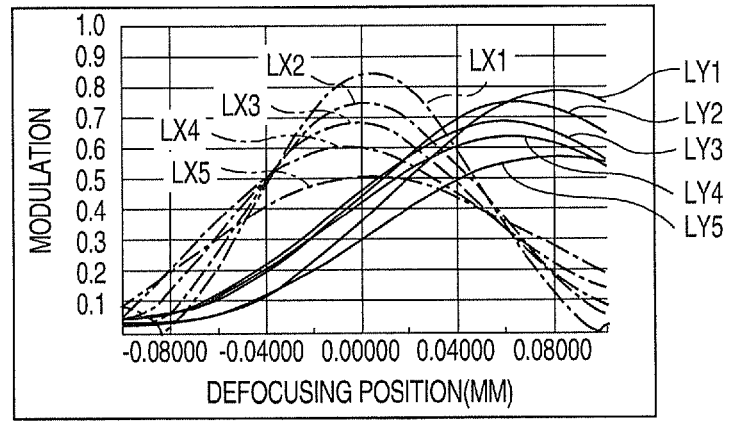

26A to 26C are graphs showing an MTF (Modulation Transfer Function) at an image height in the Y-axis direction (the vertical direction of the screen), an image height in a direction of 45° (the diagonal direction of the screen), and an image height in the X-axis direction (the horizontal direction of the screen) before adjustment of the movable optical component in the optical system of Example 3 before adjustment. Meanwhile, FIGS. 27A to 27C are graphs showing an MTF at an image height in the Y-axis direction, an image height in a direction of 45°, and an image height in the X-axis direction after adjustment of the movable optical component in the optical system of Example 3. Although the details will be omitted, in the graphs, of curves LY1 to LY5 and LX1 to LX5, solid-line curves LY1 to LY5 show the MTF in the Y (vertical) direction, and one-dot-chain-line curves LX1 to LX5 show the MTF in the X (horizontal) direction. Of the curves LY1 to LY5, for example, the curve LY1 shows the MTF at an image height of 0, and the curves LY2 to LY5 respectively show the MTFs corresponding to the image height positions of 40%, 60%, 80%, and 100% with respect to the image circle radius (in this case, 10.5 mm). Here, 40 line/mm (this means that 40 black-and-white lines per mm are viewed) is used as a reference. As the defocus positions (image-forming points) of the peak values of the curves LY1 to LY5 and LX1 to LX5 are deviated, astigmatism increases. As will be understood by comparison, it is understood that only the defocus amount in the Y direction moves by about +0.08 mm before and after adjustment, and astigmatism significantly occurs. From this result, it is understood that, even in a rotationally asymmetrical optical system, astigmatism can be controlled over the entire range. Accordingly, if this is used conversely, with lens space adjustment, it becomes possible to cancel various kinds of aberrations, such as astigmatism, due to manufacturing/assembling errors, thereby improving optical performance. That is, for example, when the defocus position in the Y direction is moved in the plus (+) direction, the lens L19 is moved in the +Z direction, and on the contrary, when the defocus position in the Y direction is moved in the minus (−) direction, the lens L19 is moved in the −Z direction, thereby controlling astigmatism.

As in Example 3, with fine adjustment of one lens L19 in the anamorphic lens group, it becomes possible to adjust astigmatism or the like.

Although in regard to the movement of the movable optical component, a structure is made in which the driving mechanism 66 for moving the movable optical component as a finished product is included, the invention is not limited thereto. For example, when assembling the projection optical system 620 as a product, the lens L19 may be movably disposed, and assembling may be performed while adjusting the position of the lens L19, thereby suppressing the occurrence of aberration.

Although in the above description, conversion using compression in the vertical direction (Y direction) has been described, the structure for moving the movable optical component may also be applied to a case where extension in the horizontal direction is performed, or the like.

Seventh Embodiment

Hereinafter, a projection optical system or the like according to a seventh embodiment will be described. This embodiment is a modification of the projection optical system or the like of the first embodiment, and portions or matters which will not be particularly described are the same as those in the first embodiment.

FIGS. 28A and 28B respectively show the configuration of a cross section and the configuration of a longitudinal section of a projection optical system 720 of this embodiment. As shown in the drawings, the projection optical system 720 is configured such that, in a body portion 720a, a second group 740 which is an anamorphic optical system is disposed on the optical path and conversion is performed to compress the aspect ratio in the vertical Y direction. As shown in the drawings, the second group 740 has a first optical component group 741 and a second optical component group 742 which are adjustment optical components. Of these, the first optical component group 741 has a plurality of cylindrical lens groups which have positive power as a whole, and the second optical component group 742 has a lens group which has negative power as a whole.

In general, in a projection optical system, it is not easy to efficiently suppress all kinds of aberrations, such as astigmatism. In particular, in a projection optical system having an anamorphic optical system, astigmatism or the like is apt to occur due to a difference in power between the vertical direction (Y direction) and the horizontal direction (X direction), and performance is significantly deteriorated on the outer circumference (periphery, high image height) due to the aberration. In particular, like the projection optical system 720 of this embodiment, in a projection optical system which has an anamorphic optical system, which is different in focal length between the X direction and the Y direction, astigmatism is apt to occur, and since the aberration increases with the square of the image height, when the image circle is large, a significant problem arises.

In this embodiment, in the projection optical system 720, as described above, the second group 740 which is an anamorphic optical system has a plurality of cylindrical lens groups which have a curvature only in the vertical Y direction as the adjustment direction, in which conversion adjustment using compression is performed, between the vertical Y direction and the horizontal X direction, and an optical component 742a serving as an independent lens which has a curvature in the horizontal X direction as the non-adjustment direction in which conversion adjustment is not performed. In particular, in this embodiment, since the optical component 742a is a single cylindrical lens which has a curvature only in the X direction, it becomes possible to achieve ease of manufacturing, and to correct aberration due to field curvature or an astigmatic difference.

Example 4

Figure 29:
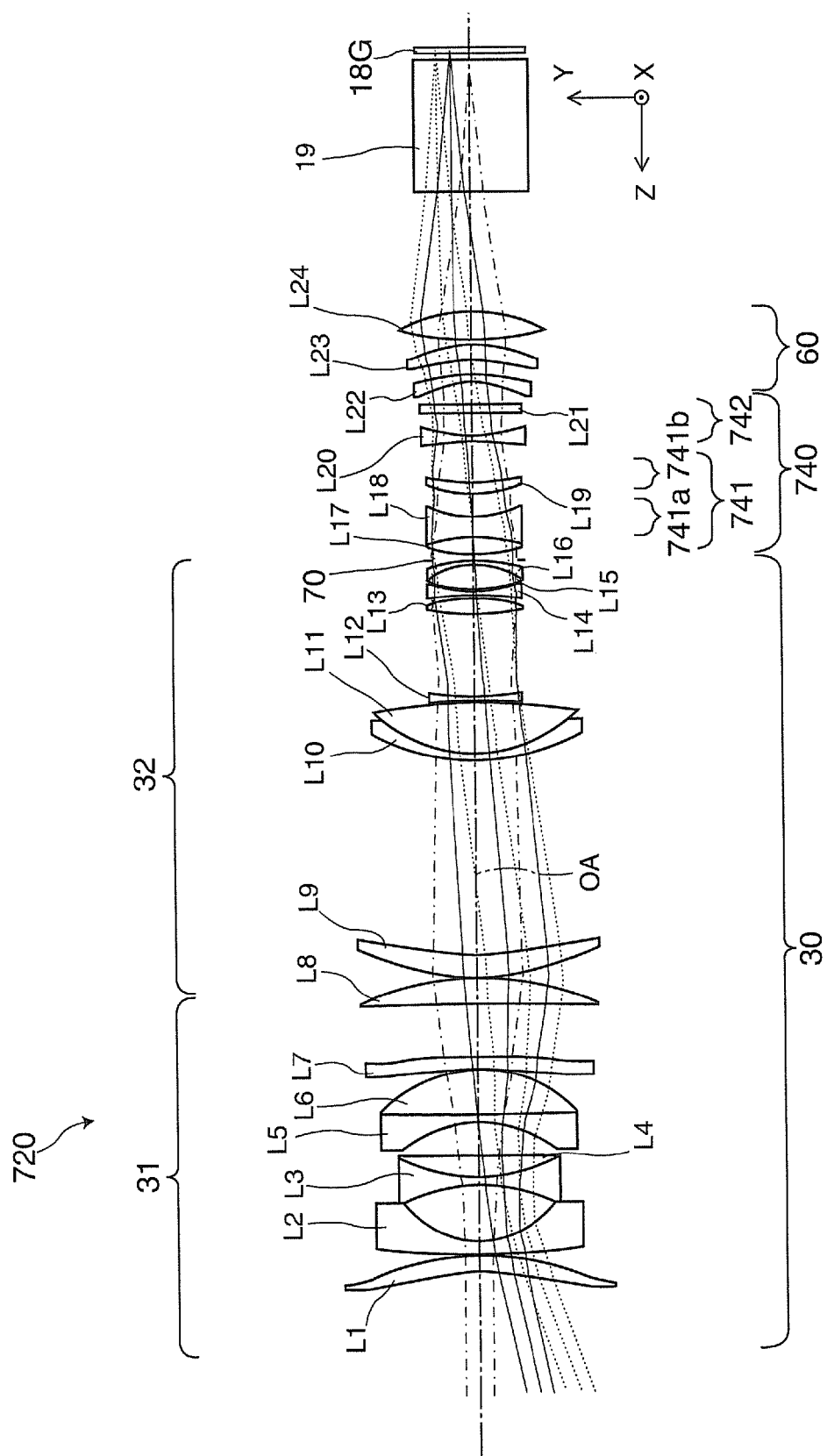
FIG. 29 is a diagram illustrating an optical system of Example 4 of the seventh embodiment.
Figure 30:
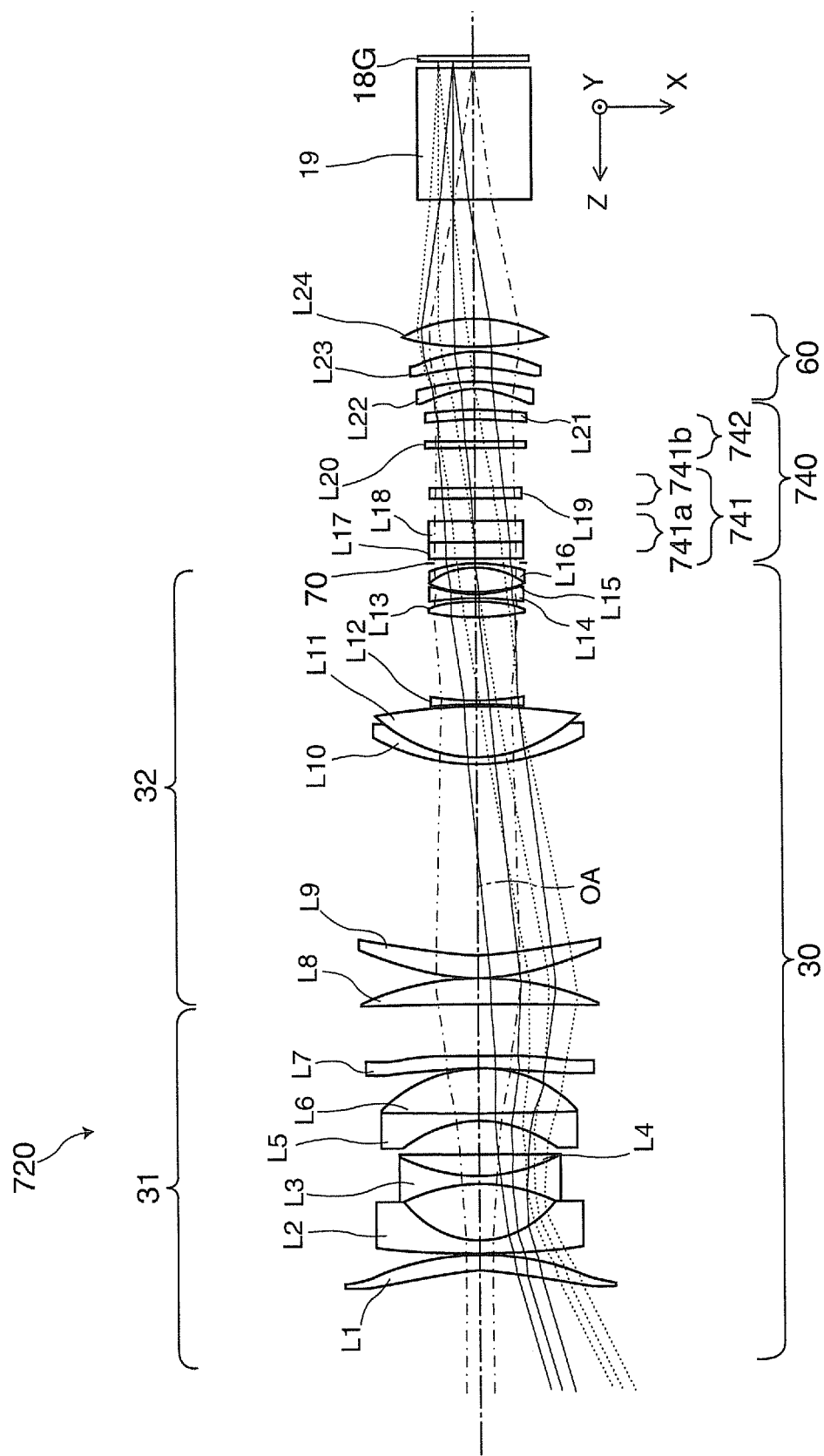
FIG. 30 is a diagram showing the configuration of a cross section of an optical system of Example 4.

FIGS. 29 and 30 are diagrams illustrating Example 4 of the projection optical system 720 of the seventh embodiment. FIG. 29 shows the configuration of a longitudinal section, and FIG. 30 shows the configuration of a cross section. The projection optical system 720 has lenses L1 to L24. Of these, the lenses L1 to L16 form a first group 30, the lenses L17 to L21 form a second group 740, and the lenses L22 to L24 form a third group 60. In the second group 740, the lenses L17 and L18 form a first partial group 741a which is a part of a first optical component group 741, the lens L19 forms a second partial group 741b which is the rest of the first optical component group 741, and the lenses L20 and L21 form a second optical component group 742 which is a third partial group. The first partial group 741a has negative power as a whole, the second partial group 741b has positive power, and the second optical component group 742 which is a third partial group has negative power as a whole. The first optical component group 741 which is a lens group formed by combining the first partial group 741a and the second partial group 741b has positive power as a whole.

The second group 740 has the lenses L17 to L20 which are a plurality of cylindrical lens groups having a curvature only in the Y direction for performing compression conversion in the Y direction, and the lens L21 which is a single cylindrical lens having a curvature only in the X direction, in which compression conversion is not performed, as an optical component 742a. That is, the lenses L17 to L21 forming the second group 740 are all cylindrical lenses, and the lens L21 has a curvature in a direction different from other lenses L17 to L20. While other lenses are made of glass, the lens L21 is a resin lens.

The lenses L1 to L16 in the first group 30 are lenses which are rotationally symmetrical around the optical axis OA. In regard to the lenses L17 to L21 in the second group 740, as described above, first, the cemented lenses L17 and L18 and the lens L19 are cylindrical lenses which have positive power in the vertical Y direction as a whole, and has no power in the horizontal X direction. The lens L20 is a cylindrical lens which has negative power in the vertical Y direction, and has no power in the horizontal X direction. The lens L21 is a cylindrical lens which has a curvature in the vertical Y direction, and has no curvature in the horizontal X direction. The lens L21 not only has no power in the X direction in which no curvature is provided, but also substantially has no power in the Y direction in which a curvature is provided, that is, has power of substantially zero. Accordingly, the lens L21 does not directly affect compression conversion in the Y direction using the second group 740 as an anamorphic optical system, and functions as an optical system for only aberration correction. In this case, since a rise in temperature due to refraction in the lens L21 is reduced, for example, even when the lens L21 is made of resin, it is possible to reduce deviation in the focal length or the like due to a rise in temperature. The lenses L22, L23, and L24 in the third group 60 are lenses which are rotationally symmetrical around the optical axis OA. Of these, the lens L22 is a meniscus lens which is spherical and has negative power, the lens L23 is a meniscus lens which is aspheric and has negative power, and the lens L24 is a biconvex lens which is spherical and has positive power.

A light beam emitted from the third group 60 is substantially collimated. That is, the third group 60 is a light beam collimation optical system which collimates a light beam from the first group 30 toward the third group 60. In this case, the second group 740 which is advanced and retreated between the first group 30 and the third group 60 becomes an afocal optical system.

Lens data and the like of Example 4 are shown in Table 5. In the upper column of Table 5, "surface number", "surface type", "R1", "R2", "D", "Nd", and "vd" mean the same as those in Example 1.

TABLE 5

| Surface Number | Name | Surface Type | R1: Y curvature radius | R2: X curvature radius | D | Nd | vd |
| --- | --- | --- | --- | --- | --- | --- | --- |
| Object | | | | | 2992.45 | | |
| 1 | L1 | aspheric | −98.885219 | −98.885219 | 5.23 | 1.497 | 81.5448 |
| 2 | | aspheric | −85.111732 | −85.111732 | 0.122039 | | |

TABLE 5-continued

| | | | | | | | |
|---|---|---|---|---|---|---|---|
| 3 | L2 | spherical | 176.12174 | 176.12174 | 4.06228 | 1.53577 | 72.9241 |
| 4 | | spherical | 29.008197 | 29.008197 | 17.7866 | | |
| 5 | L3 | spherical | −47.451517 | −47.451517 | 1.80466 | 1.61884 | 61.6988 |
| 6 | L4 | spherical | 48.691588 | 48.691588 | 7.66375 | 1.78581 | 26.0481 |
| 7 | | spherical | −497.02345 | −497.02345 | 10.2073 | | |
| 8 | L5 | spherical | −37.176177 | −37.176177 | 2.29374 | 1.82277 | 24.4936 |
| 9 | L6 | spherical | 1254.1397 | 1254.1397 | 13.6472 | 1.52597 | 63.5641 |
| 10 | | spherical | −42.643817 | −42.643817 | 0.399852 | | |
| 11 | L7 | aspheric | −259.20936 | −259.20936 | 4 | 1.67453 | 32.0002 |
| 12 | | aspheric | −211.25871 | −211.25871 | 15.5949 | | |
| 13 | L8 | spherical | −1687.8073 | −1687.8073 | 8.23722 | 1.71556 | 29.1564 |
| 14 | | spherical | −84.64404 | −84.64404 | 0.1 | | |
| 15 | L9 | spherical | 79.927631 | 79.927631 | 6.94749 | 1.72215 | 28.7726 |
| 16 | | spherical | 125.19044 | 125.19044 | 59.6722 | | |
| 17 | L10 | spherical | 65.564996 | 65.564996 | 2.2 | 1.83832 | 34.4845 |
| 18 | L11 | spherical | 44.591362 | 44.591362 | 15.6857 | 1.49701 | 81.5388 |
| 19 | | spherical | −198.63645 | −198.63645 | 0.694755 | | |
| 20 | L12 | spherical | −77.511431 | −77.511431 | 1.4 | 1.78196 | 46.3646 |
| 21 | | spherical | 124.11851 | 124.11851 | 25.4392 | | |
| 22 | L13 | spherical | 97.215608 | 97.215608 | 4.73043 | 1.57069 | 46.3422 |
| 23 | | spherical | −47.935172 | −47.935172 | 1.2288 | | |
| 24 | L14 | spherical | −78.993025 | −78.993025 | 1.4 | 1.79639 | 45.2574 |
| 25 | | spherical | 44.182947 | 44.182947 | 0.1 | | |
| 26 | L15 | spherical | 41.382799 | 41.382799 | 7.58313 | 1.50613 | 73.7235 |
| 27 | L16 | spherical | −26.349919 | −26.349919 | 1.4 | 1.75969 | 48.2763 |
| 28 | | spherical | −50.217489 | −50.217489 | 2.1 | | |
| 29 | L17 | cylindrical | 56.570183 | INFINITY | 4.99599 | 1.78018 | 46.508 |
| 30 | L18 | cylindrical | −65.564569 | INFINITY | 6.57962 | 1.68127 | 31.4705 |
| 31 | | cylindrical | 35.109149 | INFINITY | 7.03509 | | |
| 32 | L19 | cylindrical | 39.896307 | INFINITY | 3.5 | 1.84666 | 23.7775 |
| 33 | | cylindrical | 90.395603 | INFINITY | 12.2838 | | |
| 34 | L20 | cylindrical | −149.50714 | INFINITY | 2 | 1.497 | 81.5448 |
| 35 | | cylindrical | 49.99952 | INFINITY | 7 | | |
| 36 | L21 | cylindrical | INFINITY | −134.86227 | 3 | 1.84666 | 23.7775 |
| 37 | | cylindrical | INFINITY | −137.43808 | 7.1603 | | |
| 38 | L22 | spherical | −26.311822 | −26.311822 | 2.16316 | 1.72326 | 33.7527 |
| 39 | | spherical | −47.462709 | −47.462709 | 4.03363 | | |
| 40 | L23 | aspheric | −60.043386 | −60.043386 | 5 | 1.60991 | 40.2192 |
| 41 | | aspheric | −35.737836 | −35.737836 | 1.60992 | | |
| 42 | L24 | spherical | 131.16267 | 131.16267 | 8.90721 | 1.51116 | 78.0142 |
| 43 | | spherical | −41.848867 | −41.848867 | 37.07 | | |
| 44 | L25 | spherical | INFINITY | INFINITY | 40.93 | 1.51633 | 64.1411 |
| 45 | | spherical | INFINITY | INFINITY | 2 | | |
| Image Surface | | spherical | INFINITY | INFINITY | 0 | | |

| Aspheric Coefficient | | | | | | |
|---|---|---|---|---|---|---|
| | 1st surface | 2nd surface | 11th surface | 12th surface | 40th surface | 41st surface |
| Y curvature radius | −98.8852 | −85.1117 | −259.209 | −211.259 | −60.0434 | −35.7378 |
| conic constant | −7.70368 | −16.0934 | −31.1474 | 10.444 | −5.36207 | −3.16105 |
| 4th-order coefficient | −0.000001 | −0.000006 | −0.000002 | −1.00E−06 | −0.000004 | −7.00E−06 |
| 6th-order coefficient | 4.40E−09 | 1.10E−08 | −6.88E−10 | −7.09E−10 | 1.40E−09 | 6.31E−09 |
| 8th-order coefficient | −3.87E−12 | −1.04E−11 | 7.57E−12 | 6.01E−12 | 4.39E−11 | 1.75E−11 |
| 10th-order coefficient | 1.31E−15 | 5.31E−15 | −1.01E−14 | −7.54E−15 | −8.67E−15 | 3.15E−14 |
| 12th-order coefficient | −1.43E−19 | −1.42E−18 | 6.28E−18 | 4.47E18 | 0 | 0 |
| 14th-order coefficient | 0 | 1.63E−22 | −1.53E−21 | −1.03E−21 | 0 | 0 |
| 16th-order coefficient | 0 | 0 | 0 | 0 | 0 | 0 |
| 18th-order coefficient | 0 | 0 | 0 | 0 | 0 | 0 |
| 20th-order coefficient | 0 | 0 | 0 | 0 | 0 | 0 |

In the lower column of Table 5, in regard to the lenses L1, L7, and L23 which form the projection optical system of Example 4, an aspheric shape is shown.

Figure 31:
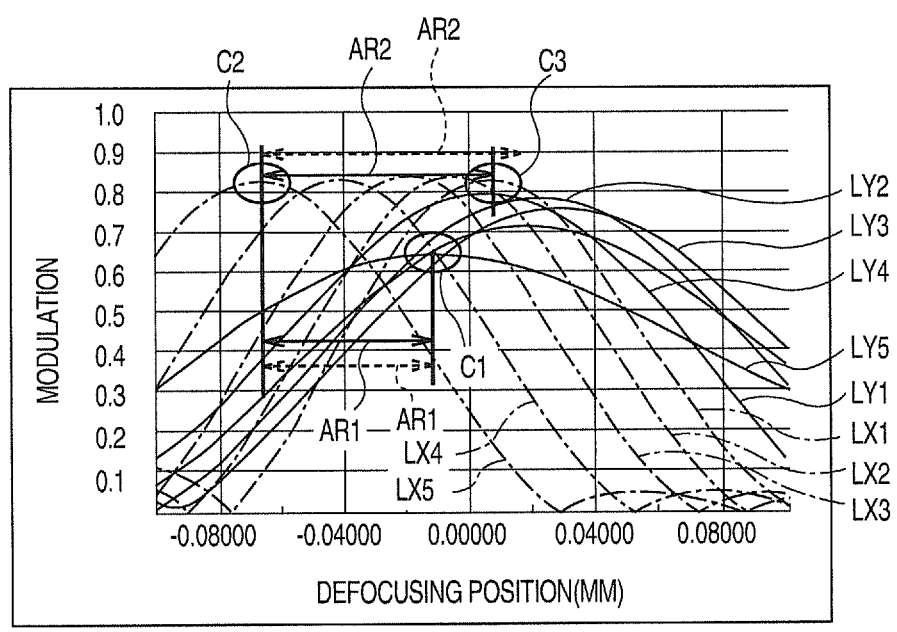
FIG. 31 is a graph showing an MTF of an optical system of Example 4.

FIG. 31 is a graph showing an MTF at an image height in the optical system of Example 4. Of curves LY1 to LY5 and LX1 to LX5, solid-line curves LY1 to LY5 show the MTF in the Y (vertical) direction, and one-dot-chain-line curves LX1 to LX5 shows the MTF in the X (horizontal) direction. In FIG. 31, 40 line/mm (this means that 40 black-and-white lines per mm are viewed) is used as a reference. In the graphs, the curves LY1 and LX1 are an MTF concerning the center light beam of the projection optical system, that is, at an image height of 0. The curves LY2 and LX2 represent an MTF at the image height of 40% with respect to the image circle radius (in this case, 10.5 mm). Similarly, the curves LY3 and LX3 indicate an MTF at the image height of 60%, the curves LY4 and LX4 indicate an MTF at the image height of 80%, and the curves LY5 and LX5 indicate an MTF at the image height of 100%. The horizontal axis is the defocus amount and represents the movement of the panel. The vertical axis represents response (%).

In the MTF at the image height of 100%, that is, the curves LY5 and LX5, while the position of a peak (where the MTF is the highest) Y direction is on the negative side from the reference position (defocus 0 mm) of the panel as shown in a region C1, and the position of a peak in the X direction is also on the negative side as shown in a region C2, these positions are separated in the horizontal axis direction. The situation in which the defocus positions (image-forming points) of the peak values in the X direction and the Y direction are deviated is called astigmatism, and the amount thereof, that is, the width indicated by an arrow AR1 in the drawing is called an astigmatic difference. The reduction in the amount of astigmatism ensures reduction in aberration.

A variation in the peak value is called field curvature. The reduction in the difference ensures reduction in aberration. With reference to the drawings, for example, the difference between the region C2 of the curve LX5 at the maximum image height and a region C3 which represents the position of the curve LX1 at the image height of 0 in the X direction, that is, the width indicated by the arrow AR2 in the drawing becomes the amount of field curvature. Although the amount of field curvature is shown only in the X direction, field curvature also occurs in the Y direction. In general, however, the variation in the X direction is larger than the variation in field curvature in the Y direction, and thus, a problem is apt to arise.

Figure 32:
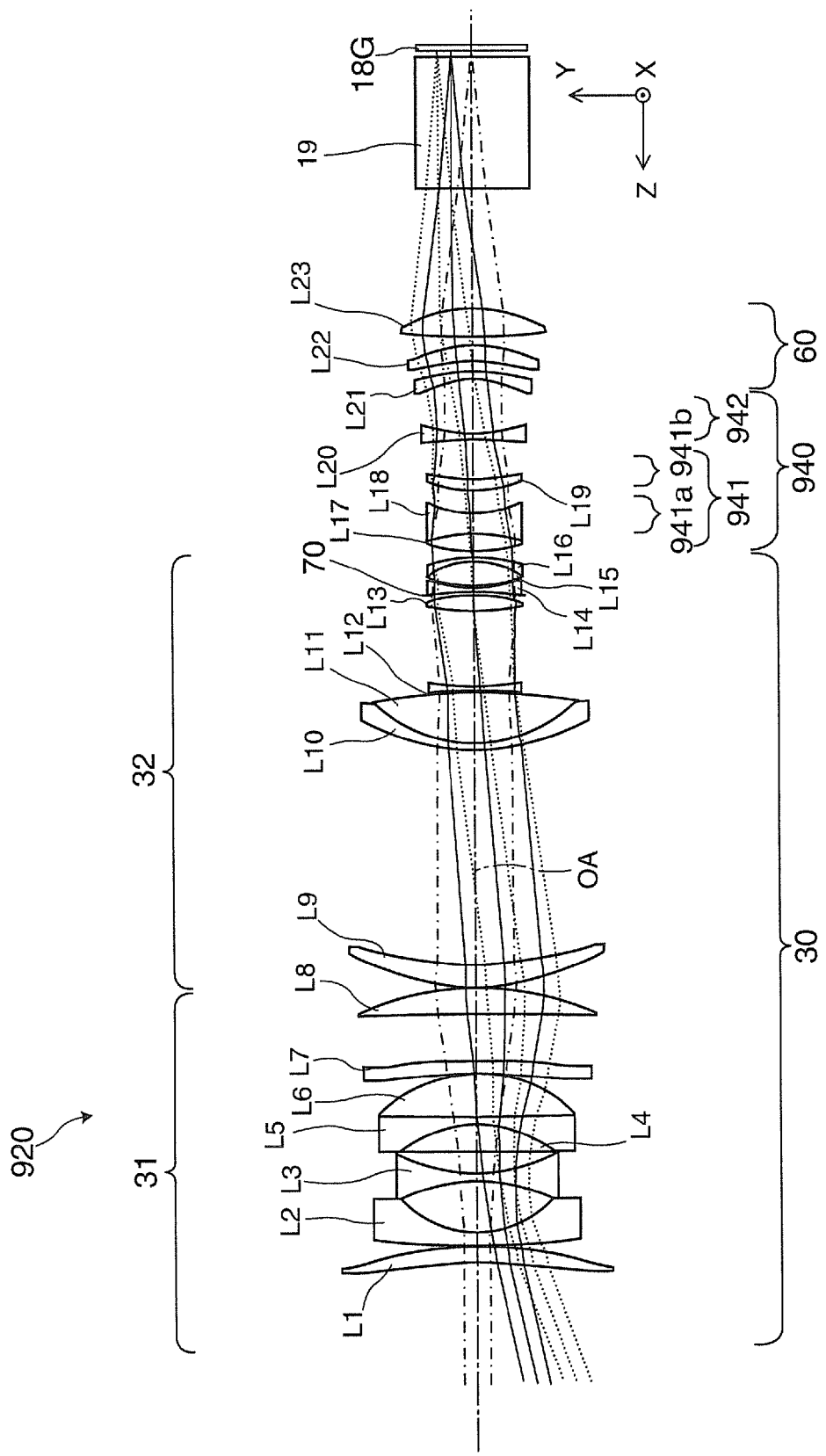
FIG. 32 is a diagram illustrating a projection optical system of a comparative example.
Figure 33:
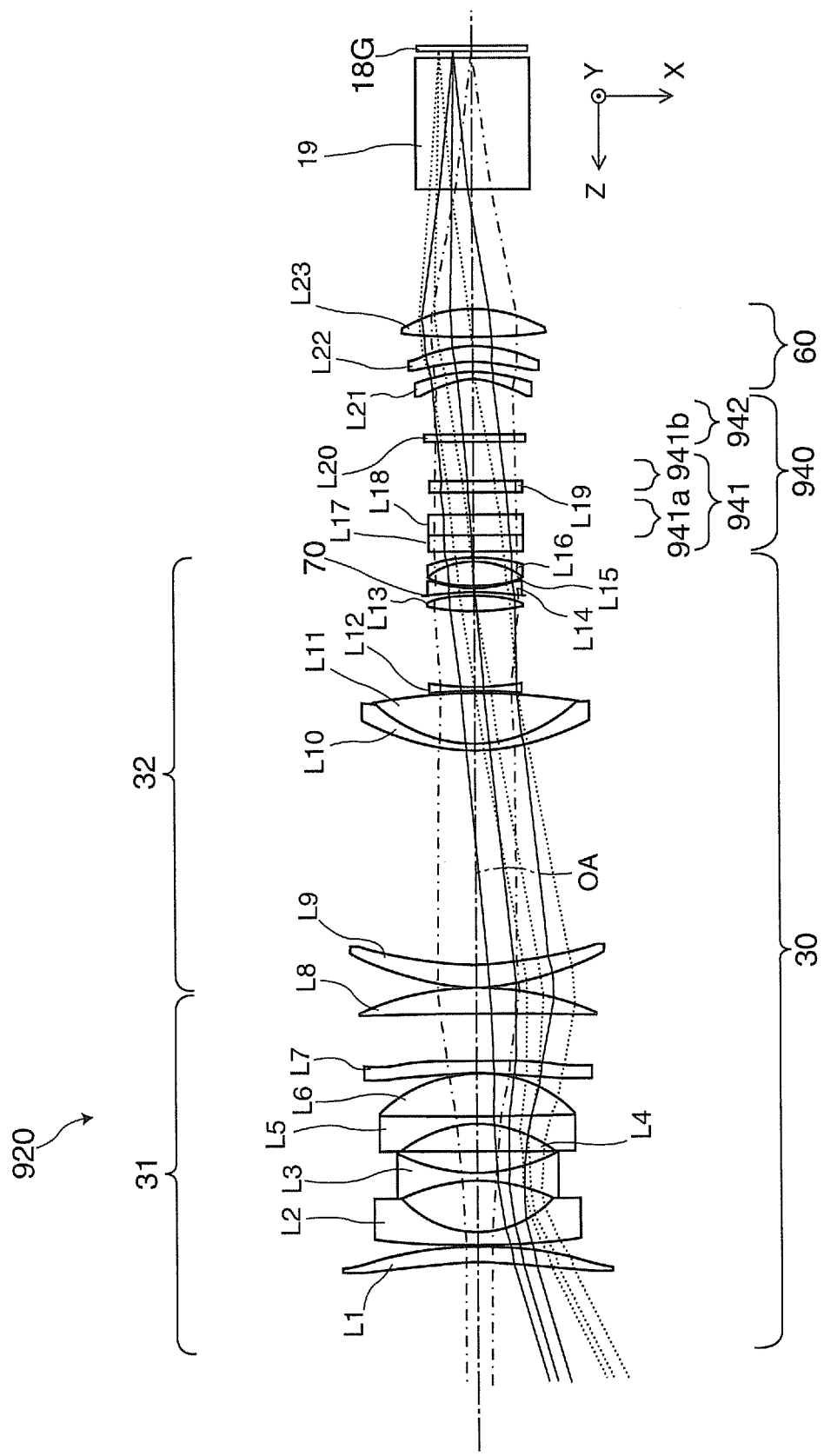
FIG. 33 is a diagram showing the configuration of a cross section in an optical system of a comparative example.

FIGS. 32 and 33 are diagrams showing an optical system of a comparative example. Here, as a comparative example of Example 4, an example of a projection optical system 920 having no lens L21 is shown. Lens data and the like of this example are shown in Table 6. In Table 6, "surface number", "surface type", "R1", "R2", "D", "Nd", and "vd" mean the same as those in Example 1.

TABLE 6

| Surface Number | Name | Surface Type | R1: R curvature radius | R2: X curvature radius | D | Nd | vd |
|---|---|---|---|---|---|---|---|
| Object | | | | | 2990.49 | | |
| 1 | L1 | aspheric | −104.82863 | −104.82863 | 5.23 | 1.497 | 81.5448 |
| 2 | | aspheric | −92.432382 | −92.432382 | 0.1 | | |
| 3 | L2 | spherical | 162.96251 | 162.96251 | 4.06228 | 1.53683 | 72.7291 |
| 4 | | spherical | 28.814703 | 28.814703 | 18.1725 | | |
| 5 | L3 | spherical | −47.37109 | −47.37109 | 1.80466 | 1.6228 | 61.3121 |
| 6 | L4 | spherical | 49.460292 | 49.460292 | 7.63975 | 1.78181 | 26.2792 |
| 7 | | spherical | −439.91119 | −439.91119 | 8.8464 | | |
| 8 | L5 | spherical | −37.254633 | −37.254633 | 2.29374 | 1.82702 | 24.3599 |
| 9 | L6 | spherical | 1217.0349 | 1217.0349 | 13.6472 | 1.52667 | 61.247 |
| 10 | | spherical | −43.383029 | −43.383029 | 0.148149 | | |
| 11 | L7 | aspheric | −278.99031 | −278.99031 | 4 | 1.69449 | 30.5084 |
| 12 | | aspheric | −209.0885 | −209.0885 | 15.0092 | | |
| 13 | L8 | spherical | −1374.6672 | −1374.6672 | 8.24389 | 1.71697 | 29.0729 |
| 14 | | spherical | −84.360652 | −84.360652 | 0.1 | | |
| 15 | L9 | spherical | 79.479999 | 79.479999 | 6.94749 | 1.73265 | 28.1954 |
| 16 | | spherical | 123.96593 | 123.96593 | 61.3373 | | |
| 17 | L10 | spherical | 65.915793 | 65.915793 | 2.2 | 1.839 | 33.2576 |
| 18 | L11 | spherical | 44.473638 | 44.473638 | 15.6857 | 1.497 | 81.5448 |
| 19 | | spherical | −192.93057 | −192.93057 | 0.671562 | | |
| 20 | L12 | spherical | −76.75698 | −76.75698 | 1.4 | 1.786 | 46.0454 |
| 21 | | spherical | 126.06012 | 126.06012 | 24.9168 | | |
| 22 | L13 | spherical | 96.444517 | 96.444517 | 4.73043 | 1.57307 | 45.7888 |
| 23 | | spherical | −48.594881 | −48.594881 | 1.2093 | | |
| 24 | L14 | spherical | −80.464541 | −80.464541 | 1.4 | 1.79652 | 45.2481 |
| 25 | | spherical | 44.456946 | 44.456946 | 0.1 | | |
| 26 | L15 | spherical | 41.851112 | 41.851112 | 7.58313 | 1.50652 | 73.4241 |
| 27 | L16 | spherical | −26.647694 | −26.647694 | 1.4 | 1.75677 | 48.5472 |
| 28 | | spherical | −50.387925 | −50.387925 | 2.1 | | |
| 29 | L17 | cylindrical | 55.705775 | INFINITY | 4.99599 | 1.78377 | 46.2208 |
| 30 | L18 | cylindrical | −66.798067 | INFINITY | 6.57962 | 1.6836 | 31.2937 |
| 31 | | cylindrical | 35.267007 | INFINITY | 7.03509 | | |
| 32 | L19 | cylindrical | 40.19945 | INFINITY | 3.5 | 1.84666 | 23.7775 |
| 33 | | cylindrical | 90.873555 | INFINITY | 12.2838 | | |
| 34 | L20 | cylindrical | −139.55637 | INFINITY | 2 | 1.497 | 81.5448 |
| 35 | | cylindrical | 50.058799 | INFINITY | 17.1308 | | |
| 36 | L21 | spherical | −26.35975 | −26.35975 | 2.16316 | 1.72111 | 33.1145 |
| 37 | | spherical | −47.432166 | −47.432166 | 4.28001 | | |
| 38 | L22 | aspheric | −59.987218 | −59.987218 | 5 | 1.61044 | 39.7414 |
| 39 | | aspheric | −35.811911 | −35.811911 | 1.90346 | | |
| 40 | L23 | spherical | 132.04091 | 132.04091 | 8.90721 | 1.51069 | 78.1229 |
| 41 | | spherical | −41.967198 | −41.967198 | 37.07 | | |
| 42 | L24 | spherical | INFINITY | INFINITY | 40.93 | 1.51633 | 64.1411 |
| 43 | | spherical | INFINITY | INFINITY | 2 | | |
| Image Surface | | spherical | INFINITY | INFINITY | 0 | | |

TABLE 6-continued

| Aspheric Coefficient | | | | | | |
|---|---|---|---|---|---|---|
| | 1st surface | 2nd surface | 11th surface | 12th surface | 40th surface | 41st surface |
| Y curvature radius | −104.829 | −92.4324 | −278.99 | −209.088 | −59.9872 | −35.8119 |
| conic constant | −8.51171 | −18.4784 | −33.0122 | 10.6113 | −5.10786 | −3.15853 |
| 4th-order coefficient | −0.000001 | −0.000006 | −0.000002 | −1.00E−06 | −0.000004 | −7.00E−06 |
| 6th-order coefficient | 4.39E−09 | 1.10E−08 | −6.92E−10 | −7.30E−10 | 1.20E−09 | 6.19E−09 |
| 8th-order coefficient | −3.87E−12 | −1.05E−11 | 7.55E−12 | 6.02E−12 | 4.27E−11 | 1.69E−11 |
| 10th-order coefficient | 1.31E−15 | 5.30E−15 | −1.01E−14 | −7.53E−15 | −7.68E−15 | 3.09E−14 |
| 12th-order coefficient | −1.50E−19 | −1.41E−18 | 6.30E−18 | 4.47E−18 | 0 | 0 |
| 14th-order coefficient | 0 | 1.60E−22 | −1.53E−21 | −1.03E−21 | 0 | 0 |
| 16th-order coefficient | 0 | 0 | 0 | 0 | 0 | 0 |
| 18th-order coefficient | 0 | 0 | 0 | 0 | 0 | 0 |
| 20th-order coefficient | 0 | 0 | 0 | 0 | 0 | 0 |

Although lens data of Table 6 represents a case where F number: Fy=3.5, and Fx=2.6, when a second group as an anamorphic optical system has only cylindrical lenses, such as the lenses L17 to L20, which have a curvature only in the Y direction, it is difficult to suppress field curvature or astigmatism above a certain level.

Figure 34:
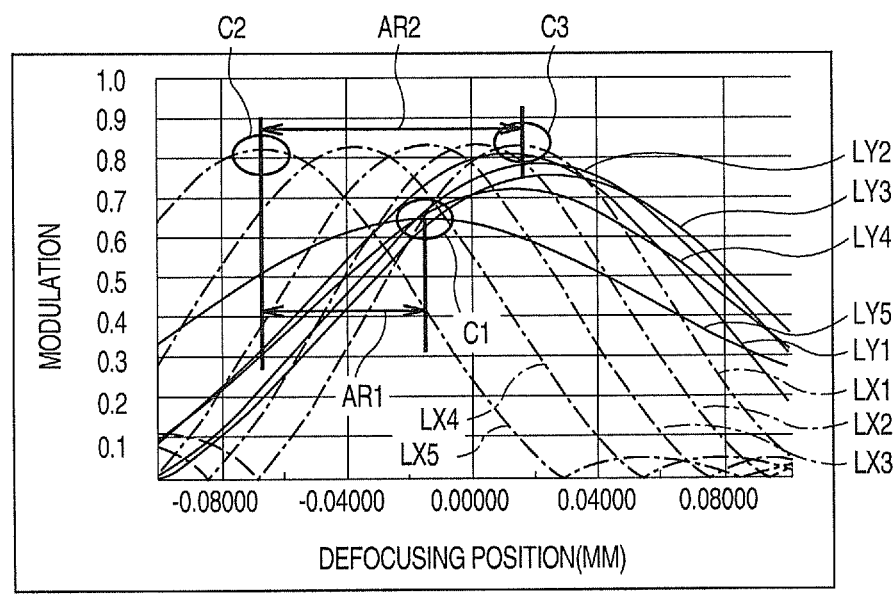
FIG. 34 is a graph showing an MTF of an optical system of a comparative example.

FIG. 34 is a graph showing an MTF at an image height in the optical system of this comparative example. When comparing with the graph of Example 4 shown in FIG. 31, it is understood that, in this embodiment, aberration is reduced. In FIG. 31, solid-line arrows AR1 and AR2 respectively represent the amount of astigmatic difference and the amount of field curvature in Example 4, and broken-line arrows AR1 and AR2 respectively represent the amount of astigmatic difference and the amount of field curvature in the comparative example shown in FIG. 34. When comparing with the comparative example, it is understood that the difference between the region C2 and the region C3 is smaller in the Example 4, that is, the amount of field curvature indicated by the arrow AR2 decreases. That is, it is understood that, in Example 4, aberration concerning field curvature is reduced compared to the comparative example. In regard to the difference between the region C1 and the region C2, that is, the amount of astigmatic difference indicated by the arrow AR1, it is understood that there is a little difference between Example 4 and the comparative example.

As described above, in Example 4, it is possible to reduce aberration regarding field curvature.

Example 5

Figure 35:
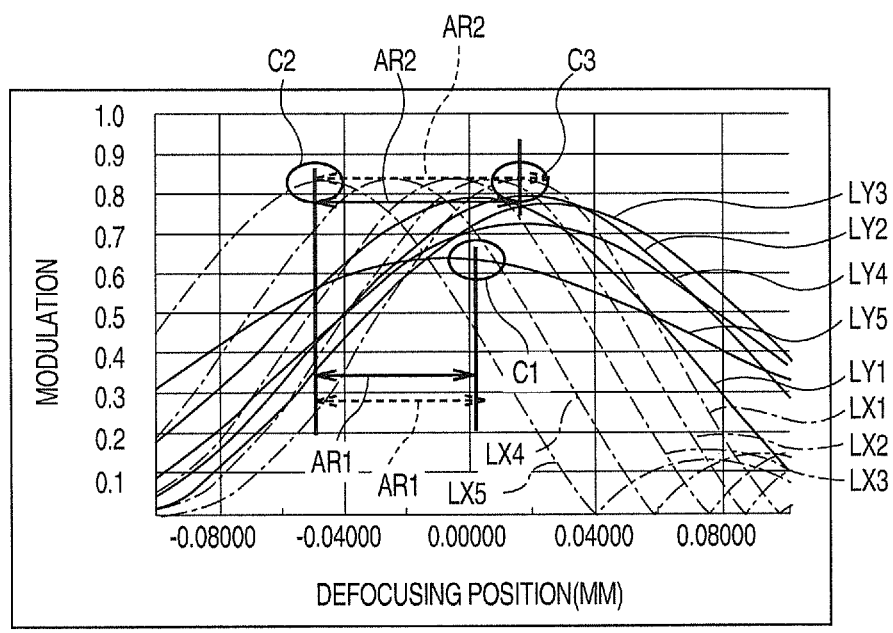
FIG. 35 is a graph showing an MTF of an optical system of Example 6.

FIG. 35 is a graph showing an MTF at an image height in an optical system of Example 5 of the projection optical system 720 of the seventh embodiment. In Example 5, in the projection optical system 720 of Example 4 shown in FIGS. 29 and 30, the curved surface of the lens 21 which is a single cylindrical lens having a curvature only in the X direction, in which compression conversion is not performed, as the optical component 742a is an aspheric surface.

Lens data and the like of Example 5 are shown in Table 7. In the upper column of Table 7, "surface number", "surface type", "R1", "R2", "D", "Nd", and "vd" mean the same as those in Example 1.

TABLE 7

| Surface Number | Surface Name | Surface Type | R1: R curvature radius | R2: X curvature radius | D | Nd | vd |
|---|---|---|---|---|---|---|---|
| Object | | aspheric | | | 2994.89 | | |
| 1 | L1 | aspheric | −96.790194 | −96.790194 | 5.23 | 1.497 | 81.5448 |
| 2 | | spherical | −83.307161 | −83.307161 | 0.1 | | |
| 3 | L2 | spherical | 218.66579 | 218.66579 | 4.06228 | 1.53769 | 72.5731 |
| 4 | | spherical | 29.951037 | 29.951037 | 17.6748 | | |
| 5 | L3 | spherical | −48.710095 | −48.710095 | 1.80466 | 1.61716 | 61.8658 |
| 6 | L4 | spherical | 48.163061 | 48.163061 | 7.76326 | 1.78398 | 25.9224 |
| 7 | | spherical | −626.06931 | −626.06931 | 11.267 | | |
| 8 | L5 | spherical | −37.032178 | −37.032178 | 2.29374 | 1.82092 | 24.5527 |
| 9 | L6 | spherical | 1036.3269 | 1036.3269 | 13.6472 | 1.52549 | 61.9501 |
| 10 | | spherical | −43.12053 | −43.12053 | 0.598592 | | |
| 11 | L7 | aspheric | −275.00363 | −275.00363 | 4 | 1.61479 | 38.3363 |
| 12 | | aspheric | −216.74051 | −216.74051 | 15.8843 | | |
| 13 | L8 | spherical | −5044.6242 | −5044.6242 | 8.08798 | 1.71475 | 29.2045 |
| 14 | | spherical | −86.241502 | −86.241502 | 0.1 | | |
| 15 | L9 | spherical | 83.540521 | 83.540521 | 6.94749 | 1.71357 | 29.2753 |
| 16 | | spherical | 133.5318 | 133.5318 | 60.2792 | | |

TABLE 7-continued

| | | | | | | | |
|---|---|---|---|---|---|---|---|
| 17 | L10 | spherical | 65.163269 | 65.163269 | 2.2 | 1.83811 | 34.8844 |
| 18 | L11 | spherical | 44.73007 | 44.73007 | 15.6857 | 1.49709 | 81.4574 |
| 19 | | spherical | −195.94577 | −195.94577 | 0.679457 | | |
| 20 | L12 | spherical | −77.535527 | −77.535527 | 1.4 | 1.77881 | 46.6191 |
| 21 | | spherical | 119.58034 | 119.58034 | 24.1866 | | |
| 22 | L13 | spherical | 97.702446 | 97.702446 | 4.73043 | 1.5695 | 46.6259 |
| 23 | | spherical | −48.376544 | −48.376544 | 1.1624 | | |
| 24 | L14 | spherical | −84.02826 | −84.02826 | 1.4 | 1.79592 | 45.2919 |
| 25 | | spherical | 43.528662 | 43.528662 | 0.1 | | |
| 26 | L15 | spherical | 40.889724 | 40.889724 | 7.58313 | 1.50642 | 73.4983 |
| 27 | L16 | spherical | −26.493772 | −26.493772 | 1.4 | 1.76061 | 48.1918 |
| 28 | | spherical | −50.780015 | −50.780015 | 2.1 | | |
| 29 | L17 | cylindrical | 58.867589 | INFINITY | 4.99599 | 1.78026 | 46.5021 |
| 30 | L18 | cylindrical | −63.99442 | INFINITY | 6.57962 | 1.68041 | 31.5912 |
| 31 | | cylindrical | 35.11289 | INFINITY | 7.03509 | | |
| 32 | L19 | cylindrical | 39.731254 | INFINITY | 3.5 | 1.84666 | 23.7775 |
| 33 | | cylindrical | 89.163025 | INFINITY | 12.2838 | | |
| 34 | L20 | cylindrical | −142.11751 | INFINITY | 2 | 1.497 | 81.5448 |
| 35 | | cylindrical | 50.382994 | INFINITY | 7 | | |
| 36 | L21 | XTO | INFINITY | −128.13416 | 3 | 1.84666 | 23.7775 |
| 37 | | XTO | INFINITY | −131.25832 | 7.1131 | | |
| 38 | L22 | spherical | −26.544137 | −26.544137 | 2.16316 | 1.72569 | 34.764 |
| 39 | | spherical | −48.13901 | −48.13901 | 3.31644 | | |
| 40 | L23 | aspheric | −59.21149 | −59.21149 | 5 | 1.60632 | 40.6828 |
| 41 | | aspheric | −35.285063 | −35.285063 | 1.73747 | | |
| 42 | L24 | spherical | 137.19112 | 137.19112 | 8.90721 | 1.51053 | 78.0491 |
| 43 | | spherical | −41.412637 | −41.412637 | 37.07 | | |
| 44 | L25 | spherical | INFINITY | INFINITY | 40.93 | 1.51633 | 64.1411 |
| 45 | | spherical | INFINITY | INFINITY | 2 | | |
| Image Surface | | spherical | INFINITY | INFINITY | 0 | | |

Aspheric Coefficient

| | 1st surface | 2nd surface | 11th surface | 12th surface | 40th surface | 41st surface |
|---|---|---|---|---|---|---|
| Y curvature radius | −96.7902 | −83.3072 | −275.004 | −216.741 | −59.2115 | −35.2851 |
| conic constant | −7.70476 | −14.9638 | −27.2053 | 10.7121 | −5.62209 | −3.14909 |
| 4th-order coefficient | −0.000001 | −0.000006 | −0.000002 | −1.00E−06 | −0.000004 | −7.00E−06 |
| 6th-order coefficient | 4.43E−09 | 1.10E−08 | −6.76E−10 | −7.10E−10 | 1.36E−09 | 6.48E−09 |
| 8th-order coefficient | −3.83E−12 | −1.04E−11 | 7.56E−12 | 6.02E−12 | 4.46E−11 | 1.75E−11 |
| 10th-order coefficient | 1.31E−15 | 5.32E−15 | −1.01E−14 | −7.55E−15 | −8.57E−15 | 3.29E−14 |
| 12th-order coefficient | −1.42E−19 | −1.42E−18 | 6.28E−18 | 4.46E−18 | 0 | 0 |
| 14th-order coefficient | 0 | 1.64E−22 | −1.54E−21 | −1.04E−21 | 0 | 0 |
| 16th-order coefficient | 0 | 0 | 0 | 0 | 0 | 0 |
| 18th-order coefficient | 0 | 0 | 0 | 0 | 0 | 0 |
| 20th-order coefficient | 0 | 0 | 0 | 0 | 0 | 0 |

In the lower column of Table 7, in regard to the lenses L1, L7, and L23 which form the projection optical system of Example 5, an aspheric shape is shown.

Data regarding the curved surface of the lens L21, that is, an aspheric surface is as shown in Table 8.

TABLE 8

| | 36th surface |
|---|---|
| X curvature radius | −128.134158436268 |
| Y curvature | 0 |
| Y curvature radius | 1E+18 |
| conic constant (K) | 0 |
| 4th-order coefficient (A) | −1.55953399563634E−006 |
| 6th-order coefficient (B) | −2.96826887459989E−009 |
| 8th-order coefficient (C) | −1.98636992274373E−011 |
| 10th-order coefficient (D) | 7.99746730199515E−014 |
| | 37th surface |
| X curvature radius | −131.258324865974 |
| Y curvature | 0 |
| Y curvature radius | 1E+18 |
| conic constant (K) | 0 |
| 4th-order coefficient (A) | −1.41823639715888E−006 |
| 6th-order coefficient (B) | 1.93800975836928E−009 |
| 8th-order coefficient (C) | −1.21462631227657E−011 |
| 10th-order coefficient (D) | 5.41211997266865E−014 |

In FIG. 35, solid-line arrows AR1 and AR2 respectively represent the amount of astigmatic difference and the amount of field curvature in Example 5, and broken-line arrows AR1 and AR2 respectively represent the amount of astigmatic difference and the amount of field curvature when the lens L21 in Example 5 is not aspherized as a comparative example. When comparing both, it is understood that, in Example 5, the difference between the region C1 and the region C2, that is, the amount of astigmatic difference indicated by the arrow AR1 decreases, and the difference between the region C2 and the region C3 is small, that is, the amount of field curvature indicated by the arrow AR2 also decreases. That is, in Example 5 where aspherization is made, it is understood that both aberration and astigmatism relating to field curvature are reduced compared to a case where aspherization is not made.

In the second group 740, an aspheric lens may be included in at least a part of a plurality of cylindrical lens groups. In this case, since the optical performance in the vertical direction further increases, optimization is made while balancing out the increased amount in the horizontal direction, and as a result, it becomes possible to further improve overall performance.

Although in the foregoing embodiment, conversion using compression in the vertical direction (Y direction) has been described, the structure for moving the movable optical component may also be applied to a case where extension in the horizontal direction is performed, or the like. In this case, a plurality of cylindrical lens groups have a curvature in the extended horizontal X direction, and the optical component 742a which is an independent lens has a curvature in the unextended Y direction.

Eighth Embodiment

Hereinafter, a projection optical system or the like according to an eighth embodiment will be described. This embodiment is a modification of the projection optical system or the like of the seventh embodiment, and portions or matters which will not be particularly described are the same as those in the seventh embodiment.

FIGS. 36A and 36B respectively show the configuration of a cross section and the configuration of a longitudinal section of a projection optical system 820 of this embodiment. As shown in the drawings, the projection optical system 820 is configured such that, in a body portion 820a, a second group 840 which is an anamorphic optical system is disposed on the optical path, and conversion is performed to compress the aspect ratio in the vertical Y direction. As shown in the drawings, the second group 840 has a first optical component group 841 and a second optical component group 842 which are adjustment optical components. Of these, the first optical component group 841 has a plurality of cylindrical lens groups which have positive power as a whole, and the second optical component group 842 has a lens group which has negative power as a whole.

In this embodiment, in the second group 840 having the above configuration, the second optical component group 842 includes an optical component 842a which has a curvature in the X direction, in which conversion is not performed. In particular, in this embodiment, a single toric lens which has a curvature in both the X direction and the Y direction is provided as the optical component 842a, making it possible to correct aberration due to field curvature or astigmatic difference.

Example 6

Figure 37A:
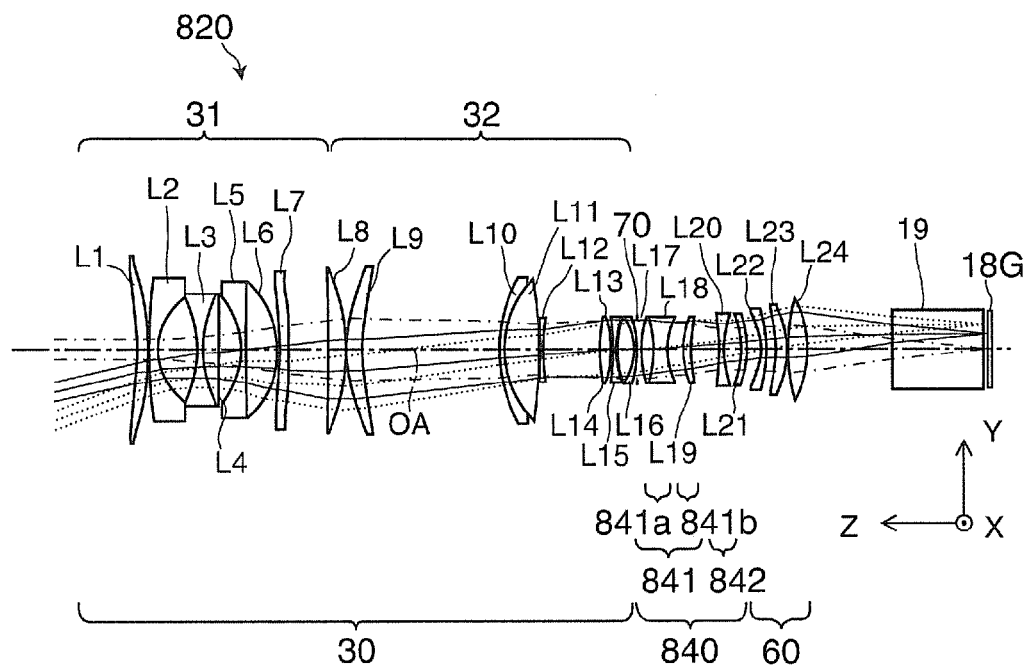
FIG. 37A is a diagram illustrating an optical system of Example 7 of the eighth embodiment.
Figure 37B:
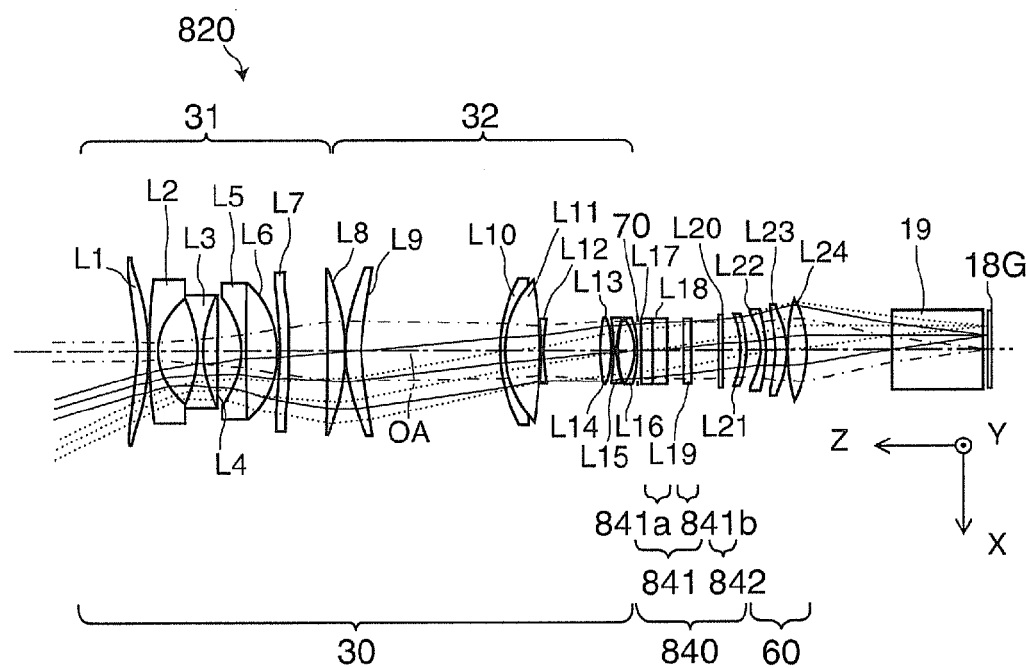
FIG. 37B is a diagram showing the configuration of a cross section of an optical system of Example 7.

FIGS. 37A and 37B are diagrams illustrating Example 6 of the projection optical system 820 of the eighth embodiment. FIG. 37A shows the configuration of a longitudinal section, and FIG. 37B shows the configuration of a cross section. The projection optical system 820 has lenses L1 to L24. Of these, the lenses L1 to L16 form a first group 30, the lenses L17 to L21 form a second group 840, and the lenses L22 to L24 form a third group 60. In the second group 840, the lenses L17 and L18 form a first partial group 841a which is a part of a first optical component group 841, the lens L19 forms a second partial group 841b which is the rest of the first optical component group 841, and the lenses L20 and L21 form a second optical component group 842 which is a third partial group. The first partial group 841a has negative power as a whole, the second partial group 841b has positive power, and the second optical component group 842 which is the third partial group has negative power as a while. The first optical component group 841 which is a lens group formed by combining the first partial group 841a and the second partial group 841b has positive power as a whole.

The second group 840 has the lenses L17 to L20 which are a plurality of cylindrical lens groups having a curvature only in the Y direction for performing compression conversion, and the lens L21 which is a single cylindrical lens, as the optical component 842a, having a curvature in both the Y direction in which compression conversion is performed and the X direction in which compression conversion is not performed. That is, of the lenses L17 to L21 forming the second group 840, while the lenses L17 to L20 are cylindrical lenses, the lens L21 is a toric lens which has a curvature in both the X direction and the Y direction. While other lenses are made of glass, the lens L21 is a resin lens.

The lenses L1 to L16 in the first group 30 are lenses which are rotationally symmetrical around the optical axis OA. In regard to the lenses L17 to L21 in the second group 840, as described above, first, the cemented lenses L17 and L18 and the lens L19 are cylindrical lenses which have positive power in the vertical Y direction as a whole, and have no power in the horizontal X direction. The lens L20 is a cylindrical lens which has negative power in the vertical Y direction, and has not power in the horizontal X direction. The lens L21 is a toric lens which has a curvature in both the vertical Y direction and the horizontal X direction. The lens L21 is a lens which substantially has not power in both the X direction and the Y direction in which a curvature is provided, that is, has power of substantially zero. Accordingly, the lens L21 does not directly affect compression conversion in the Y direction using the second group 840 as an anamorphic optical system, and functions as an optical system for only aberration correction. In this case, since a rise in temperature due to refraction in the lens L21 is reduced, for example, even when the lens L21 is made of resin, it is possible to reduce deviation in the focal length or the like due to a rise in temperature. The lenses L22, L23, and L24 in the third group 60 are lenses which are rotationally symmetrical around the optical axis OA. Of these, the lens L22 is a meniscus lens which is spherical and has negative power, the lens L23 is a meniscus lens which is aspheric and has negative power, and the lens L24 is a biconvex lens which is spherical and has positive power.

Lens data and the like of Example 6 are shown in Table 9. In the upper column of Table 9, "surface number", "surface type", "R1", "R2", "D", "Nd", and "vd" mean the same as those in Example 1.

TABLE 9

| Surface Number | Name | Surface Type | R1: R curvature radius | R2: X curvature radius | D | Nd | vd |
|---|---|---|---|---|---|---|---|
| Object | | aspheric | | | 2993.93 | | |
| 1 | L1 | aspheric | −130.88856 | −130.88856 | 5.23 | 1.497 | 81.5448 |
| 2 | | spherical | −107.13287 | −107.13287 | 0.121631 | | |
| 3 | L2 | spherical | 232.06293 | 232.06293 | 4.06228 | 1.5449 | 71.3042 |
| 4 | | spherical | 29.408902 | 29.408902 | 17.5617 | | |
| 5 | L3 | spherical | −49.647916 | −49.647916 | 1.80466 | 1.61132 | 62.4618 |
| 6 | L4 | spherical | 53.862519 | 53.862519 | 6.80739 | 1.77688 | 26.1419 |
| 7 | | spherical | −1011.3679 | −1011.3679 | 9.6898 | | |
| 8 | L5 | spherical | −37.931282 | −37.93128 | 2.29374 | 1.81208 | 25.4077 |
| 9 | L6 | spherical | 2022.1906 | 2022.1906 | 13.6472 | 1.5285 | 60.5525 |
| 10 | | spherical | −42.718914 | −42.718914 | 1.39578 | | |
| 11 | L7 | aspheric | −307.19158 | −307.19158 | 4 | 1.5628 | 48.3139 |
| 12 | | aspheric | −256.17484 | −256.17484 | 17.8404 | | |
| 13 | L8 | spherical | 1065.7752 | 1065.7752 | 8.08263 | 1.70892 | 29.5609 |
| 14 | | spherical | −97.776445 | −97.776445 | 0.1 | | |
| 15 | L9 | spherical | 98.95426 | 98.95426 | 6.94749 | 1.6886 | 30.9252 |
| 16 | | spherical | 211.36161 | 211.36161 | 61.1552 | | |
| 17 | L10 | spherical | 64.353627 | 64.353627 | 2.2 | 1.8391 | 33.0822 |
| 18 | L11 | spherical | 44.869634 | 44.869634 | 15.6857 | 1.49701 | 81.5313 |
| 19 | | spherical | −182.28684 | −182.28684 | 0.526003 | | |
| 20 | L12 | spherical | −87.543023 | −87.543023 | 1.4 | 1.77168 | 47.2146 |
| 21 | | spherical | 92.135179 | 92.135179 | 24.8716 | | |
| 22 | L13 | spherical | 100.93948 | 100.93948 | 4.73043 | 1.56319 | 48.2122 |
| 23 | | spherical | −47.442607 | −47.442607 | 1.1078 | | |
| 24 | L14 | spherical | −89.360722 | −89.360722 | 1.4 | 1.79645 | 45.2529 |
| 25 | | spherical | 42.883457 | 42.883457 | 0.1 | | |
| 26 | L15 | spherical | 40.852615 | 40.852615 | 7.58313 | 1.50436 | 75.0981 |
| 27 | L16 | spherical | −25.939961 | −25.939961 | 1.4 | 1.76857 | 47.4819 |
| 28 | | spherical | −50.242122 | −50.242122 | 2.1 | | |
| 29 | L17 | cylindrical | 57.163041 | INFINITY | 4.99599 | 1.78242 | 46.3279 |
| 30 | L18 | cylindrical | −57.199007 | INFINITY | 6.57962 | 1.67501 | 31.9616 |
| 31 | | cylindrical | 35.9927 | INFINITY | 7.03509 | | |
| 32 | L19 | cylindrical | 38.471688 | INFINITY | 3.5 | 1.84663 | 23.8066 |
| 33 | | cylindrical | 80.907668 | INFINITY | 12.2838 | | |
| 34 | L20 | cylindrical | −90.058682 | INFINITY | 2 | 1.50338 | 77.65 |
| 35 | | cylindrical | 51.222716 | INFINITY | 7 | | |
| 36 | L21 | XTO | −44.472088 | −51.993756 | 3 | 1.6968 | 55.5314 |
| 37 | | XTO | −42.627037 | −52.919778 | 6.5608 | | |
| 38 | L22 | spherical | −29.674637 | −29.674637 | 2.16316 | 1.73151 | 38.8225 |
| 39 | | spherical | −60.153735 | −60.153735 | 3.98833 | | |
| 40 | L23 | aspheric | −57.862594 | −57.862594 | 5 | 1.60219 | 42.1942 |
| 41 | | aspheric | −35.736263 | −35.736263 | 0.1 | | |
| 42 | L24 | spherical | 92.852255 | 92.852255 | 8.90721 | 1.51066 | 77.0073 |
| 43 | | spherical | −45.653105 | −45.653105 | 37.07 | | |
| 44 | L25 | spherical | INFINITY | INFINITY | 40.93 | 1.51633 | 64.1411 |
| 45 | | spherical | INFINITY | INFINITY | 2 | | |
| Image Surface | | spherical | INFINITY | INFINITY | 0 | | |

| Aspheric Coefficient | | | | | | |
|---|---|---|---|---|---|---|
| | 1st surface | 2nd surface | 11th surface | 12th surface | 40th surface | 41st surface |
| Y curvature radius | −130.889 | −107.133 | −307.192 | −256.175 | −57.8626 | −35.7363 |
| conic constant | −7.96267 | −19.6984 | −29.9135 | 10.6988 | −5.95365 | −3.27258 |
| 4th-order coefficient | −0.000001 | −0.000006 | −0.000002 | −1.00E−06 | −0.000004 | −7.00E−06 |
| 6th-order coefficient | 4.40E−09 | 1.09E−08 | −6.13E−10 | −6.25E−10 | 8.77E−10 | 6.21E−09 |
| 8th-order coefficient | −3.87E−12 | −1.04E−11 | 7.69E−12 | 6.05E−12 | 4.81E−11 | 1.85E−11 |
| 10th-order coefficient | 1.33E−15 | 5.35E−15 | −1.01E−14 | −7.50E−15 | −1.24E−14 | 3.17E−14 |
| 12th-order coefficient | −1.19E−19 | −1.42E−18 | 6.27E−18 | 4.45E−18 | 0 | 0 |
| 14th-order coefficient | 0 | 1.64E−22 | −1.58E−21 | −1.07E−21 | 0 | 0 |
| 16th-order coefficient | 0 | 0 | 0 | 0 | 0 | 0 |
| 18th-order coefficient | 0 | 0 | 0 | 0 | 0 | 0 |
| 20th-order coefficient | 0 | 0 | 0 | 0 | 0 | 0 |

In the lower column of Table 9, in regard to the lenses L1, L7, and L23 which form the projection optical system of Example 6, an aspheric shape is shown.

Data regarding the curved surface of the lens L21, that is, an aspheric surface is as shown in Table 10. The following aspheric coefficients are set with respect to the curvature radius in the X direction. Like data described below, in Example 6, where the Y direction is spherical, and the X direction is aspheric.

TABLE 10

| | 36th surface |
|---|---|
| X curvature radius | −51.9937564014593 |
| Y curvature | −0.0224860142271366 |
| Y curvature radius | −44.4720878453051 |
| conic constant (K) | 0 |
| 4th-order coefficient (A) | −1.42039797464451E−006 |
| 6th-order coefficient (B) | −2.70714513606851E−009 |
| 8th-order coefficient (C) | −1.87192355550052E−012 |
| 10th-order coefficient (D) | 3.94945480676666E−014 |
| | 37th surface |
| X curvature radius | −52.9197781830655 |
| Y curvature | −0.0234592897125276 |
| Y curvature radius | −42.6270365494478 |
| conic constant (K) | 0 |
| 4th-order coefficient (A) | −1.17132514883824E−006 |
| 6th-order coefficient (B) | −3.52395769218772E−009 |
| 8th-order coefficient (C) | 7.8680507523576E−012 |
| 10th-order coefficient (D) | 4.96785805191798E−015 |

Figure 38:
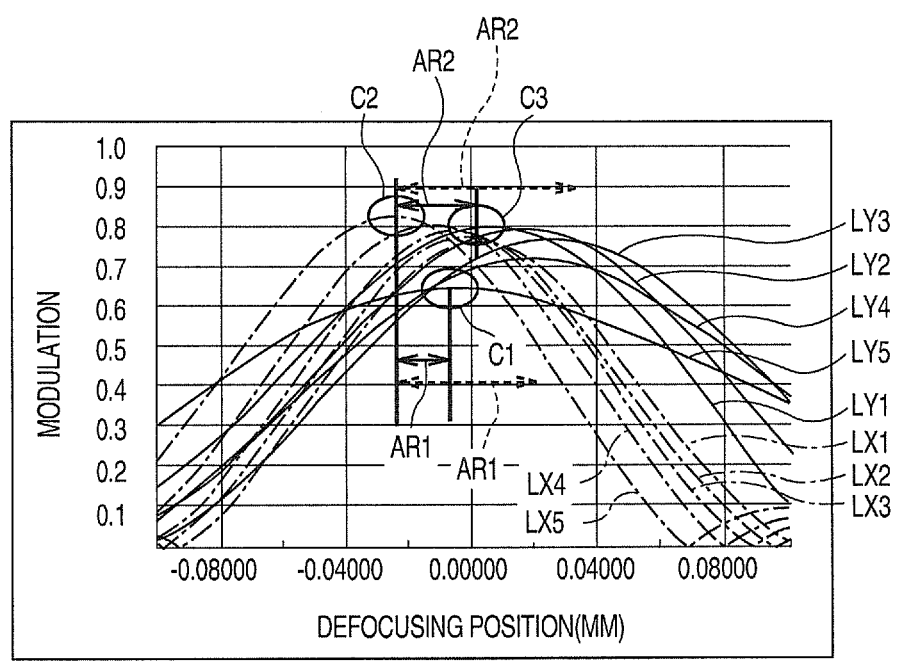
FIG. 38 is a graph showing an MTF of an optical system of Example 7.

FIG. 38 is a graph showing an MTF at an image height in the optical system of Example 6. In FIG. 38, solid-line arrows AR1 and AR2 respectively represent the amount of astigmatic difference and the amount of field curvature in Example 6, and broken-line arrows AR1 and AR2 respectively represent the amount of astigmatic difference and the amount of field curvature when the lens L21 in Example 6 is not aspherized as a comparative example. When comparing both, it is understood that, in Example 6, the difference between the region C1 and the region C2, that is, the amount of astigmatic difference indicated by the arrow AR1 decreases, and the difference between the region C2 and the region C3 is small, that is, the amount of field curvature indicated by the arrow AR2 also decreases. That is, in Example 6 where aspherization is made, it is understood that both aberration and astigmatism relating to field curvature are significantly reduced compared to a case where aspherization is not made. In other words, in this case, the amount of astigmatic difference of the maximum image height portion and field curvature are significantly improved. This indicates that, if curvature is provided in the Y direction, aberration in the Y direction is significantly improved, and the margin significantly contributes to improvement in performance in the X direction.

Example 7

Figure 39:
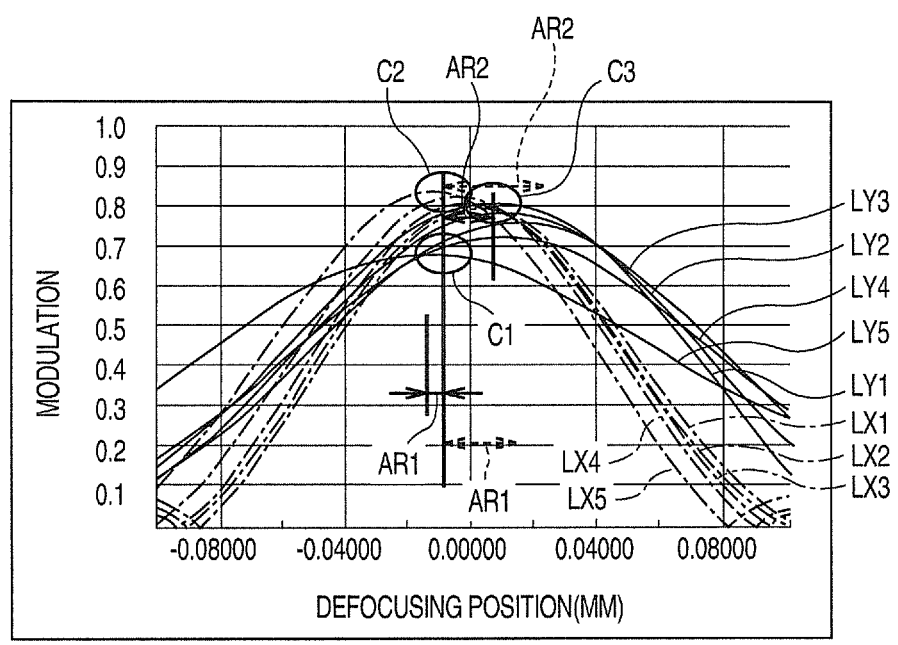
FIG. 39 is a graph showing an MTF of an optical system of Example 8.

FIG. 39 is a graph showing an MTF at an image height in an optical system of Example 7 of the projection optical system 820 of the seventh embodiment. In Example 7, in the projection optical system 820 of Example 6 shown in FIGS. 37A and 37B, the curved surface of the lens 21 as the optical component 842a is aspherized in both the X direction and the Y direction.

Lens data and the like of Example 7 are shown in Table 11. In the upper column of Table 11, "surface number", "surface type", "R1", "R2", "D", "Nd", and "vd" mean the same as those in Example 1.

TABLE 11

| Surface Number | Surface Name | Surface Type | R1: R curvature radius | R2: X curvature radius | D | Nd | vd |
|---|---|---|---|---|---|---|---|
| Object | | | | | 2999.82 | | |
| 1 | L1 | aspheric | −147.55718 | 147.55718 | 5.23 | 1.497 | 81.5446 |
| 2 | | aspheric | −115.38036 | −115.38036 | 0.1 | | |
| 3 | L2 | spherical | 236.27845 | 236.27845 | 4.06228 | 1.54739 | 70.8843 |
| 4 | | spherical | 29.071118 | 29.071118 | 17.4584 | | |
| 5 | L3 | spherical | −51.828105 | −51.828105 | 1.80466 | 1.61111 | 62.4836 |
| 6 | L4 | spherical | 53.562274 | 53.562274 | 6.55665 | 1.77019 | 27.0384 |
| 7 | | spherical | −14829.059 | −14829.059 | 9.5123 | | |
| 8 | L5 | spherical | −38.328023 | −38.328023 | 2.29374 | 1.81152 | 26.5407 |
| 9 | L6 | spherical | 1939.5387 | 1939.5387 | 13.6472 | 1.52862 | 61.8554 |
| 10 | | spherical | −42.179666 | −42.179666 | 1.67615 | | |
| 11 | L7 | aspheric | −293.02338 | −293.02338 | 4 | 1.55426 | 50.7209 |
| 12 | | aspheric | −270.54005 | −270.54005 | 18.0813 | | |
| 13 | L8 | spherical | 735.38483 | 735.38483 | 8.09504 | 1.70502 | 29.807 |
| 14 | | spherical | −101.3773 | −101.3773 | 0.1 | | |
| 15 | L9 | spherical | 103.27033 | 103.27033 | 6.94749 | 1.67824 | 31.7051 |
| 16 | | spherical | 238.40096 | 238.40096 | 63.1342 | | |
| 17 | L10 | spherical | 64.765677 | 64.765677 | 2.2 | 1.83924 | 32.8371 |
| 18 | L11 | spherical | 45.29827 | 45.29827 | 15.6857 | 1.497 | 81.5447 |
| 19 | | spherical | −171.75491 | −171.75491 | 0.48152 | | |
| 20 | L12 | spherical | −88.390255 | −88.390255 | 1.4 | 1.76838 | 47.4985 |
| 21 | | spherical | 86.511556 | 86.511556 | 23.4769 | | |
| 22 | L13 | spherical | 95.437618 | 95.437618 | 4.73043 | 1.56169 | 48.6104 |
| 23 | | spherical | −47.673678 | −47.673678 | 1.0664 | | |
| 24 | L14 | spherical | −92.23708 | −92.23708 | 1.4 | 1.79582 | 45.2992 |
| 25 | | spherical | 42.415978 | 42.415978 | 0.361632 | | |
| 26 | L15 | spherical | 41.396372 | 41.396372 | 7.58313 | 1.50422 | 75.2069 |
| 27 | L16 | spherical | −25.845291 | −25.845291 | 1.4 | 1.76951 | 47.4003 |
| 28 | | spherical | −49.674651 | −49.674651 | 2.1 | | |
| 29 | L17 | cylindrical | 57.467614 | INFINITY | 4.99599 | 1.78051 | 46.4814 |
| 30 | L18 | cylindrical | −55.996515 | INFINITY | 6.57962 | 1.67364 | 32.0718 |
| 31 | | cylindrical | 36.22151 | INFINITY | 7.03509 | | |
| 32 | L19 | cylindrical | 38.308854 | INFINITY | 3.5 | 1.84666 | 23.7775 |

TABLE 11-continued

| | | | | | | | |
|---|---|---|---|---|---|---|---|
| 33 | | cylindrical | 79.587988 | INFINITY | 12.2838 | | |
| 34 | L20 | cylindrical | −106.878895 | INFINITY | 2 | 1.497 | 81.5448 |
| 35 | | cylindrical | 48.199181 | INFINITY | 7 | | |
| 36 | L21 | anamorphic aspheric | −36.929299 | −52.817512 | 3 | 1.5119 | 69.6249 |
| 37 | | anamorphic aspheric | −36.228742 | −53.268649 | 6.0404 | | |
| 38 | L22 | spherical | −33.408609 | −33.408609 | 2.16316 | 1.73421 | 42.0986 |
| 39 | | spherical | −76.033352 | −76.033352 | 3.80963 | | |
| 40 | L23 | aspheric | −57.567745 | −57.567745 | 5 | 1.59347 | 44.324 |
| 41 | | aspheric | −36.135861 | −36.135861 | 0.1 | | |
| 42 | L24 | spherical | 81.999511 | 81.999511 | 8.90721 | 1.50751 | 76.8158 |
| 43 | | spherical | −47.347559 | −47.347559 | 37.07 | | |
| 44 | L25 | spherical | INFINITY | INFINITY | 40.93 | 1.51633 | 64.1411 |
| 45 | | spherical | INFINITY | INFINITY | 2 | | |
| Image Surface | | spherical | INFINITY | INFINITY | 0 | | |

Aspheric Coefficient

| | 1st surface | 2nd surface | 11th surface | 12th surface | 40th surface | 41st surface |
|---|---|---|---|---|---|---|
| Y curvature radius | −147.557 | −115.38 | −293.023 | −270.54 | −57.5677 | −36.1359 |
| conic constant | −8.73661 | −22.2994 | −32.5674 | 9.81877 | −5.70789 | −3.32745 |
| 4th-order coefficient | −0.000001 | −0.000006 | −0.000002 | −1.00E−06 | −0.000004 | −7.00E−06 |
| 6th-order coefficient | 4.41E−09 | 1.08E−08 | −6.12E−10 | −5.97E−10 | 7.15E−10 | 6.23E−09 |
| 8th-order coefficient | −3.87E−12 | −1.04E−11 | 7.74E−12 | 6.04E−12 | 4.85E−11 | 1.89E−11 |
| 10th-order coefficient | 1.33E−15 | 5.36E−15 | −1.01E−14 | −7.49E−15 | −1.14E−14 | 3.15E−14 |
| 12th-order coefficient | −1.21E−19 | −1.41E−18 | 6.28E−18 | 4.46E−18 | 0 | 0 |
| 14th-order coefficient | 0 | 1.58E−22 | −1.58E−21 | −1.07E−21 | 0 | 0 |
| 16th-order coefficient | 0 | 0 | 0 | 0 | 0 | 0 |
| 18th-order coefficient | 0 | 0 | 0 | 0 | 0 | 0 |
| 20th-order coefficient | 0 | 0 | 0 | 0 | 0 | 0 |

In the lower column of Table 11, in regard to the lenses L1, L7, and L23 which form the projection optical system of Example 7, an aspheric shape is shown.

Data regarding the curved surface of the lens L21, that is, an aspheric surface is as shown in Table 12. Like data described below, in Example 7, both the Y direction and the X direction are aspheric.

TABLE 12

| | 36th surface |
|---|---|
| X curvature radius | −52.817512463811 |
| Y curvature | −0.0270787698535527 |
| Y curvature radius | −36.9292994256459 |
| Y conic constant (KY) | 0 |
| 4th-order coefficient (AR) of rotational symmetry | −1.61104532096345E−007 |
| 6th-order coefficient (BR) of rotational symmetry | 1.53730928692859E−008 |
| 8th-order coefficient (CR) of rotational symmetry | −8.26366111121835E−011 |
| 10th-order coefficient (DR) of rotational symmetry | 2.19796080429772E−013 |
| X conic constant (KX) | 0 |
| 4th-order coefficient (AP) of rotational asymmetry | −3.65594107344592 |
| 6th-order coefficient (BP) of rotational asymmetry | −0.051164936579482 |
| 8th-order coefficient (CP) of rotational asymmetry | −0.103072185513006 |
| 10th-order coefficient (DP) of rotational asymmetry | −0.0478835009342865 |

TABLE 12-continued

| | 37th surface |
|---|---|
| X curvature radius | −53.2686492100881 |
| Y curvature | −0.0276023936736215 |
| Y curvature radius | −36.2287420368061 |
| Y conic constant (KY) | 0 |
| 4th-order coefficient (AR) of rotational symmetry | −1.35859170346427E−007 |
| 6th-order coefficient (BR) of rotational symmetry | 1.05007456447855E−008 |
| 8th-order coefficient (CR) of rotational symmetry | −4.82557412126088E−011 |
| 10th-order coefficient (DR) of rotational symmetry | 1.20750335243526E−013 |
| X conic constant (KX) | 0 |
| 4th-order coefficient (AP) of rotational asymmetry | −3.67180271195736 |
| 6th-order coefficient (BP) of rotational asymmetry | 0.0439989017543781 |
| 8th-order coefficient (CP) of rotational asymmetry | −0.112131426373607 |
| 10th-order coefficient (DP) of rotational asymmetry | −0.0424772741753561 |

In FIG. 39, solid-line arrows AR1 and AR2 respectively represent the amount of astigmatic difference and the amount of field curvature in Example 7, and broken-line arrows AR1 and AR2 respectively represent the amount of astigmatic difference and the amount of field curvature when the lens L21 in the Example 7 is not aspherized as a comparative example. When comparing both, it is understood that, in Example 7, the difference between the region C1 and the region C2, that is, the amount of astigmatic difference indicated by the arrow AR1 decreases, and the difference between the region C2 and the region C3 is small, that is, the amount of field curvature indicated by the arrow AR2 also decreases. That is, in Example 7 where aspherization is made, it is understood that both aberration and astigmatism relating to field curvature are further reduced compared to a case where aspherization is not made. In other words, the amount of astigmatic difference of the maximum image height portion and field curvature are further improved, and reach a level without problems.

Although in the foregoing embodiments, a case where conversion is performed using compression in the vertical direction (Y direction) has been described, the structure for moving the movable optical component may also be applied to a case where extension in the horizontal direction is performed, or the like.

Others

Figure 40:
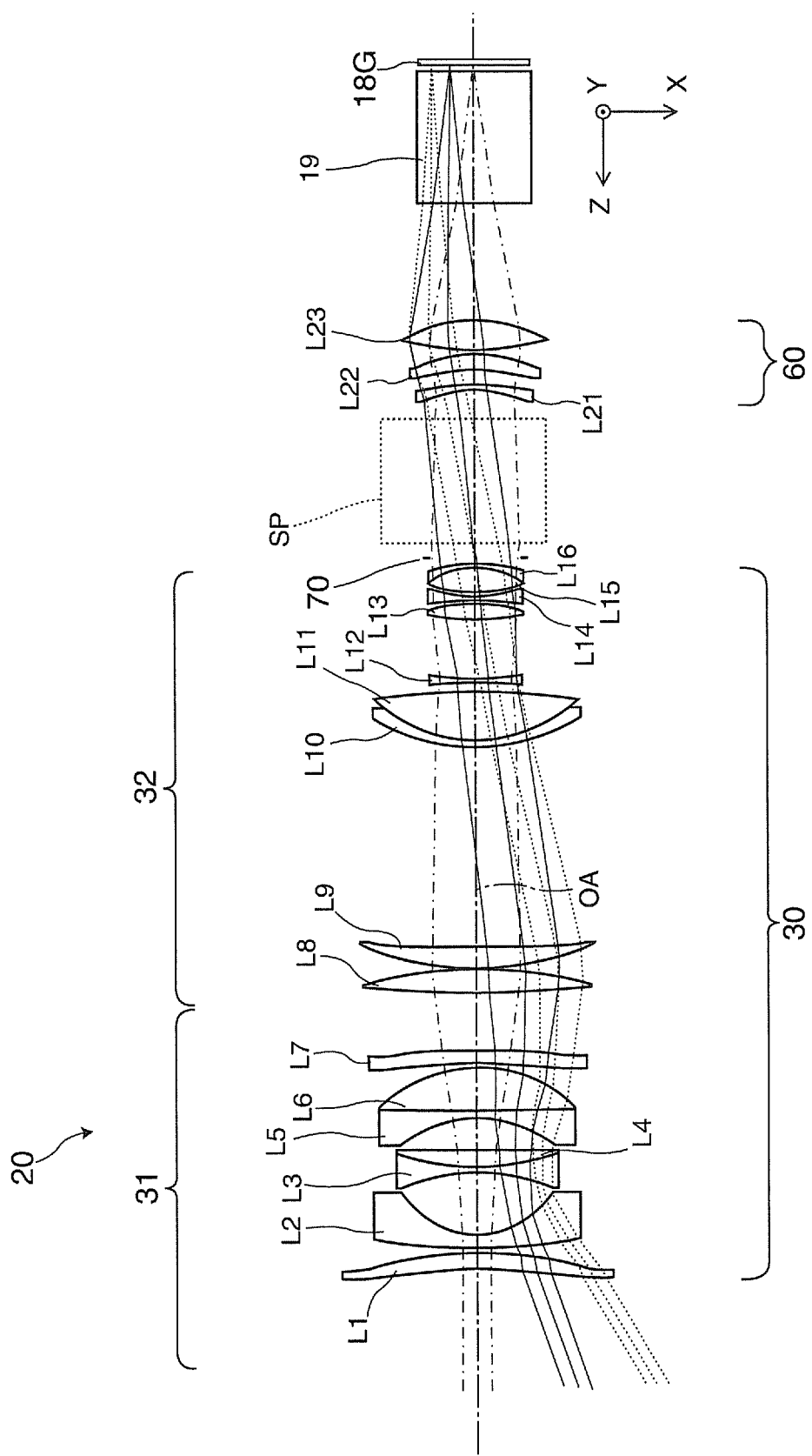
FIG. 40 is a diagram showing a second operation state of an optical system of another example.
Figure 41A:
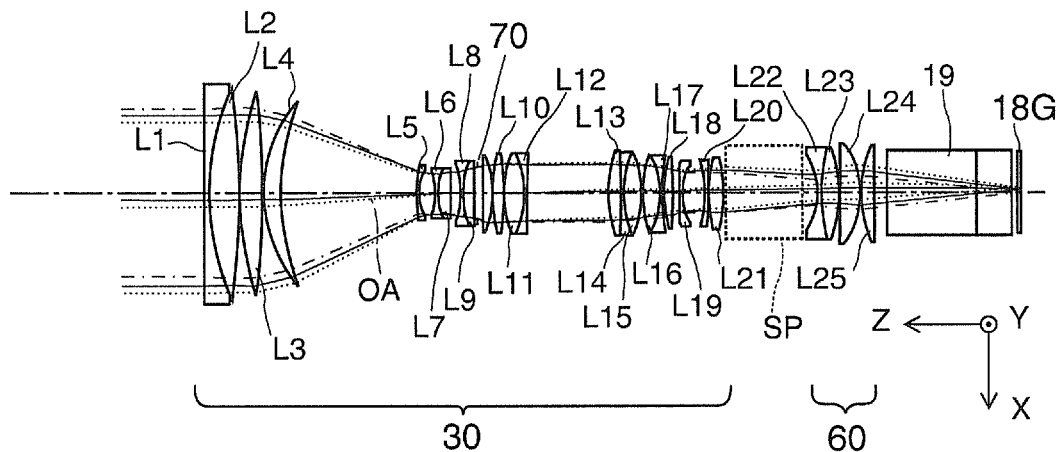
FIG. 41A is a diagram showing the configuration of a second operation state of a comparative example.
Figure 41B:
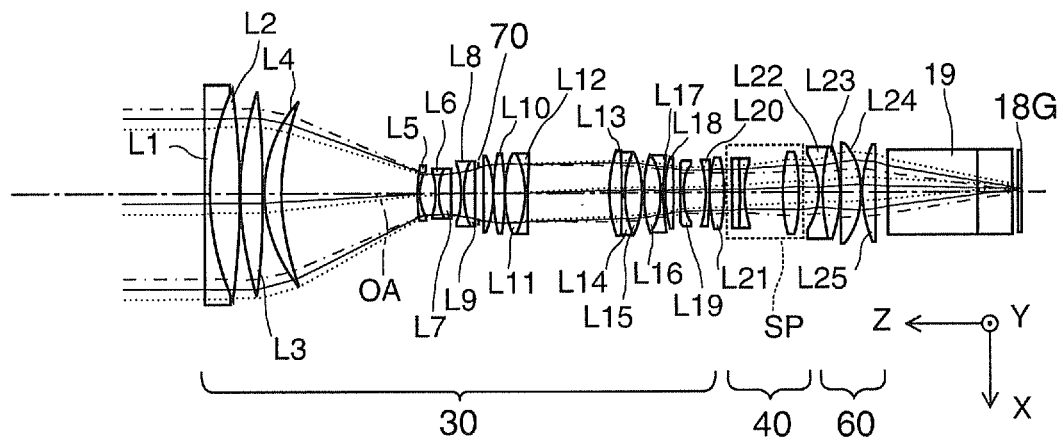
FIG. 41B is a diagram showing the configuration of a first operation state of a comparative example.

In an optical system shown in FIG. 40 as another example, a third group 60 is a light beam collimation optical system which collimates a light beam. That is, a light beam at each image height is substantially collimated with respect to a principal light beam in the space SP between the first group 30 and the third group 60 in the second operation state. Accordingly, since the second group which is advanced and retreated in the space SP becomes an afocal optical system in which a focal length is infinite, and should have only a function of converting magnification, some internal lenses are moved, thereby performing fine adjustment of the focal length (magnification) without being largely affected by all kinds of aberrations. That is, it becomes easy to reduce all kinds of aberrations, and if this optical system is used in a projector, it is possible to obtain satisfactory video as described above. In any optical system of this embodiment, the third group 60 is a light beam collimation optical system which collimates a light beam. Meanwhile, for example, as in a comparative example shown in FIGS. 41A and 41B, even when the second group 40 is retreatably disposed, if a light beam is not collimated in the space SP from the first group 30 to the third group 60, the second group 40 does not become an afocal system. Accordingly, in this comparative example, it is difficult to achieve the effects of aberration correction in the sixth and eighth embodiments. That is, the projection optical system according to the embodiments of the invention is excellent in aberration correction.

The invention is not limited to the foregoing embodiments, and may be carried out in various forms without departing from the subject matter of the invention.

For example, although in the foregoing embodiments, an image displayed on the liquid crystal panel 18G or the like is compressed (reduced) in the vertical direction or extended in the horizontal direction using the second group 40 or the like of the projection optical system 20 or the like, and an image converted at a relatively horizontally long aspect ratio is projected onto the screen SC, the lens configuration of the second group 40 or the like may be changed such that an image converted at a relatively vertically long aspect ratio may be projected.

Although in the above description, conversion adjustment using compression is performed only in the vertical direction, that is, only the vertical direction is defined as the direction, or conversion adjustment using extension is performed only in the horizontal direction, that is, only the horizontal direction is defined as the adjustment direction, both of compression in the vertical direction and extension in the horizontal direction may be performed, and both the vertical direction and the horizontal direction may be defined as the adjustment direction.

The liquid crystal panels 18G, 18R, 18B, and 418 are not limited to a transmissive type, and may be a reflective type. Here, the "transmissive type" means a type in which a liquid crystal panel transmits modulated light, and the "reflective type" means a type in which a liquid crystal panel reflects modulated light.

As a projector, there are a front projection-type projector which image projection is performed in a direction which the projection surface is observed and a rear projection-type projector in which image projection is performed in a direction opposite to the direction in which the projection surface is observed, and the configuration of the projector shown in FIG. 2 or the like may be applied to both types.

Instead of the liquid crystal panels 18G, 18R, 18B, and 418, a digital micromirror device or the like in which a micromirror is used as a pixel may be used as an optical modulator.

The entire disclosure of Japanese Patent Application No. 2011-134868, filed Jun. 17, 2011 and Japanese Patent Application No. 2012-105145, filed May 2, 2012 are expressly incorporated by reference herein.

What is claimed is:

1. A projection optical system which, when projecting an image of an optical modulator onto a projection surface on an enlarged scale, differs the aspect ratio of the image of the optical modulator and the aspect ratio of the image projected onto the projection surface, the projection optical system comprising, in order from the projection surface:
    a first group which is an enlargement optical system;
    a second group which includes an adjustment optical component with a surface rotationally asymmetrical to an optical axis, when defining at least one direction of the vertical direction and the horizontal direction of the optical modulator as an adjustment direction in which conversion adjustment using compression or extension is performed, the adjustment optical component having at least one optical system which is different in power between the adjustment direction and another direction; and
    a third group which has a correction optical component with a surface rotationally symmetrical to the optical axis.

2. The projection optical system according to claim 1,
    wherein the second group is retreatably disposed on an optical path, and
    when the second group is retreated from the optical path and enlarged projection is performed by the first group and the third group, the aspect ratio of the image of the optical modulator and the aspect ratio of the image projected onto the projection surface match each other.

3. The projection optical system according to claim 1,
    wherein the second group is replaceable with a flat plate which has no power, and
    when the flat plate is disposed on the optical path instead of the second group, the aspect ratio of the image of the optical modulator and the aspect ratio of the image projected onto the projection surface match each other.

4. The projection optical system according to claim 1,
    wherein a normal line passing through the center of the optical modulator and the optical axis of the projection optical system are disposed in parallel.

5. The projection optical system according to claim 1,
    wherein the second group includes one or more rotationally asymmetrical lenses as at least a part of the adjustment optical components, and further includes one or more rotationally symmetrical lenses.

6. The projection optical system according to claim 1, wherein the second group includes, in order from the projection surface, a first optical component group of positive power and a second optical component group of negative power as the adjustment optical components in the section along the vertical direction of the optical modulator.

7. The projection optical system according to claim 1, wherein the second group includes, in order from the projection surface, a first optical component group of negative power and a second optical component group of positive power as the adjustment optical components in the section along the horizontal direction of the optical modulator.

8. The projection optical system according to claim 6, wherein the space between the first optical component group and the second optical component group is variable, and the aspect ratio of the image projected onto the projection surface changes in accordance with the space.

9. The projection optical system according to claim 1, wherein, in the third group, the correction optical components have two or more lenses.

10. The projection optical system according to claim 1, wherein the third group includes a lens of positive power in at least a part of the correction optical components.

11. The projection optical system according to claim 1, wherein the second group includes a movable optical component, which is movable in an optical axis direction, in at least a part of the adjustment optical components.

12. The projection optical system according to claim 11, wherein the movable optical component moves in the optical axis direction in conjunction with a zoom operation of the first group.

13. The projection optical system according to claim 11, wherein the second group includes, in order from the projection surface, a first partial group of negative power, a second partial group of positive power including the movable optical component, and a third partial group of negative power in the adjustment direction, in which conversion adjustment using compression or extension is performed, between the vertical direction and the horizontal direction of the optical modulator.

14. The projection optical system according to claim 13, wherein, in the second group, a lens group in which the first partial group and the second partial group are combined has positive power.

15. The projection optical system according to claim 11, wherein the movable optical component is a cylindrical lens.

16. The projection optical system according to claim 1, wherein the second group has, in at least a part of the adjustment optical components, a plurality of cylindrical lens groups which have a curvature only in the adjustment direction, in which conversion adjustment using compression or extension is performed, between the vertical direction and the horizontal direction of the optical modulator, and an independent lens which has a curvature at least in a non-adjustment direction between the non-adjustment direction, in which conversion adjustment is not performed, between the vertical direction and the horizontal direction and the adjustment direction.

17. The projection optical system according to claim 16, wherein, in the second group, the independent lens is a resin lens.

18. The projection optical system according to claim 16, wherein, in the second group, the power of the independent lens is substantially zero.

19. The projection optical system according to claim 1, wherein the third group is a light beam collimation optical system which collimates a light beam.

20. A projector comprising:
a projection optical system according to claim 1; and
the optical modulator.

* * * * *